July 12, 1966 — J. P. MAGNIN — 3,261,001

TELEMETERING DECODER SYSTEM

Filed Jan. 9, 1962 — 11 Sheets-Sheet 1

Fig. 1A — MAJOR FRAME / MINOR FR.1, MINOR FR.2, MINOR FR.3, MINOR FR.4

Fig. 1B — MINOR FRAME 1 / MINOR FRAME 2 / WORD 1, WORD 2, WORD 3 ... WORD 64, WORD 1, WORD 2

Fig. 1C — WORD 1 / WORD 2 / SYLLABLE 1, SYLLABLE 2, SYLLABLE 3, WORD SYNC, SYLLABLE 1 / BITS 1-27, 1-8

Fig. 1D — DATA SIGNAL (NRZ), WORD SYNC

Fig. 1E — DATA SIGNAL (RZ)

Fig. 1F — WORD 64, MINOR FRAME 1, 2 AND 3

Fig. 1G — WORD 64, MINOR FRAME 4

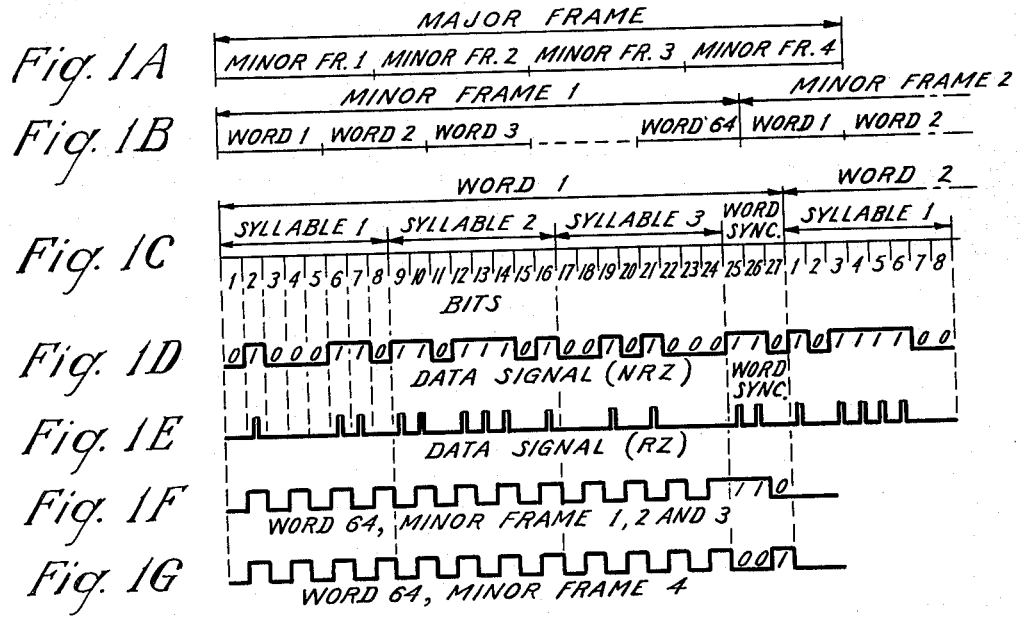

| CHANNEL NUMBER | SAMPLES PER SEC. | SIGNAL LOCATION | | | OUTPUT GATE | | |
|---|---|---|---|---|---|---|---|
| | | SYLLABLE | WORD | MINOR FR. | SYLLABLE | WORD | MINOR FR. |
| 1 | 25 | 1 | 1 | 1 | 1 | 2 | 1 |
| 2 | 25 | 2 | 1 | 1 | 2 | 2 | 1 |
| 3 | 25 | 3 | 1 | 1 | 3 | 2 | 1 |
| 4 | 25 | 1 | 2 | 1 | 1 | 3 | 1 |
| 5 | 25 | 2 | 2 | 1 | 2 | 3 | 1 |
| 86 | 50 | 1 | 13 | 1 + 3 | 1 | 14 | 1 + 3 |
| 87 | 50 | 2 | 13 | 1 + 3 | 2 | 14 | 1 + 3 |
| 130 | 100 | 3 | 6 | ALL | 3 | 7 | ALL |
| 131 | 100 | 1 | 7 | ALL | 1 | 8 | ALL |
| 164 | 200 | 1 | 10 + 42 | ALL | 1 | 11 + 43 | ALL |
| 200 | 400 | 3 | 14,30,46,62 | ALL | 3 | 15,31,47,63 | ALL |

Fig. 2

Jean Pierre Magnin
INVENTOR.

BY Richard E. Bee
ATTORNEY

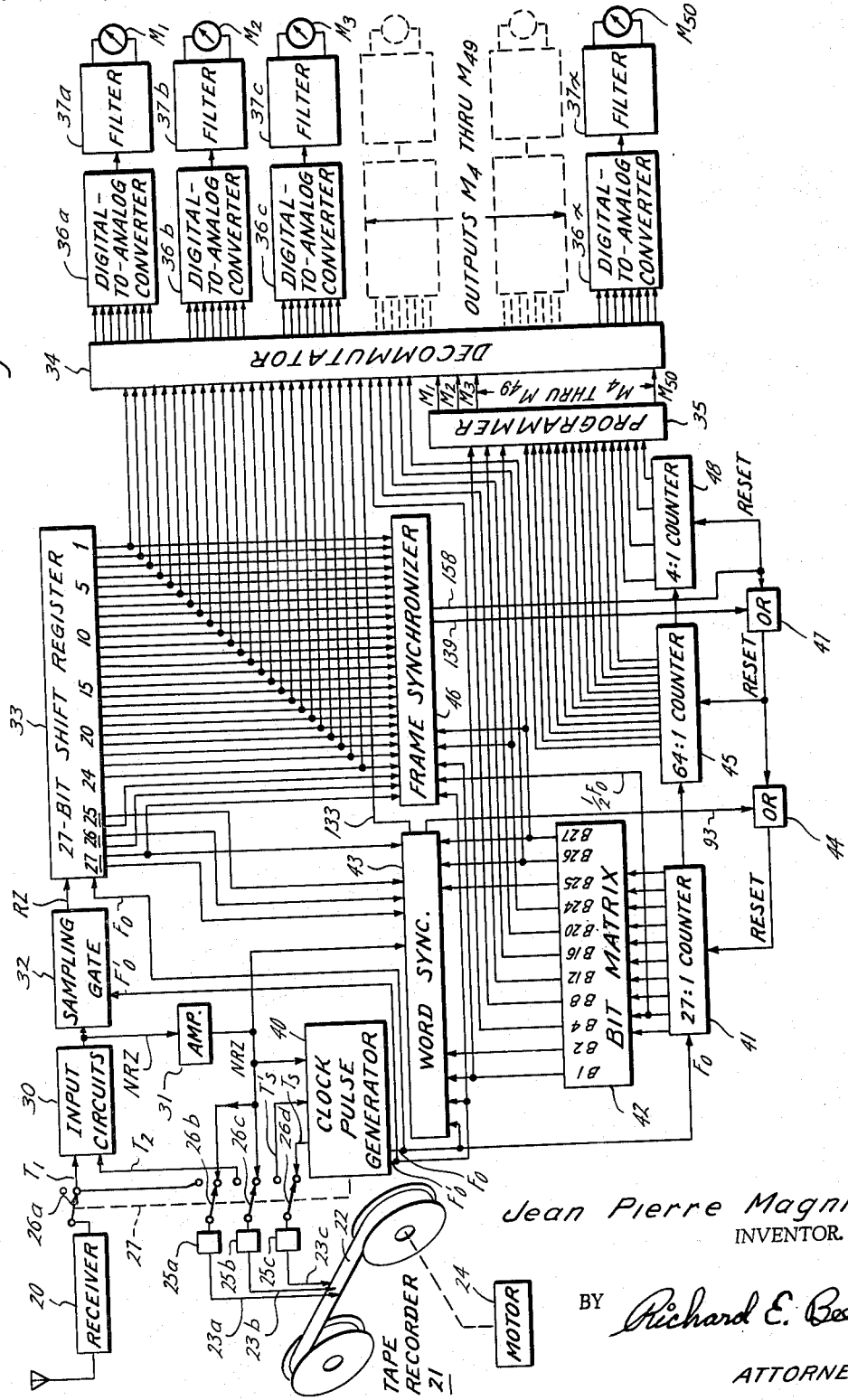

Jean Pierre Magnin
INVENTOR.

BY Richard E. Bee
ATTORNEY

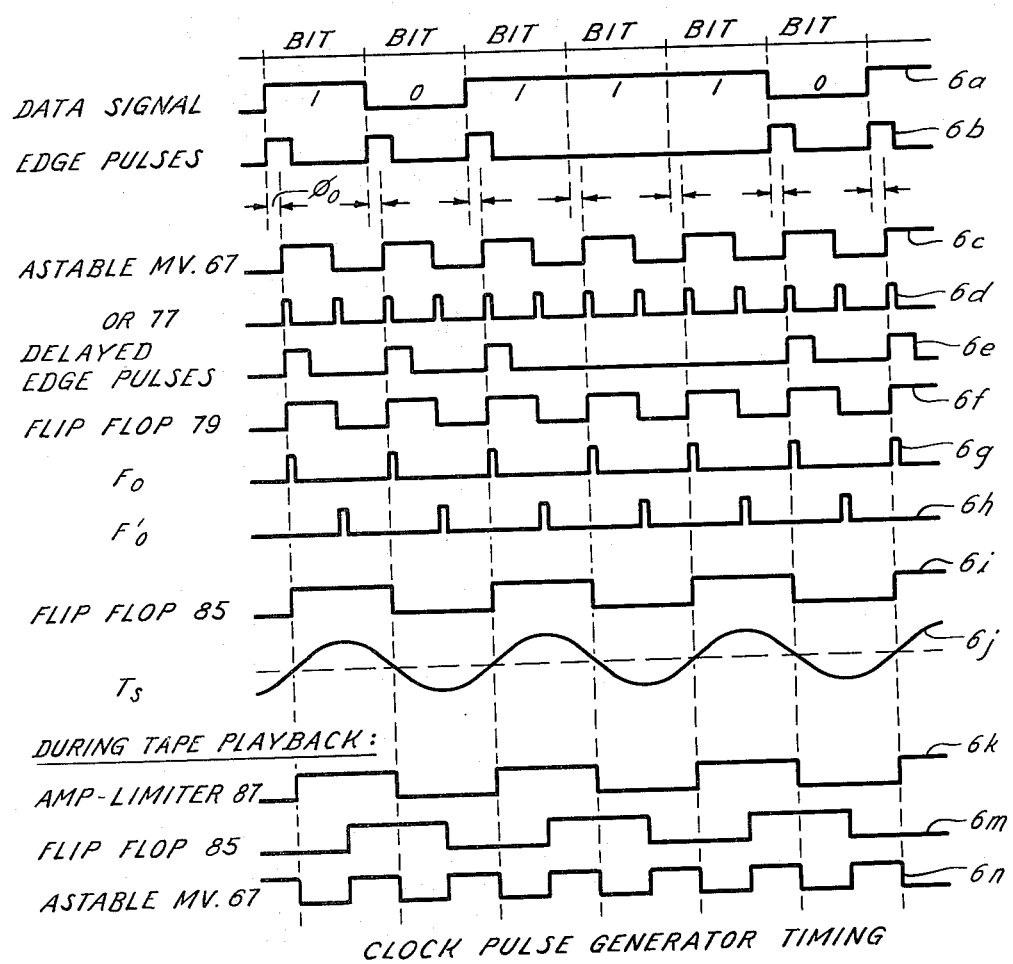
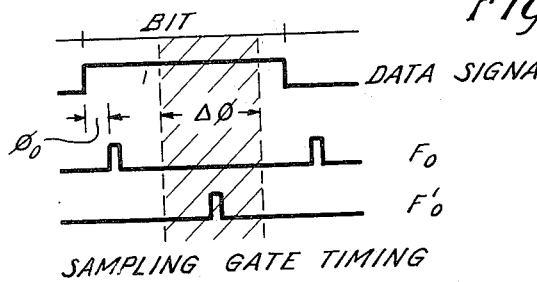

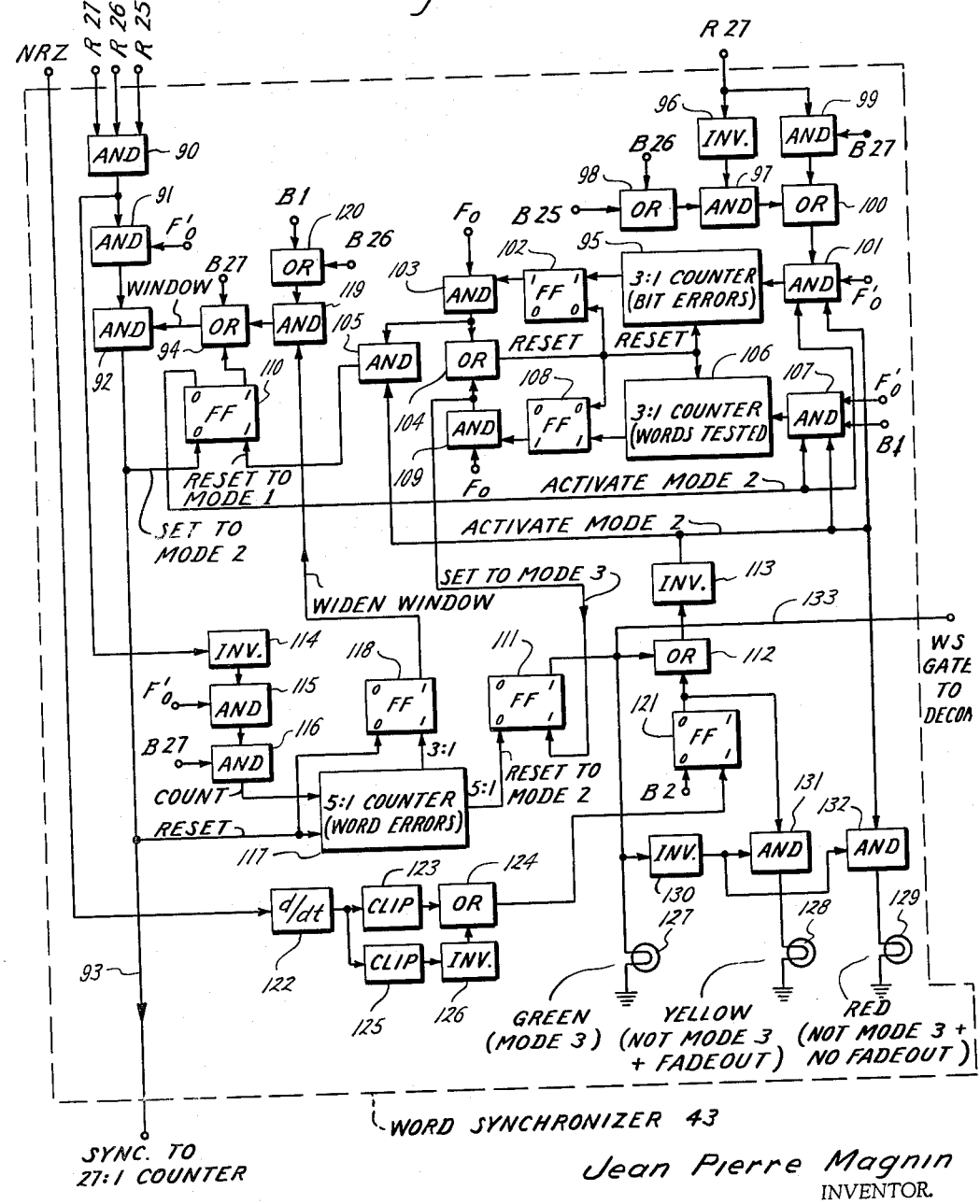

July 12, 1966  J. P. MAGNIN  3,261,001
TELEMETERING DECODER SYSTEM
Filed Jan. 9, 1962  11 Sheets-Sheet 7

| FF 110 | |
|---|---|
| 0 | MODES 2 & 3 |
| 1 | MODE 1 |

| FF 111 | |
|---|---|
| 0 | MODES 1 & 2 |
| 1 | MODE 3 |

| FF 121 | |
|---|---|
| 0 | FADEOUT |
| 1 | NO FADEOUT |

WORD SYNCHRONIZER TIMING (TIME →)

Jean Pierre Magnin
INVENTOR.

BY Richard E. Bee
ATTORNEY

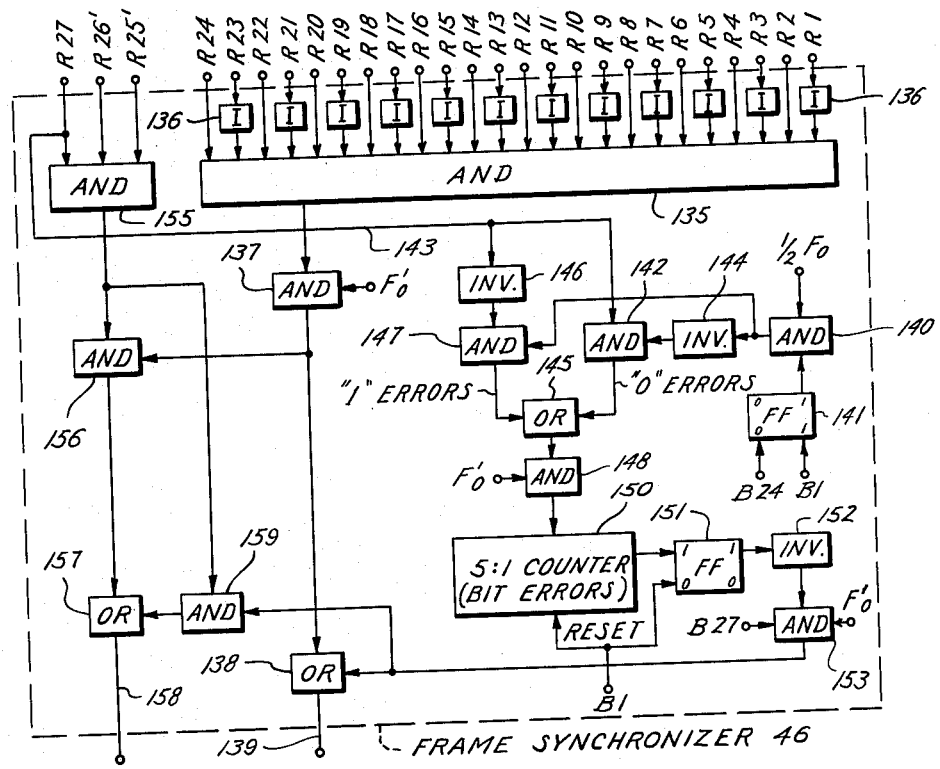

July 12, 1966  J. P. MAGNIN  3,261,001
TELEMETERING DECODER SYSTEM
Filed Jan. 9, 1962  11 Sheets-Sheet 10

DECOMMUTATOR TIMING (TIME →)

PROGRAMMER TIMING (TIME →)

Jean Pierre Magnin
INVENTOR.

BY Richard E. Bee
ATTORNEY 3,261,001
TELEMETERING DECODER SYSTEM
Jean Pierre Magnin, Sarasota, Fla., assignor to Electro-Mechanical Research, Inc., Sarasota, Fla., a corporation of Connecticut
Filed Jan. 9, 1962, Ser. No. 165,100
47 Claims. (Cl. 340—172.5)

This invention relates to telemetering decoder systems and, particularly, to decoder systems for decoding time-multiplexed pulse signals. This invention also relates to synchronizing systems for synchronizing local timing circuits in signal receivers with an incoming or received signal.

In presently-known telemetering systems, various types of signal multiplexing techniques are utilized to enable the transmission of a number of different information channels over a signal common wire-line or radio link. One commonly used multiplexing technique is known as "time division multiplexing." In a time division multiplex system, the transmitting equipment includes an encoder system which samples the information in the different signal channels in a cyclic sequence and puts out a pulse or group of pulses for each channel, which pulse or pulse group is modulated in accordance with the information in that channel. The pulse modulation may take the form of pulse amplitude modulation (PAM), pulse duration modulation (PDM), pulse position modulation (PPM) or pulse code modulation (PCM). The resulting train or sequence of modulated pulses is then usually supplied to a carrier frequency transmitter where it modulates the carrier signal. This carrier signal is then transmitted over the transmission link to the receiving equipment. At the receiving end, the pulse train is recovered from the modulated carrier signal by appropriate demodulator apparatus. The recovered pulse train is then supplied to a decoder system which operates to separate the pulses belonging to the different information channels and to apply the separated pulses to different output circuits. The resulting signal appearing across any given output circuit is then used to provide an indication of the information or data value in the corresponding information channel.

In order to obtain the proper separation of pulses belonging to different information channels, it is necessary to synchronize the separating or decommutating operation in the receiver decoder with the sampling or commutating operation in the transmitter encoder. This synchronization is obtained by inserting distinguishable synchronizing pulses or pulse patterns into the transmitter pulse train at periodic intervals which are related to the timing of the transmitter sampling operation. The receiver decoding system includes circuits which utilize these synchronizing pulses to control or regulate the timing of the decommutating operation.

Under fairly good signal transmission conditions, presently-known types of telemetering decoders provide generally satisfactorily operation. When the received signal contains a substantial amount of electrical noise or is subject to signal fading or other undesired forms of signal impairment, then the performance of known decoder systems leaves much to be desired. In particular, the synchronization of the receiver decoder tends to deteriorate and become unreliable. Also, when the received signal is subject to random fadeout, not only is synchronization lost shortly after the signal disappears, but, in addition, when the signal reappears objectionable lengths of time are required to regain synchronization.

Another problem encountered in multiplex telemetering systems is that of handling a large number of information channels where, for maximum efficiency, different ones of the information channels ought to be sampled at different sampling rates. It is desirable in this case to provide a decoder system having a minimum of complexity and yet sufficient flexibility to handle the different sampling rates. It is also desirable to provide a decoder system which is readily capable of handling any changes in channel programming or in the transmitter timing.

In addition to direct and immediate decoding of the received signal, it is frequently desired to record the received signal on magnetic tape, the recorded signal may then be played back and decoded at some later time or place. Such tape recording, however, tends to introduce further types of signal impairment which can upset the operation of the decoding system. Consequently, it is also desirable to provide a decoding system which can be used in conjunction with tape recorder apparatus and which, when subsequently used to decode the tape recorded signals, provides compensation for various types of tape recorder imperfection.

It is an object of the invention, therefore, to provide a new and improved signal decoder system for decoding a pulse signal representing two or more multiplexed information channels.

It is another object of the invention to provide a new and improved signal decoder system for decoding multiplexed pulse signals and having greater flexibility in the selection of chanels to be decoded and which is more readily capable of handling changes in channel programming and transmitter timing.

It is a further object of the invention to provide a new and improved decoder system for more rapidly and consistently decoding multiplexed pulse code signals which are partially impaired by electrical noise.

It is an additional object of the invention to provide a new and improved system for recording multiplexed pulse signals on magnetic tape and for providing compensation for various forms of tape recorder imperfections during subsequent playback and decoding of the recorded signals.

It is yet another object of the invention to provide a multi-channel pulse signal decoder system having new and improved synchronizing circuits for synchronizing the decoding operations with the various elements of the signal to be decoded.

It is a further object of the invention to provide new and improved synchronizing systems for synchronizing local timing circuits in signal receivers with an incoming or received signal.

It is an additional object of the invention to provide new and improved local oscillator synchronizing systems having both fast response characteristics and good holding characteristics in the presence of signal fading or other types of signal impairment.

It is a still further object of the invention to provide new and improved synchronizing systems for establishing and maintaining synchronization with noisy input signals.

In accordance with one feature of the invention, there is provided a decoder system for decoding a complex pulse code signal composed of binary bit units where a predetermined number of bit units constitutes a word unit and a predetermined number of word units constitutes a frame unit, the timing of word units being represented by a recurring word synchronizing bit pattern and the timing of frame units being represented by a recurring frame synchronizing bit pattern. The decoder system includes circuit means for supplying the pulse code signal. The decoder system also includes a plurality of output signal channels. The decoder system further includes decoding circuit means responsive to the pulse code signal for selectively translating different groups of bit units to different ones of the output signal channels. The decoder system further includes pulse generating circuit means for generating bit-rate timing pulses and circuit means responsive to the pulse code signal for synchronizing the timing of the pulse generating circuit means with the timing of the bit units in the pulse code signal. The decoder system also includes first counting circuit means coupled to the pulse generating circuit means for supplying word-rate timing pulses to the decoding circuit means. The decoder system further includes a circuit means responsive to the pulse code signal for producing a control pulse for each occurrence of a word synchronizing bit pattern and for supplying these control pulses to the first counting circuit means for synchronizing the counting action thereof with the word synchronizing bit patterns. The decoder system additionally includes second counting circuit means coupled to the first counting circuit means for supplying frame-rate timing pulses to the decoding circuit means. The decoder system also includes circuit means responsive to the pulse code signal for producing a control pulse for each occurrence of a frame synchronizing bit pattern and for supplying these control pulses to both the first and the second counting circuit means for synchronizing the counting actions thereof with the frame synchronizing bit patterns.

In accordance with other features of the invention, there are provided various types of synchronizing systems for establishing synchronization between the various decoder timing circuits and the various components of the received signal. The detailed description given hereinafter describes their use in a pulse code type of telemetering system. Some of these synchronizing systems, however, are generally applicable to other types of telemetering systems wherein it is desired to synchronize the timing of a local timing circuit with an incoming or received signal.

In accordance with a further feature of the invention, there is provided a decoder system wherein sampling of the individual bit intervals in the received pulse code signal is utilized to render the system less sensitive to undesired variations in the timing of the local timing circuits.

In accordance with another feature of the invention, there is provided a system of shift and storage registers for accurately and efficiently separating various bit unit groups and sub-groups from one another.

In accordance with an additional feature of the invention, there is provided a decoder synchronizing system which is used while the received pulse signals are being recorded on magnetic tape for generating a reference timing signal which is also recorded on the magnetic tape, this recorded timing signal being used during the subsequent playback and decoding of the recorded pulse signals for controlling the timing of the decoder synchronizing circuits.

For a better understanding of the present invention, together with other and further objects thereof, reference is had to the following description taken in connection with the accompanying drawings, the scope of the invention being pointed out in the appended claims.

Referring to the drawings:

FIGS. 1A–1G are graphs which illustrate the composition of a complex pulse code signal;

FIG. 2 is a chart used to explain how various information channels are located in a received pulse code signal;

FIG. 3 is a general block diagram of a decoder system constructed in accordance with the present invention;

FIGS. 6 and 6A are timing diagrams for the clock pulse generator of FIG. 5;

FIG. 7 is a detailed block diagram of the word synchronizer of the FIG. 3 decoder system;

FIG. 10 is a detailed block diagram of the frame synchronizer of the FIG. 3 decoder system;

FIG. 11 is a timing diagram for the frame synchronizer of FIG. 10;

SIGNAL COMPOSITION AND CHANNEL ASSIGNMENTS

Figure 4:
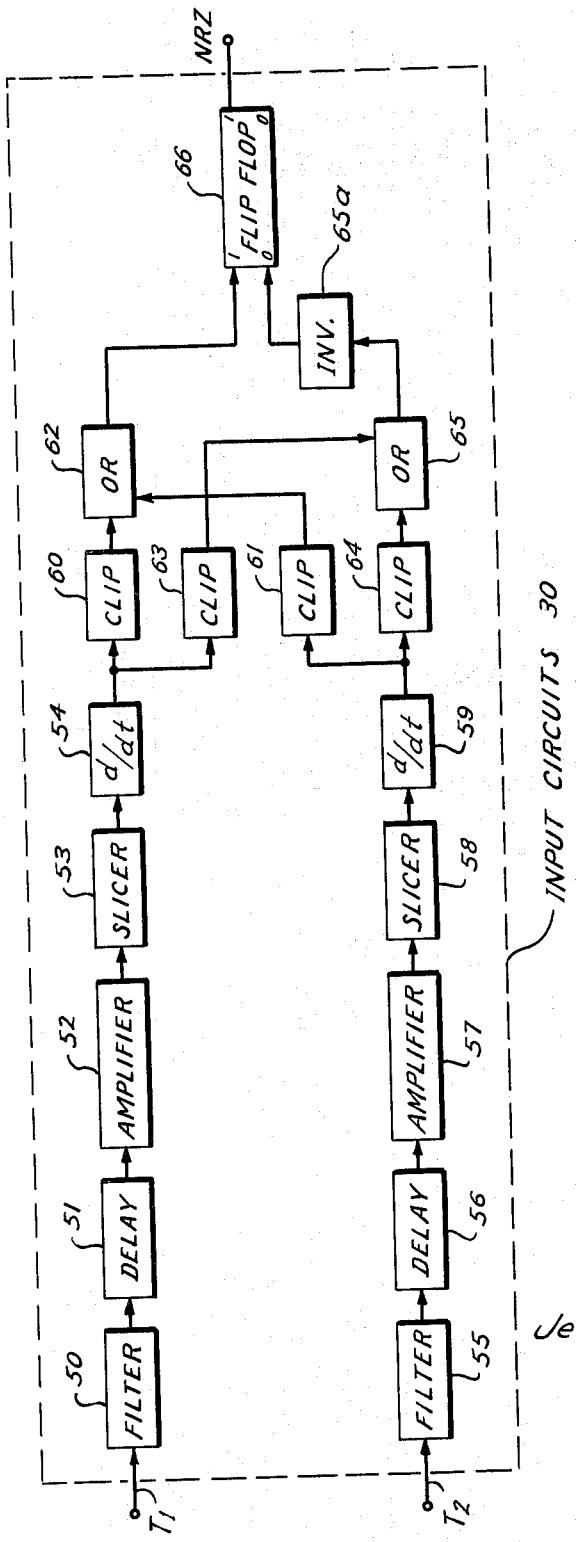
FIG. 4 is a detailed block diagram of the input circuits of the FIG. 3 decoder system.

The decoder system of the present invention will be described for the case where it is desired to decode a time-multiplexed pulse code signal conveying data or information from 200 information channels, different ones of which are sampled at different sampling rates. The incoming pulse code signal which is supplied to the decoder system may be either a signal which is, at that moment, being received from a distant transmitter station or it may be a signal which is being obtained from the playback of a signal previously recorded on magnetic tape or some other recording medium. The signal supplied to the decoder is a so-called "video" signal. Any carrier or sub-carrier components used in transmitting the signal to the receiving station have been removed by suitable demodulator apparatus at an earlier stage in the receiving equipment.

The pulse code signal which is supplied to the decoder system of the present invention is cyclic in nature and, in the illustrated embodiment, contains five major sub-divisions. These sub-divisions are:

(1) Major Frame (complete operating cycle—approximately 25 cycles per second)
(2) Minor Frame
(3) Word
(4) Syllable (data sample—approximately 19,200 per second)
(5) Bit (binary code interval—approximately 172,800 per second).

As indicated in FIG. 1A, each major frame or complete operating cycle is sub-divided into four minor frame intervals of equal duration. As indicated in FIG. 1B, each minor frame interval is sub-divided into 64 word intervals of equal duration. As indicated in FIG. 1C, each word interval is sub-divided into 27 bit intervals of equal duration. The duration of each bit interval is approximately 5.8 microseconds. The first 24 bits of each word are grouped to form three 8-bit syllables. The last three bits of each word are used for word synchronization purposes. Each syllable corresponds to one sample or one sampling of a transmitter information channel. Thus, each data sample is represented by an 8-bit binary code. As indicated in FIG. 1D, which represents a portion of a typical pulse code signal as supplied to the decoder system, the signal value during each bit interval can assume either of two possible values, namely, either a "zero" value or a "one" value. Thus, the pattern of "zeros" and "ones" occurring during any given syllable interval represents an 8-bit binary number which corresponds to the data value that was measured or sampled during that syllable interval. An 8-bit binary code yields an accuracy of better than ±0.4% in the representation of analog values. The word synchronizing bit pattern occurring during bit intervals 25, 26 and 27 of each word is a "110" pattern.

As also indicated in FIG. 1D, the data signal or pulse code signal supplied to the decoder system is of the "non-return-to-zero" (NRZ) type. This means that if two or more successive bits have a "one" value, then the signal is not returned to a "zero" value in between the individual bits. A corresponding "return-to-zero" (RZ) type of signal is indicated in FIG. 1E. In this case, the occurrence of a pulse during the bit interval indicates a "one" value, while the absence of a pulse indicates a "zero" value. This form of signal, of course, "returns to zero" in between successive "one" bits.

Word interval 64 of each minor frame is used entirely for frame synchronization purposes. The pulse code pattern occurring during word interval 64 of Minor Frames 1, 2 and 3 is shown in FIG. 1F. This is the minor frame synchronizing bit pattern. As seen in FIG. 1F, it consists of alternate "zeros" and "ones" during bit intervals 1–24, while a "110" bit pattern occupies bit intervals 25–27. Word 64 of Minor Frame 4, on the other hand, constitutes the major frame synchronizing bit pattern, denoting the end of a major frame or complete operating cycle. This major frame synchronizing bit pattern is shown in FIG. 1G. As there indicated, bit intervals 1–24 again consist of alternate "zeros" and "ones." This time, however, a "001" pattern occurs in bit intervals 25–27.

Referring now to FIG. 2 of the drawings, there is given a chart which shows how the data samples for different ones of the information channels are located in the pulse code signal train. The present embodiment of the decoder system is constructed to handle 200 information channels with different channels being sampled at different rates. The chart of FIG. 2 gives typical sampling rates and signal locations for representative ones of these 200 information channels. For example, information channels Nos. 1–5 are sampled at a rate of 25 samples per second. This sampling rate requires the use of one syllable per major frame or complete operating cycle. Thus, Channel 1 is sampled once each operating cycle and the data value existing in the channel when it is sampled is represented by the 8-bit binary number appearing at Syllable 1 of Word 1 of Minor Frame 1. In order to double the sampling rate, it is necessary to use two syllables per major frame. As indicated for Channels 86 and 87, this may be done by using the same syllable and word locations in two different minor frames. In a similar manner, the chart of FIG. 2 gives typical signal locations for channels which are sampled at rates of 100, 200 and 400 samples per second. Thus, in order to transmit 400 samples per second requires the use of 16 syllables per major frame.

DECODER SYSTEM—GENERAL

Referring now to FIG. 3 of the drawings, there is shown a general block diagram of a representative embodiment of a decoder system constructed in accordance with the present invention. This decoder system is constructed to decode the pulse code signal just discussed to provide separate output indications of the data values in the different information channels. Initially, the pulse code signal to be decoded is obtained either from a receiver 20 or a tape recorder 21. Receiver 20 is used for the direct decoding of the signal as it is received from a distant transmitting station. For the case of a radio-frequency transmission link, receiver 20 includes the necessary amplifier, detector or discriminator and filter circuits for separating the desired carrier from any other frequency multiplexed carriers that may be present and for recovering the desired video signal modulation from the selected carrier. Consequently, the pulse code signal occurring at the output of receiver 20 is of the form illustrated in FIG. 1D.

Tape recorder 21, on the other hand, includes a supply of magnetic recording tape 22 which is driven past three side-by-side recording heads 23a, 23b and 23c by means of a motor 24 and a suitable mechanical driving mechanism. Heads 23a, 23b and 23c are adapted to either record signals in three side-by-side tracks on the tape 22 or else to pick up and play back signals previously recorded in such tracks. To this end, heads 23a, 23b and 23c are individually coupled to the respective ones of record-playback circuits 25a, 25b and 25c. For the case where the signal is being recorded, the first two heads 23a and 23b are used to record the complete signal in each of two different tracks on the tape 22. This double recording of the signal increases the reliability of the record and, in particular, serves to considerably reduce the possibility of momentary signal loss due to tape dropout. A suitable timing signal is recorded on the third track of the tape by the recording head 23c.

Single-pole double-throw switches 26a, 26b, 26c, etc., serve to determine whether the decoder system is to receive its input signal from the receiver unit 20 or, instead, from the tape recorder 21. These switches 26a, 26b, 26c, etc., are ganged together as schematically indicated by dash-line 27 so as to move in unison with one another. With the individual switches in the lower of their two positions, as illustrated in FIG. 3, the decoder system is set to receive its input from the receiver 20. At the same time as the decoder system is being used to decode the signal from receiver 20, the tape recorder 21 is coupled to the decoder system and operates to make a permanent record of the received signal.

The decoder system proper includes circuit means for supplying the pulse code signal to be decoded. In the present embodiment, this supply circuit means includes input circuits 30 which include suitable filtering and reshaping circuits for producing an output pulse code signal having sharp signal transitions and a minimum of noise distortion. Input circuits 30 are provided with a pair of input terminals, designated $T_1$ and $T_2$, to take care of the case where the pulse code signal is being obtained from tape recorder 21 which has the complete signal recorded in each of two different tracks on the tape. Only one of these input terminals is used where the signal is obtained from receiver 20. Input circuits 30 will be discussed in greater detail hereinafter.

The decoder system supply circuit means also include an amplifier 31 coupled to the output terminal of the input circuits 30. This amplifier 31 provides at its output terminal an amplified version of the regenerated NRZ pulse code signal. The decoder supply circuit means further includes a sampling gate 32 which is also coupled to the output terminal of input circuits 30. Sampling gate 32 is a two-input AND circuit or coincidence circuit for producing an output signal whenever input signals are simultaneously applied to each of its input terminals. Sampling gate 32 serves to convert the NRZ pulse code signal to an RZ pulse code signal. To this end, narrow locally-generated bit-rate timing pulses ($F_0'$) are supplied to a second input terminal of the sampling gate 32. Consequently, a narrow pulse appears at the output terminal of the sampling gate 32 during each bit interval in which the NRZ signal has a binary value of "one." The resulting RZ signal at the output of sampling gate 32 is of the form indicated in FIG. 1E.

The decoder system supply circuit means further includes a 27-bit shift register 33. This shift register 33 is capable of holding an entire 27-bit word group. The individual stages of register 33 are hereinafter referred to as stages R1, R2, R3, etc., with the numbers increasing from the right-hand end of the shift register back towards the input end on the left. The RZ pulse train from sampling gate 32 is read into this shift register 33 in a serial manner. This is accomplished by using locally-generated bit-rate timing pulses ($F_0$) to successively shift the input bits from one register stage to the next, each bit thus progressing from stage R27 to stage R26, to stage R25, etc. until it reaches stage R1, after which it ceases to exist in the register 33. Parallel outputs taken from the 27 binary stages of shift register 33 thus provide a simultaneous indication of the 27 successive pulse code bits which are in the shift register 33 at any given moment.

The decoder system of FIG. 3 also includes decoding circuit means responsive to the pulse code signal for selectively translating different groups of bit units to different ones of a plurality of output signal channels. This circuit means includes a decommutator 34. Decommutator 34 is responsive to the parallel outputs from the last 24 stages, namely, stages R1–R24, of the shift register 33 for separating the corresponding code bits into 8-bit syllable groups. Decommutator 34 then operates to supply each of the 8-bit syllable groups to a selected set of parallel 8-bit output terminals. Selection of the appropriate set of 8-bit output terminals is controlled by gating pulses which are supplied to the decommutator 34 by a programmer 35. The details of decommutator 34 and programmer 35 will be considered at greater length hereinafter.

The decoder system of FIG. 3 further includes a plurality of output signal channels. A first of these output signal channels includes a digital-to-analog converter 36a, a filter 37a and an indicating device M1. A second of these output signal channels includes digital-to-analog converter 36b, filter 37b and an indicating device M2. These combinations of output circuits are repeated as often as necessary to provide the desired number of output signal channels. In the present embodiment, it is desired to provide 50 output signal channels. In this case, not all of the 200 transmitted information channels can be monitored at one and the same time. In particular, only 50 of the transmitted information channels can be monitored at any given instant. Each of the digital-to-analog converters 36a, 36b, etc. are of identical construction and each is connected to a different set of 8-bit output terminals of the decommutator 34. Each serves to convert a parallel 8-bit binary code group to a single analog output voltage or current. These digital-to-analog converters may be of either the ladder network or the weighted resistor network type. Filters 37a, 37b, etc. are of the low-pass type and are constructed to minimize any switching transients resulting from the decommutating action. Because of the novel decommutator of the present invention, however, switching transients are reduced to a minimum and, hence, relatively simple filters are sufficient. Indicating devices $M_1$, $M_2$, etc. may take the form of voltage-measuring meters, current-measuring meters, recording galvanometers, or any other type of devices suitable for either displaying or recording analog signals.

The decoder system of FIG. 3 also includes timing circuit means for controlling the operation thereof. This timing circuit means include pulse generating circuit means for generating bit-rate timing pulses and circuit means responsive to the pulse code signal for synchronizing the timing of the pulse generating circuit means with the timing of the bit units in the pulse code signal. Both the pulse generating circuit means and the synchronizing circuit means are included in a clock pulse generator unit 40. This clock pulse generator 40 puts out two separate sets of bit-rate timing pulses, namely, an $F_0$ set and an $F_0'$ set. The $F_0$ set contains one narrow pulse for each bit interval and the individual pulses occur at the boundaries between the bit intervals. The $F_0'$ set likewise contains one narrow pulse for each bit interval but, in this case, the individual pulses occur midway in the bit intervals. Thus, the $F_0'$ timing pulses are displaced by one-half of a bit interval from the $F_0$ timing pulses. Synchronization of the clock pulse generator 40 is obtained by utilizing the NRZ pulse code signal appearing at the output of amplifier 31. Also, where the input pulse code signal is being obtained from the playback of a tape recorded signal and where a reference tone or timing signal has also been recorded on the tape, then, as indicated by terminals $T_s$ and $T_s'$ of the clock pulse generator 40, means are provided for synchronizing the operation of the clock pulse generator 40 with the recorded timing signal on the tape. Among other things, this eliminates errors caused by tape speed variations in the tape recorder. The clock pulse generator 40 will be considered in greater detail hereinafter.

The timing circuit means of the FIG. 3 decoder system also include a first counting circuit means coupled to the pulse generating circuit means for developing word-rate timing pulses. This first counting circuit means includes a 27:1 counter 41. The input terminal of this counter 41 is connected to the $F_0$ output terminal of the clock pulse generator 40 so that the counter 41 may count the $F_0$ timing pulses to produce various word-rate timing pulses, that is, timing pulses which occur once each word. Note that each word interval contains 27 bit intervals. Consequently, 27 $F_0$ pulses are required to designate a word interval. The 27:1 counter 41 includes five binary flip-flop states coupled in a cascade manner with one another. In order to reduce the counting range of such a five stage binary counter from its normal 32:1 value to the desired 27:1 value, suitable inter-stage feedback connections are provided to eliminate five of the various possible binary combinations. One way of doing this is to start the counter with a binary count of "10100" (i.e., the binary number 5) and then count the incoming $F_0$ pulses in the normal binary manner so that the last flip-flop stage will produce an output "carry" pulse 27 counts later. This output "carry" pulse is then fed back to the earlier counter stages to reset the counter to the desired initial "10100" condition.

Operating in conjunction with the 27:1 counter 41 to provide the various sets of word-rate timing pulses is a bit matrix 42. This bit matrix 42 is a diode matrix network. It receives parallel outputs from both sides of each of the five flip-flop stages of the counter 41. Consequently, it can provide 27 different output lines with each output line being energized only for a particular one of the 27 bit intervals (B1–B27) of each word. Thus, each output line will provide a bit length timing pulse once each word for its corresponding bit interval. Timing pulses are not required for all 27 bit intervals and, consequently, bit matrix 42 has less than 27 output lines.

The decoder system of FIG. 3 further includes circuit means responsive to the pulse code signal for producing a control pulse for each occurrence of a word synchronizing bit pattern and for supplying these control pulses to the first counting circuit means for synchronizing the counting action thereof with the word synchronizing bit patterns. This circuit means includes a word synchronizer unit 43 which is responsive to the pulse code signal indications provided by the first three stages R25–R27 of the shift register 33 together with the pulse code signal indications provided by the amplifier 31 for producing an output word sync control pulse during the occurrence of a word synchronizing bit pattern. This word sync control pulse is supplied by way of an OR circuit 44 to the reset terminal of the 27:1 counter 41. This control pulse resets the counter 41 to the initial "10100" condition. Consequently, the counter 41 is caused to begin its counting operation at the same moment that the first bit interval of each word reaches the input to the shift register 33. The subsequent counting action of counter 41 then proceeds in step with the successive bit intervals supplied to the shift register 33. Various bit-rate timing pulses utilized by the word synchronizer 43 are supplied thereto by the bit matrix 42. The word synchronizer 43 will be considered in greater detail hereinafter.

The timing circuit means of the FIG. 3 decoder system also includes a second counting circuit means coupled to the first counting circuit means for developing frame-rate timing pulses. This second counting circuit means includes a 64:1 counter 45. The input of counter 45 is connected to the last stage of the 27:1 counter 41 so that the word-rate "carry" pulses produced by this last stage constitute the input pulses for the first stage of the 64:1 counter 45. Counter 45 includes six binary flip-flop stages connected in cascade. Thus, 64 input pulses are required in order to produce a complete cycle of operation of the counter 45. Since 64 words constitute a minor frame interval, one complete counting cycle of the counter 45 corresponds to an interval of minor frame length. Parallel outputs are taken from both sides of each stage of the 64:1 counter and are coupled to the programmer 35 for supplying thereto timing pulses at a minor frame rate.

The decoder system of FIG. 3 also includes circuit means responsive to the pulse code signal for producing a control pulse for each occurrence of a frame synchronizing bit pattern and for supplying these control pulses to both the first and the second counting circuit means for synchronizing the counting actions thereof with the frame synchronizing bit patterns. This circuit means includes a frame synchronizer unit 46. This frame synchronizer 46 is responsive to the parallel pulse code signal indications provided by the shift register 33 for producing a minor frame sync control pulse during the occurrence of a minor frame synchronizing bit pattern. This minor frame sync control pulse is supplied by way of an OR circuit 47 to the reset terminal of the 64:1 counter 45. This control pulse resets the 64:1 counter 45 to its initial zero count condition so that the counter 45 may begin its counting action just as the first word of each minor frame reaches the input of the shift register 33. This minor frame sync control pulse is also supplied by way of the OR circuit 44 to the reset terminal of the 27:1 counter 41. Consequently, a minor frame sync control pulse will establish synchronization of the 27:1 counter 41 as well as the 64:1 counter 45. The frame synchronizer 46 will be considered in greater detail hereinafter.

The timing circuit means of the FIG. 3 decoder system also includes a third counting circuit means coupled to the second counting circuit means for developing major frame rate timing pulses. This third counting circuit means is represented by a 4:1 counter 48. This counter 48 includes two binary flip-flop stages coupled in cascade. The input flip-flop stage is coupled to the last stage of the 64:1 counter 45 so that the minor frame "carry" pulses produced thereby serve as the input pulses for the 4:1 counter 48. Four minor frame "carry" pulses are required to drive the 4:1 counter 48 through a complete counting cycle, this 4:1 ratio corresponding to the number of minor frames per major frame. Parallel outputs are taken from both sides of each stage of the 4:1 counter 48 and are coupled to the programmer 35 for supplying thereto major frame rate timing pulses.

The decoder system of FIG. 3 additionally includes circuit means responsive to the pulse code signal for producing a control pulse for each occurrence of a major frame synchronizing bit pattern and for supplying these control pulses to each of the first, second and third counting circuit means for synchronizing the counting actions thereof with the major frame synchronizing bit patterns. This synchronizing circuit means is included in the frame synchronizer 46. The resulting major frame sync control pulses are supplied directly to the reset terminal of the 4:1 counter 48 to reset this counter to a zero count condition at the same moment that the first minor frame of each major frame reaches the input of the shift register 33. This major frame sync control pulse is also supplied by way of OR circuits 47 and 44 to the reset terminals of each of the counters 45 and 41. Consequently, a major frame sync control pulse will also produce synchronization of the counters 41 and 45.

The fact that each higher order sync control pulse also serves to establish synchronization of the lower ranking timing circuit counters increases the synchronization reliability, the speed of obtaining synchronization and the ability to maintain synchronization once it is established.

Considering now the operation of the FIG. 3 decoder system, it will initially be assumed that the pulse code signal which it is desired to decode is being supplied by the receiver 20. This pulse code signal is composed of a succession of major frame intervals. Each major frame interval includes one or more samples of each of the 200 transmitted information channels. Each sample is represented by an 8-digit or 8-bit pulse group, this pulse group being designated as a "syllable." This pulse code signal is supplied via switch 26a and input terminal $T_1$ to the input circuits 30 wherein it is, among other things, filtered and reshaped to provide a single pulse code signal of improved wave shape. This improved or regenerated signal which, like the initial $T_1$ input signal, is of the non-return-to-zero (NRZ) type is then converted to a return-to-zero (RZ) signal by the sampling gate 32. The resulting RZ pulse code signal is then read into the shift register 33 in a serial manner. Parallel output lines from the last 24 states, R1–R24, of shift register 33 are coupled to the decommutator 34 to periodically provide a simultaneous indication of the 24 information bits (three syllable groups) contained in each word. The decommutator 34 is periodically actuated to accept the 24 parallel output signals from shift register 33 at the proper moment, namely, when these 24 output signals correspond to the 24 information bits or a word. The decommutator 34 separates the 24 information bits of each word into three 8-bit syllable groups. The decommutator 34 then supplies each of the 8-bit syllable groups which corresponds to an information channel which it is desired to monitor to the appropriate one of the fifty different output signal channels. The 8-bit syllable group supplied to any given output signal channel is then converted to an analog signal by means of a digital-to-analog converter. The resulting analog signal is then supplied to an indicating device for providing an indication of the data value in the corresponding information channel. Thus, the output indicating device $M_1$ of the first output signal channel provides an indication of the data value in a first of the transmitted information channels, the indicating device $M_2$ provides an indication of the data value in a second of the transmitted information channels, and so on for the 48 other indicating devices $M_3$–$M_{50}$.

With 50 different indicating devices, any 50 of the 200 transmitted information channels may be monitored. The present system is so flexible than any one of the transmitted information channels may be displayed on any one of the indicating devices $M_1$, $M_2$, etc. Thus, only the channels of interest, out of a complete 200 channel program, need be monitored at any particular location or by any given observer. This, of course, permits a reduction of equipment size and complexity where an observer is only interested in a portion of the complete program. This is particularly true where the received signal is recorded on magnetic tape and, during any given playback of the tape, only selected ones of the information channels are required for a particular interpretation or observation procedure. If, of course, it is desired to monitor all 200 channels at the same time, then 150 additional output channels may be provided.

Another feature of the present decoder system is the ease with which it may be tied in with various types of automatic data processing or computing equipment. If, for example, it is desired to supply one or more of the output signals from the decoder system to an analog type of data processing or computing apparatus, then the corresponding ones of the decoder indicating devices $M_1$, $M_2$, etc. are removed and the output signals from the corresponding ones of the filters 37a, 37b, etc. are supplied directly to such data processing apparatus. If, on the other hand, the subsequent data processing equipment is of the digital type, then the digital-type 8-bit syllable groups appearing at the appropriate groups of output terminals of the decommutator 34 may be supplied directly to such data processing equipment. In other words, the decoder system of the present invention provides both analog and digital type output signals for each of the monitored information channels.

The switching action in the decommutator 34 as well as the converting action in the sampling gate 32 and the shifting action in the shift register 33 are controlled by the various timing pulses developed by the various portions of the local timing circuits. Thus, clock pulse generator 40 provides the timing pulses for controlling the conversion action in the sampling gate 32 and the shifting action in the shift register 33. Counters 41, 45 and 48, on the other hand, together with the programmer 35, control the switching action in the decommutator 34. Synchronization of these various portions of the local timing circuits with the incoming pulse code signal are provided internally in the clock pulse generator 40 and by the word synchronizer 43 and the frame synchronizer 46.

At the same time that the decoder system is being used to provide output indications of selected ones of the 200 odd formation channels in the received signal, the tape recorder 21 is operated to provide a permanent record of the complete received signal. To this end, the regenerated NRZ-type signal appearing at the output of amplifier 31 is supplied by way of switch 26b and the recording portion of the record-playback circuit 25a to the recording head 23a. This causes the recording head 23a to record the complete signal in a first track on the magnetic tape 22. At the same time, the regenerated NRZ signal is also supplied by way of the switch 26c and the recording portion of the record-playback circuit 25b to the second recording head 23b. Consequently, the complete signal is also recorded in a second track on the magnetic tape 22. At the same time, a timing signal or synchronizing signal $T_s$ generated within the clock pulse generator 40 is supplied by way of the switch 26d and the recording portion of the record-playback circuit 25c to the third recording head 23c. Consequently, this $T_s$ synchronizing signal is recorded on a third track of the magnetic tape 22.

Assuming now that it is desired to play back and decode a pulse code signal previously recorded on the magnetic tape 22, then each of the switches 26a, 26b, etc. is set to the upper of its two positions. The signal recorded in the first track on the magnetic tape 22 is supplied to the $T_1$ terminal of input circuits 30, while the signal recorded in the second track is supplied to the $T_2$ input terminal. Note that in this mode of operation the receiver 20 is not connected to the input circuits 30. Also the playback replica $T_s'$ of the timing signal $T_s$ previously recorded in the third track is now supplied back to the clock pulse generator 40 over the $T_s'$ line to synchronize the operation of the generator 40 therewith. In particular, the $T_s'$ signal is used to adjust the basic operating frequency of the generator 40 so that the subsequent decoding operations will not be appreciably affected by undesired variations in the speed of the magnetic tape 22 during either the recording or the playback operation.

The remainder of the decoder system circuits operate in the same manner as previously considered for the case where the pulse code signal is being supplied by the receiver 20.

INPUT CIRCUITS

Referring now to FIG. 4 of the drawings, there is shown in greater detail the construction of the input circuits 30 of the FIG. 3 decoder system. As previously indicated, two separate input terminals $T_1$ and $T_2$ are provided to take care of the case where the pulse code signal is being obtained from a tape recorder where the complete signal is recorded in each of two different tracks on the tape. Except for errors introduced by the tape recorder, these two input signals $T_1$ and $T_2$ are identical and each is of the NRZ-type as indicated in FIG. 1D. If the incoming pulse code signal is being supplied directly from the receiver 20, as opposed to tape playback, then only a single one of the $T_1$ and $T_2$ input terminals is utilized.

Coupled in cascade with the $T_1$ input terminal are a filter 50, a delay circuit 51, an amplifier 52, a slicer circuit 53 and a differentiating circuit 54. In a similar manner, there is coupled in cascade with the $T_2$ input terminal a filter 55, a delay circuit 56, an amplifier 57, a slicer 58 and a differentiating circuit 59. Filters 50 and 55 are of the low-pass type and, for a bit rate 172.8 kilocycles, have a cut-off frequency of approximately 95 kilocycles. This corresponds roughly to one-half of the bit rate. By limiting the frequency bandwidth, these filters serve to reduce the amount of undesired electrical noise that can get through to the subsequent circuits. Delay circuits 51 and 56 are of the adjustable or variable type. Each provides from zero to ten microseconds of time delay. They are initially adjusted to eliminate the static skew between the three tape recorder tracks. This places the three signals (two NRZ signals and one $T_s'$ timing signal) exactly in step with one another as far as any static misalignment of the tape recorder heads is concerned. Each of the slicer circuits 53 and 58 serves to reproduce a narrow amplitude slice of the corresponding NRZ signals near their mid-amplitude points. Thus, fairly sharp signal transitions are obtained at the outputs of slicers 53 and 58. Differentiating circuits 54 and 59 each serve to produce sharp positive-going and negative-going pulses corresponding to the positive-going and negative-going transitions in the respective sliced data signals.

The positive-going pulses appearing at the outputs of differentiating circuits 54 and 59 are supplied by way of clipping circuits 60 and 61 to a common OR circuit 62. OR circuit 62 serves to add these two sets of pulses to produce a single set or train of positive-going pulses. In a similar manner, the negative-going pulses from differentiating circuits 54 and 59 are supplied by way of clipping circuits 63 and 64 to a common OR circuit 65. OR circuit 65 adds these two sets of pulses to produce a single set of negative-going output pulses. The positive-going output pulses from the OR circuit 62 are then supplied to the "one" input terminal of a binary flip-flop circuit 66 to set this circuit to its "one" state upon each occurrence of a positive pulse. The negative-going pulses from OR circuit 65, on the other hand, are supplied by way of an inverter circuit 65a to the "zero" input terminal of the flip-flop circuit 66 to set this circuit to a "zero" state each time a negative-going pulse occurs. As a result, the output signal taken from the "one" side of flip-flop 66 corresponds to the desired regenerated pulse code signal. This output signal from the flip-flop circuit 66 is of the NRZ type.

Since the two input signals supplied to the $T_1$ and $T_2$ input terminals of input circuits 30 are, in the absence of errors, identical to one another, the same results would be obtained if only a single one of these input signals is present. The use of two signals and two sets of input stages, however, serves to minimize certain tape recorder errors, such as tape drop-out. In this regard, it is highly improbable that tape drop-out will occur in each of the two data signal tracks at the same time. Consequently, there will almost always be at least one input signal for driving the flip-flop circuit 66.

CLOCK PULSE GENERATOR

Figure 5:
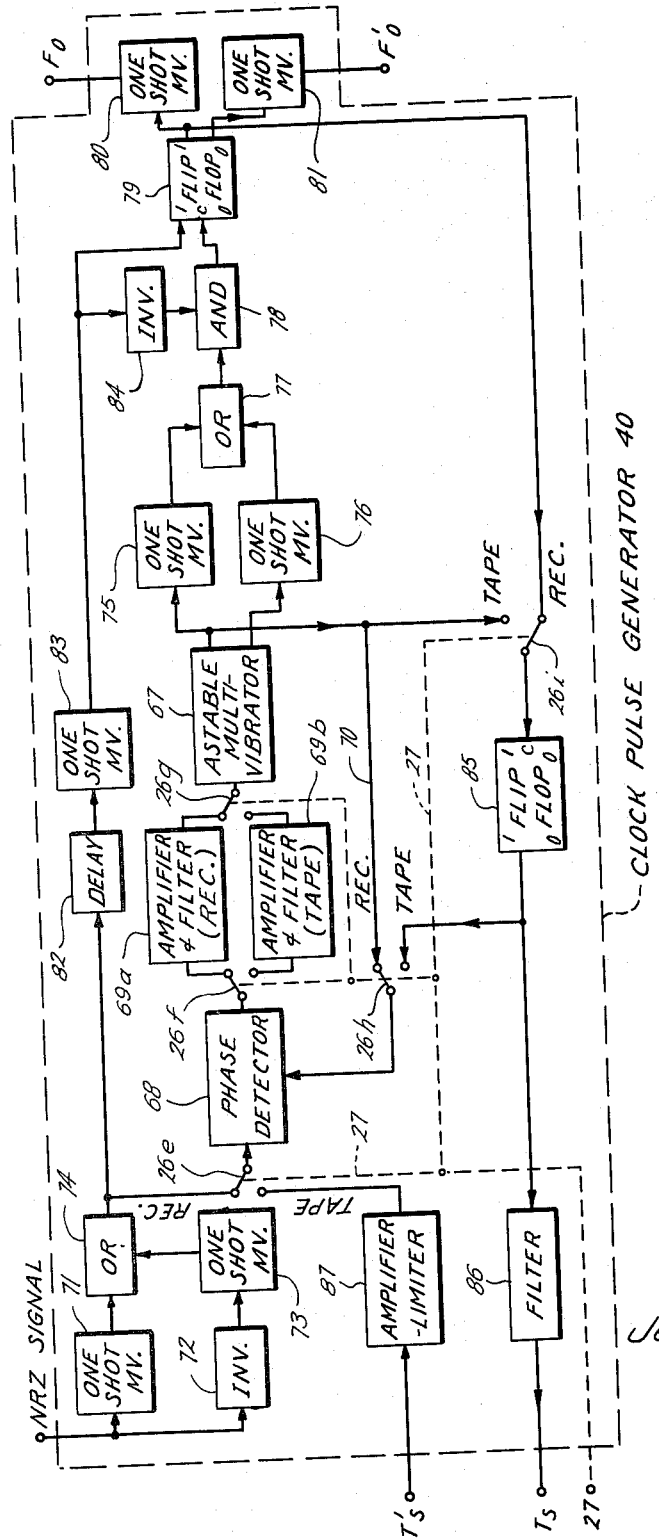
FIG. 5 is a detailed block diagram of the clock pulse generator of the FIG. 3 decoder system.

Referring now to FIG. 5 of the drawings, there is shown in greater detail the construction of the clock pulse generator 40 of the FIG. 3 decoder system. This clock pulse generator 40 includes a free-running type of oscillator circuit means together with means for synchronizing the oscillations thereof with the bit intervals in the incoming pulse code signal. These oscillations are then used to produce the $F_0$ and $F_0'$ bit-rate timing pulses, the $F_0$ pulses occurring approximately at the boundaries between bit intervals and the $F_0'$ pulses occurring approximately midway in the bit intervals.

The clock pulse generator 40 is capable of two somewhat different modes of operation, depending on whether the decoder system is to be synchronized directly from the incoming pulse code signal itself or whether part of the synchronization is to be provided by a separate timing signal recorded on magnetic tape. The first case is the necessary one where the incoming signal is being supplied by the receiver unit 20 of FIG. 3. The second case, on the other hand, is the preferred one where the incoming signal is obtained from the tape recorder 21 of FIG. 3. To this end, the clock pulse generator 40 of FIG. 5 includes various single-pole double-throw switches 26e–26i which, as indicated schematically by dash-line 27, are mechanically ganged to the selector switches 26a–26d of FIG. 3. In FIG. 5, the designation "REC." denotes the switch positions used when the incoming signal is supplied by the receiver 20, while the designation "TAPE" indicates the switch positions which are used when the incoming signal is obtained from the tape recorder 21. It will initially be assumed that the incoming pulse code signal is being supplied by receiver 20 and, consequently, that switches 26e–26i are in the "REC." positions, as is illustrated in FIG. 5.

The basic oscillating elements in the clock pulse generator 40 is represented by an astable multivibrator 67. This astable or free-running multivibrator 67 is constructed to oscillate at a nominal frequency of 172.8 kilocycles per second. In order to synchronize these local oscillations, both in frequency and in phase, with the bit intervals in the incoming pulse code signal, the clock pulse generator 40 utilizes two somewhat different synchronization mechanisms. The first of these is an indirect comparison-type mechanism which is provided by an automatic phase control loop. This automatic phase control loop is formed by phase detector 68, amplifier and filter 69a, astable multivibrator 67 and a feedback connection 70 which couples the output of the astable multivibrator 67 back to the phase detector 68. The other sychronization mechanism is a direct drive type of mechanism whereby the individual signal transitions in the pulse code signal are used to directly control the oscillations developed by the astable multivibrator 67.

In order to provide the desired synchronization, the NRZ data signal, as it appears at the output of amplifier 31 (FIG. 3), is supplied to a first input terminal of the clock pulse generator 40. A typical example of this NRZ data signal is indicated by waveform 6a of FIG. 6. This NRZ signal is supplied to a one-shot multivibrator 71 and to an inverter circuit 72. The one-shot multivibrator 71 is triggered by each positive-going transition in the NRZ signal to produce an output pulse of relatively short duration. The inverter replica of the NRZ signal appearing at the output of inverter 72 is supplied to a second one-shot multivibrator 73. This multivibrator 73 is triggered by each positive-going transitions in the inverted signal (negative-going transition in the original signal) to produce an output pulse of relatively short duration. The pulses from both multivibrators 71 and 73 are then combined by an OR circuit 74 to produce a train of so-called "edge" pulses. Each edge pulse corresponds to a transition (either positive-going or negative-going) in the incoming NRZ signal. These edge pulses are represented by waveform 6b of FIG. 6. As there shown, the leading edge of each edge pulse, coincides with the boundary between two adjacent bit intervals in the NRZ signal. Note that an edge pulse is not produced at a bit boundary which does not have an NRZ signal transition.

These edge pulses are supplied to a first input of the phase detector 68. At the same time, there is supplied to a second input of the phase detector 68 by way of conductor 70 the locally-generated square wave signal generated by the astable multivibrator 67. This signal is represented by waveform 6c in FIG. 6. Phase detector 68 serves to compare these two signals and, if their basic repetition frequencies and phases are not the same, produces a low-frequency type of output signal having a direct-current component which is representative of the magnitude of the error. This error component is supplied by way of the amplifier and filter 69a to a bias voltage input terminal of the astable multivibrator 67. This error component serves to alter a control bias in the multivibrator 67 and, hence, to alter its frequency of oscillation. More particularly, the polarities around the phase control loop are such that the frequency change is in the direction to reduce the frequency difference between the basic edge pulse frequency (basic bit interval rate) and the frequency of the locally-generated signal for multivibrator 67. Similar considerations apply to purely phase differences except that phase and not frequency is the parameter that is adjusted. Exact synchronization prevails when the edge pulses and the astable multivibrator signal have the relative relationships indicated by waveforms 6b and 6c of FIG. 6. As there indicated, exact synchronization occurs when the positive transitions in the multivibrator waveform occur midway during the occurrences of the edge pulses. $\phi_0$ designates the slight phase offset between the bit interval boundaries and the corresponding positive-going transitions in the multivibrator waveform. This phase offset is produced by the finite width of the edge pulses and is equal to one-half of the width of an edge pulse.

The gain and frequency characteristics of the amplifier and filter 69a are constructed to provide the desired synchronization accuracy and synchronization holding ability over the range of frequency variations likely to be encountered when the pulse code signal is being obtained from the receiver 20. In particular, once synchronization has been achieved, it is desirable that the operating frequency and phase of the astable multivibrator 67 should not change very rapidly if the NRZ signal is lost for a short interval of time because of signal fading or the like. It would be desirable, for example, if loss of the signal for a length of time corresponding to a major frame interval would not result in a phase error greater than one-fourth of a bit interval. Proper selection of the filter time constants (frequency characteristics) will achieve this purpose. Care must be exercised, however, to be sure that these time constants are compatible with the range of frequency variation likely to be encountered since the frequency pull-in range of the automatic phase control loop bears an inverse relationship to the loop integration time. The necessary range of frequency variation is determined primarily by the stability of the oscillator at the transmitting station as well as the stability of the astable multivibrator 67.

The square-wave output signal from one side of the astable multivibrator 67 is supplied to a one-shot multivibrator 75, while the square-wave signal from the other side is supplied to a one-shot multivibrator 76. Each of these multivibrators 75 and 76 is triggered by positive-going signal transitions to produce output pulses of relatively short duration. These pulses are combined by an OR circuit 77 to produce the composite pulse train indicated by waveform 6d of FIG. 6. Because of the 180° phase shift between the two sides of the astable multivibrator 67, this pulse train includes a pulse for every transition in the signal from a single side of the astable multivibrator 67, whether positive-going or negative-going. These pulses are supplied by way of an AND circuit 78 to the common input of a flip-flop circuit 79. These pulses drive the flip-flop 79 back and forth between its two stable states. This produces at the "one" side output terminal of flip-flop 79 a square-wave signal as represented by waveform 6f and at the "zero" side output an identical square-wave signal of inverted polarity. The "one" side output is used to drive a one-shot multivibrator 80 which produces a basic $F_0$ timing pulse for each positive-going transition in such flip-flop 79 output. The positive-going transistions in the "zero" side output of flip-flop 79, on the other hand, trigger a one-shot multivibrator 81 to produce the $F_0'$ timing pulses. These $F_0$ and $F_0'$ pulses are represented, respectively, by waveforms 6g and 6h of FIG. 6. The $F_0$ pulse occur at approximately the bit interval boundaries while the $F_0'$ pulses occur approximately midway during the bit intervals. The degree of approximation depends on the magnitude of the phase offset $\phi_0$.

The relatively long time constants required in the phase control loop to maintain the existing frequency and phase of the astable multivibrator 67 for a relatively long period of time following the loss of the NRZ signal gives rise to the disadvantage that a relatively long period of time is required to regain synchronization once it is lost. In order to overcome this disadvantage, the clock pulse generator 40 is also provided with a direct drive type of synchronizing mechanism which operates to rapidly reset the phase of the $F_0$ and $F_0''$ timing signals upon the return of the incoming NRZ signal. This direct drive mechanism includes a delay circuit 82 and a one-shot multivibrator 83. Delay circuit 82 serves to delay the edge pulses appearing at the output of OR circuit 74 by a time factor equal to one-half the width of an edge pulse. This time delay thus corresponds to the phase offset $\phi_0$. The delayed edge pulses appearing at the output of delay circuit 82 are represented by waveform 6e of FIG. 6. As there indicated, their leading edges are in step with the desired locations of the positive-going signal transitions at the upper output of the astable multivibrator 67 (waveform 6c). These leading edges are used to trigger the one-shot multivibrator 83 to produce pulses of approximately the same duration as the edge pulses. These pulses from multivibrator 83 are supplied to the "one" side input of flip-flop 79 and the leading edges thereof are effective to reset this flip-flop to its "one" state. These pulses are also supplied by way of an inverter circuit 84 to the AND circuit 78 for the purpose of disabling AND circuit 78 for the duration of each of these pulses. This prevents the flip-flop 79 from being returned too quickly to its "zero" state by a pulse from the OR circuit 77. Since the reset of flip-flop 79 to its "one" state by a pulse from multivibrator 83 occurs approximately at the bit interval boundary, this restricts the following $F_0'$ pulse more nearly to the middle portion of the bit interval. Apart from its fast phase reset feature, the output from multivibrator 83 also serves to restore the sense of polarity which is lost when the two outputs from the astable multivibrator 67 are combined in the OR circuit 77.

The unique advantage of the fast phase reset feature can be better appreciated by considering the case where the incoming NRZ signal is lost for a relatively long period of time. In this case, the frequency of the astable multivibrator 67 will, in all probability, have drifted slightly. This slight frequency drift over a relatively long time interval will produce a relatively large phase error. The occurrence of the first phase reset pulse from multivibrator 83 upon the reappearance of the NRZ signal will then immediately rephase the flip-flop 79 to approximately the correct condtion. Subsequent resets will then serve to maintain this condition until the automatic phase control loop has had sufficient time to restore correct synchronization of the astable multivibrator 67.

For cases where the fast phase reset feature is not required, this feature may be eliminated by omitting circuit elements 77–84 and using the outputs of one-shot multivibrators 75 and 76 to provide the $F_0$ and $F_0'$ timing pulses.

In order to generate the $T_s$ timing or synchronizing signal which is to be recorded on the timing track of the magnetic tape, the "one" side output of the flip-flop circuit 79 is supplied by way of switch 26i to a second flip-flop circuit 85. The positive-going transitions in this output from flip-flop 79 serve to switch flip flop 85 back and forth between its two stable states. The output from flip-flop 85 is represented by waveform 6i of FIG. 6. As there seen, its frequency is one-half the frequency of the output signal from flip flop 79. This output from flip flop 85 is supplied to a filter circuit 86. The frequency bandwidth of filter 86 is made low enough so that the output therefrom is an approximately sinusoidal signal of the same frequency as the basic frequency of the output signal from flip flop 85. This signal is represented by waveform 6j and is used as the $T_s$ synchronizing signal which is supplied to the tape recorder 21 of FIG. 3.

Considering now the manner in which the clock pulse generator 40 operates when the decoder system is receiving its input from the playback of a tape recorder signal, it is first noted that in this case the switches 26e–26i of the clock pulse generator 40 are set to the positions indicated by the designation "TAPE". In this mode of operation, the $T_s'$ timing signal obtained from the timing track on the magnetic tape is used to drive the automatic phase control loop associated with the astable multivibrator 67. To this end, the $T_s'$ signal is supplied to an amplifier-limiter 87 which amplifies and clips this signal thereby to generate a corresponding square-wave signal as indicated by waveform 6k of FIG. 6. This square-wave signal is then supplied by way of switch 26e to the phase detector 68. Since the squared $T_s'$ signal is of one-half the frequency of the astable multivibrator 67, the output from multivibrator 67 is not supplied directly back to the phase detector 68. Instead, it is supplied by way of the second flip-flop circuit 85 which functions as a 2:1 frequency divider. This half-frequency signal from flip-flop 85 is represented by waveform 6m. The phase detector 68 serves to compare this signal with the squared $T_s'$ signal from amplifier-limiter 87 to produce an output error signal in the case of either frequency or phase errors. This error signal is supplied by way of a second amplifier and filter 69b to the astable multivibrator 67 to adjust its frequency and phase so as to reduce the error to within the desired limits.

Since undesired tape speed variations can produce relatively large frequency errors, the gain and frequency characteristics (time constants) of the filter 69b are constructed primarily to provide the greater frequency pull-in range thus required. The circuit requirements are not as stringent as might be expected, however, because the synchronization holding requirements are not as severe. This is because the $T_s'$ signal will always be present, except for the infrequent occurrence of a momentary signal loss due to tape drop-out. In general, the time constants will be smaller.

Waveforms 6k and 6m illustrate the relative relationship between the squared timing signal from amplifier-limiter 87 and the locally-generated signal from flip-flop 85 when exact synchronization exists. This condition is indicated by the occurrence of minimum error signal at the output of phase detector 68.

In order to provide the necessary output for flip-flop 85, the astable multivibrator 67 must provide a waveform as indicated by waveform 6n. This waveform is the same as that generated where the NRZ signal is being supplied by the receiver 20 except that it is 180° out of phase therewith. Ignoring the polarity, however, the signal transitions in the two cases occur at the same times. Consequently, as before, the astable multivibrator 67 is used to drive the one-shot multivibrators 75 and 76 and the circuits subsequent thereto to generate the desired $F_0$ and $F_0'$ timing pulses.

The direct drive synchronization mechanism for the case of tape playback is again provided by the NRZ signal. This NRZ signal, which at this time is being received from the data tracks on the magnetic tape, drives the one-shot multivibrators 71 and 73 to produce the appropriate train of edge pulses at the output of OR circuit 74. These edge pulses are supplied by way of delay circuit 82 to the one-shot multivibrator 83 to generate corresponding phase reset pulses for the flip-flop circuit 79. This phase reset provides the correct sequence of "zero" and "one" alternations in the flip-flop 79. Also, since this phase reset is derived from the data signals in the first and second tracks on the magnetic tape, it serves to correct for any dynamic skew that may momentarily exist between these tracks and the $T_s$ timing signal track on the magnetic tape.

The advantages of the tape speed compensation provided by the automatic phase control loop in the tape playback mode may be seen by considering the effect that such tape speed variations have on the decoding operations of the main portion of the decoder system. During tape playback, any variations in tape speed will cause the pulse code signal supplied to the decoder system to have the wrong bit interval rate. However, under the control of the $T_s'$ timing signal, the automatic phase control loop in the clock pulse generator 40 serves to alter the frequency or occurrence rate of the basic $F_0$ and $F_0'$ timing pulses so as to keep these pulses in step with the actual bit interval rate in the pulse code signal. This, in turn, alters the timing of the decoding operations so that they likewise remain in step with the pulse code signal even though such signal is undergoing substantial variations in its bit interval rate due to the undesired variations in tape speed.

SAMPLING GATE

Referring back to FIG. 3, the sampling gate 32, as previously mentioned, serves to convert the NRZ-type pulse code signal to an RZ type of signal. This is done by using the $F_0'$ timing pulses from the clock pulse generator 40 to periodically activate the sampling gate 32 to enable it to produce an output pulse if the NRZ signal is at the "one" level. The timing for this sampling operation is indicated by the waveforms of FIG. 6A. As there indicated, the $F_0'$ pulses occur approximately midway during the bit intervals. If the NRZ data signal is at the "one" level, the sampling gate 32 will produce an output pulse of the same duration and at the same time as the $F_0'$ pulse. If, on the other hand, the NRZ signal is at the "zero" level, no output pulse will be produced.

A feature of this sampling or gating operation is the fact that small variations in the phase of the $F_0'$ pulse will not disturb the operation of the remainder of the decoder system. In particular, the $F_0'$ pulse may vary over a range as indicated by the cross-hatched interval of duration $\Delta \phi$ without upsetting the decoding operation. This is approximately the range to which the $F_0'$ pulse is limited by the direct-drive phase reset mechanism of the clock pulse generator 40.

WORD SYNCHRONIZER

Referring now to FIG. 7 of the drawings, there is shown in greater detail the construction of the word synchronizer 43 of the FIG. 3 decoder system. This word synchronizer 43 serves to detect the word synchronizing bit patterns in the incoming pulse code signal for purposes of synchronizing the timing of the 27:1 counter 41 with the occurrence of these word sync bit patterns. In addition to detection of the word sync patterns, the word synchronizer 43 serves to analyze these word sync patterns and correlate the number of errors therein with the noise bandwidth of the circuits which supply the pulse code signal in order both to obtain and to maintain synchronization with a relatively noisy pulse code signal. To this end, the word synchronizer 43 is provided with three distinct operating modes for providing optimum operation for various signal conditions. Which of these modes the synchronizer 43 is operating in at any given moment depends upon the state of synchronization of the synchronizer 43 and the condition of the incoming pulse code signal.

As shown in FIG. 7, the word synchronizer 43 includes various binary logic circuits such as flip-flop circuits (FF), AND circuits, OR circuits, inverter circuits (INV.), etc. At any given point in a binary system such as this, only two signal levels are recognized. One of these signal levels is called a "zero" level, while the other is called a "one" level. The absolute values of these levels in terms of voltages and currents is immaterial as far as the binary logic is concerned. Where voltage levels are involved, the higher or more positive of the two voltage levels is often referred to as the "one" level, though this choice is purely a matter of convenience. Consequently, it should be noted that a statement that a given signal has a binary "zero" value or that a given point in the circuits is at a binary "zero" level does not necessarily mean that the signal has a value of zero volts or that the circuit point is at a zero voltage level. In fact, the contrary will frequently be the case. Similarly, reference to a binary "one" value or a binary "one" level is not intended to indicate a voltage level of one volt. Also, the absolute values of the "zero" and "one" levels at one point in the system do not have to be the same as the absolute values of these levels at another point in the system.

In order to more readily understand the binary logic, certain conventions will be adopted. With respect to a flip-flop circuit (FF), a statement that the circuit is in the "one" state means that the "one" output terminal of the circuit is at the binary "one" level while the "zero" output terminal is at the binary "zero" level. Conversely, when the flip-flop circuit is said to be in a "zero" state, then the "zero" output is at a "one" level and the "one" output is at a "zero" level.

With respect to an AND circuit, it is understood that the application of a binary "one" level to an input terminal thereof serves to activate the AND circuit as far as that input terminal is concerned. It is understood, of course, that, for a multiple input AND circuit, it is necessary for all input terminals to be at a binary "one" level to produce an output signal, i.e., an output "one." On the other hand, the application of a single "zero" level to a single one of the various input terminals will disable the AND circuit regardless of the signal levels applied to the remainder of the input terminals. Thus a single "zero" input results in a "zero" output.

With respect to an OR circuit, such circuit produces a "one" output indication any time one or more of its input terminals is at a "one" level. It produces a "zero" output only when all of its input terminals are at a "zero" level.

With respect to an inverter circuit (INV. or I), such circuit inverts the binary polarity. It produces a binary output value of "zero" when the binary input value is "one," and vice versa.

When the signals are spoken of in terms of "pulses," then the presence of a pulse corresponds to the presence of a binary "one" value, while the absence of a pulse indicates a binary "zero" value.

Considering the detailed construction of the word synchronizer 43 as shown in FIG. 7, this word synchronizer 43 includes circuit means for periodically sampling the incoming pulse train for detecting the presence of word synchronizing bit patterns and for synchronizing the local timing circuit means (units 40, 41, 45 and 48 of FIG. 3) therewith. This sampling circuit means includes circuit means responsive to the incoming pulse code signal for producing a word sync control pulse for each signal interval containing a bit pattern corresponding to an error-free word synchronizing bit pattern. This control pulse circuit means includes a three input coincident circuit or AND circuit 90. The inputs to this AND circuit 90 are obtained from the first three binary stages, R27–R25, of the shift register 33. The use of the "prime" symbol in the designation of input R27' denotes that this input is obtained from the complementary side or "zero" side of the binary stage R27 of shift register 33. In other words, the input line R27' provides a binary "one" indication when the binary stage R27 is in a "zero" condition. Consequently, when the pulse code bits occupying shift register stages R25–R27 correspond to the "110" word sync pattern, all three inputs to the AND circuit 90 are simultaneously energized. This causes the AND circuit 90 to provide at its output a word sync control pulse. This control pulse is supplied to an AND circuit 91 which also has supplied to a second input terminal thereof the $F_0'$ bit-rate timing pulses occuring during the middle of the bit intervals. AND circuit 91 thus produces a narrowed word sync control pulse corresponding to an $F_0'$ timing pulse whenever the AND circuit 90 is supplying the wider sync control pulse to the first input of AND circuit 91.

The sampling circuit means of the word synchronizer 43 also includes gating circuit means for supplying, when in an activated condition, the word sync control pulses to the local timing circuit means for synchronizing the timing thereof. This gating circuit means includes a two input AND circuit 92, one input terminal of which is coupled to the output of AND circuit 91. When the AND circuit 92 is in an activated condition, i.e., when an input signal is being supplied to the second input terminal thereof, then the narrowed word sync control pulse produced by the AND circuit 91 is passed by the AND circuit 92 and supplied to the 27:1 counter 41 by way of an output line 93.

The sampling circuit means also includes circuit means coupled to the timing circuit means for activating the gating circuit means represented by AND circuit 92 during periodic intervals having the same periodicity as the word synchronizing bit patterns of the pulse code signal for enabling passage of the word sync control pulses by AND circuit 92. This activating circuit means includes an OR circuit 94 together with the portion of bit matrix 42 (FIG. 3) which produces a timing pulse during the Bit 27 (B27) interval of each word. These B27 timing pulses provide the periodic activation of AND circuit 92. For convenience, any output signal from OR circuit 94 is referred to as a "window." Such window or gating signal serve to activate AND circuit 92 and, thus, enable it to pass word sync control pulses.

The word synchronizer 43 of FIG. 7 also includes circuit means for shifting the time of occurrence of the sampling intervals when the synchronizing pulse errors during the sampling intervals exceed a predetermined value. This circuit means for shifting the sampling intervals includes a first counting circuit means coupled to the local timing circuit means and responsive to the pulse code signal for counting the number of erroneous synchronizing bits occurring during the periodic sampling intervals and for resetting itself to a zero count condition upon the occurrence of a predetermined number of such erroneous bits. This counting circuit means includes a 3:1 counter 95 for counting the number of bit errors during the sampling intervals. This counter 95 may be either a feedback type of binary counter or else a ring-type counter.

The input side of the 3:1 counter 95 is responsive to the incoming pulse code signal supplied by way of register stage R27 of shift register 33 and various binary logic circuits coupled thereto. In particular, the incoming pulse code signal, as reproduced across the output side or "one" side of register stage R27, is supplied by way of an inverter circuit 96 to a first input terminal of an AND circuit 97. Inverter circuit 96 serves to invert the polarity of the signal supplied to the input thereof. In terms of the binary logic, the inverter circuit 96 produces an output corresponding to a binary "zero" value when the input corresponds to a binary value of "one," and vice versa. Also supplied to the AND circuit 97 by way of a second input terminal thereof are B25 and B26 word-rate timing pulses which are obtained from the bit matrix 42 (FIG. 3) by way of an OR circuit 98. When the local timing circuits are properly synchronized, these B25 and B26 timing pulses occur during bit intervals 25 and 26 of each word. Regardless of the state of synchronization, AND circuit 97 will produce output signals during the occurrences of the B25 and B26 pulses if the input to the inverter circuit 96 is at a binary "zero" value during such occurrences. Since the presence of "zeros" in the pulse code signal during the occurrence of B25 and B26 timing pulses indicates that these pulse code bits are improper word sync bits, the output signals at the output of AND circuit 97 are error indicating signals.

The pulse code signal from register stage R27 is also supplied to an AND circuit 99. Supplied to a second input terminal of AND circuit 99 are B27 word-rate timing pulses obtained from the bit matrix 42 of FIG. 3. AND circuit 99 produces an output signal or pulse during the occurrence of the B27 timing pulse if the pulse code signal from register stage R27 at this moment has a binary value of "one." Since the pulse code signal should have a "zero" at this moment, such an output pulse is indicative of a word sync bit error.

The error indicating output signals from AND circuits 97 and 99 are supplied by way of an OR circuit 100 to an AND circuit 101. These signals serve to activate AND circuit 101 during any of the B25–B27 intervals during which the pulse code signal departs from the desired "110" word synchronizing bit pattern. The $F_0'$ bit-rate timing pulses are supplied to a second input terminal of the AND circuit 101. Assuming for the moment that the remaining input terminals of AND circuit 101 are energized at the "one" level, then AND circuit 101 serves to gate through an $F_0'$ timing pulse for each of the B25–B27 intervals which contains an erroneous synchronizing bit indication. These gated $F_0'$ pulses are supplied to the input terminal of the 3:1 counter 95. Counter 95 counts these error indicating pulses from AND circuit 101 and upon the occurrence of the third error pulse produces an output pulse which is supplied to a flip-flop circuit 102 for switching this flip-flop circuit 102 to the "one" state. The "one" output from flip-flop circuit 102 is then used to gate an AND circuit 103 to an activated condition. The $F_0$ bit-rate timing pulses are supplied to a second input terminal of the AND circuit 103. The first of these $F_0$ timing pulses which passes through the AND circuit 103 subsequent to the activation thereof constitutes a combination "reset" pulse and "mode switching" pulse. In the first place, this pulse from AND circuit 103 is supplied by way of an OR circuit 104 back to the 3:1 counter 95 and the flip-flop circuit 102. As thus supplied, this pulse serves to reset the 3:1 counter 95 to a zero count condition and to reset the flip-flop circuit 102 to a zero state. This output pulse from the AND circuit 103 is also supplied to an AND circuit 105 which passes this pulse to the output terminal thereof when it is in an activated condition. The pulse which is passed in this manner to the output of the AND circuit 105 is used as a mode switching pulse.

The circuit means for shifting the sampling intervals also includes circuit means for resetting the error counting circuit means and, in particular, the counter 95 to a zero count condition in the absence of a self-resetting thereof for a predetermined number of sampling intervals. This resetting circuit means comprises a second counting circuit means for producing a reset pulse when a predetermined number of word sync patterns have been examined by the first counting circuit means associated with counter 95. This second counting circuit means includes a second 3:1 counter 106 which is identical in construction to the first 3:1 counter 95. The input side of this second 3:1 counter 106 is coupled to an AND circuit 107. There is supplied to separate input terminals of this AND circuit 107 the $F_0'$ bit-rate timing pulses and the B1 word-rate timing pulses. Consequently, when AND circuit 107 is otherwise in an activated condition, the $F_0'$ pulse occurring during the B1 interval will be passed to the counter 106. Upon the passage of the third F₀' pulse thereto, the 3:1 counter 106 produces an output pulse which switches a flip-flop circuit 108 to a "one" state. The "one" output of flip-flop circuit 108 activates an AND circuit 109 which has supplied to a second input terminal thereof the F₀ bit-rate timing pulses. The first F₀ pulse to appear at the output of AND circuit 109 subsequent to the activation of this circuit by the flip-flop circuit 108 constitutes a combination reset and mode switching pulse. The reset function is provided by supplying this output pulse by way of the OR circuit 104 back to the counter 106 and the flip-flop circuit 108. This resets the counter 106 to a zero count condition and resets the flip-flop circuit 108 to a zero state. As will be seen, this output pulse at the output of AND circuit 109 is further used as a mode switching pulse.

The output pulse from AND circuit 109 is also supplied by way of the OR circuit 104 to the first counter 95 and the first flip-flop circuit 102 for resetting these units to their zero conditions. In a similar manner, any reset pulses produced at the output of AND circuit 103 by the first counter 95 also serve to reset the second counter 106 as well as the second flip-flop circuit 108 to a zero state or condition.

The circuit means for shifting the sampling intervals further includes circuit means coupled to the counting circuit means for activating the gating circuit means represented by AND circuit 92 for activating this gating circuit means upon the occurrence of a predetermined number of errors in the word synchronizing bit patterns and for maintaining this activation until the occurrence of a subsequent error-free word synchronizing bit pattern. This activating circuit means comprises a bi-stable mode control flip-flop circuit 110 which, when in a "one" state, supplies a continuous activating signal by way of OR circuit 94 to the second input terminal of the AND circuit 92. The "one" input terminal of the mode control flip-flop circuit 110 is coupled to the output AND circuit 105 associated with counter 95 so that flip-flop circuit 110 will be switched or set to the "one" state whenever a mode switching pulse appears at the output of AND circuit 105. The zero input terminal of this mode control flip-flop circuit 110 is coupled to the output of AND circuit 92. Consequently, any word sync control pulse which is gated through by the AND circuit 92 is also supplied to the flip-flop circuit 110 to set it to the "zero" state. The "zero" output of flip-flop circuit 110 is coupled back to AND circuits 101 and 107 of the counting circuit means for activating these AND circuits 101 and 107 when the mode control flip-flop circuit 110 is in a "zero" state and for disabling these circuits when flip-flop circuit 110 is in a "one" state.

The word synchronizer 43 also includes circuit means for disabling the interval shifting action when the error rate is less than the selected predetermined value and for maintaining this disabled condition until a predetermined number of sampling intervals occur without the detection of a correct word synchronizing bit pattern. This circuit means includes circuit means responsive to the mode switching pulse which appears at the output of AND circuit 109 for disabling the first and second counting circuit means associated with counters 95 and 106. This disabling circuit means includes a bi-stable mode control flip-flop circuit 111 having its "one" input terminal coupled to the output of AND circuit 109. Thus, the mode switching pulse from AND circuit 109 sets the flip-flop circuit 111 to a "one" state. The resulting "one" output from the mode control flip-flop circuit 111 is then supplied by way of an OR circuit 112 to an inverter circuit 113. In response to an input corresponding to a binary "one" level, the inverter circuit 113 produces an ouput corresponding to a binary "zero" level. The presence of a zero level at the output of inverter circuit 113 removes the activation from one of the input terminals of each of the AND circuits 101, 107 and 105. This disables these circuits and, thus, disables the inputs to the counter 95 and the counter 106 and the output from AND circuit 105.

The circuit means for disabling the interval shifting action also includes error pulse circuit means coupled to the control pulse circuit means represented by AND circuit 90 and to the local timing circuit means for producing an error pulse if no word sync control pulse occurs during the periodic activation of the gating circuit means represented by AND circuit 92. This error pulse circuit means includes an inverter circuit 114 having its input terminal coupled to the output terminal of AND circuit 90. Inverter circuit 114 produces an output binary "one" level whenever the input corresponds to a binary "zero" level, and vice versa. The output of inverter circuit 114 is coupled to a first input terminal of an AND circuit 115. The F₀' bit-rate timing pulses are supplied to a second input terminal of the AND circuit 115. Consequently, AND circuit 115 develops output pulses corresponding to the F₀' timing pulses whenever the inverter circuit 114 output level is at the "one" value. AND circuit 115 is, in turn, connected to a first input terminal of an AND circuit 116. A second input terminal of AND circuit 116 receives B27 word-rate timing pulses from the bit matrix 42. Thus, any F₀' pulse appearing at the output of AND circuit 115 during the occurrence of the B27 timing pulse will also be reproduced at the output of AND circuit 116. It is thus possible for one pulse per word to appear at the output of AND circuit 116. This pulse will appear only if the output from AND circuit 90 is of "zero" value during the B27 timing interval or, in other words, only if no word sync control pulse occurs during the B27 timing interval. Thus, the presence of an error pulse at the output of AND circuit 116 denotes the lack of an error-free word synchronizing bit pattern during the periodic sampling interval.

The circuit means for disabling the interval shifting action further includes counting circuit means responsive to the error pulses for reactivating the first and second counting circuit means associated with counters 95 and 106 upon the occurrence of a predetermined number of such error pulses. This third counting circuit means comprises a 5:1 counter 117. This 5:1 counter 117 includes three binary flip-flop stages coupled in cascade with suitable internal feedback connections to eliminate three of the eight possible binary combinations. For example, the first three combinations, "000," "100" and "010," can be eliminated by always starting the counter with a count of "110." If desired, a five stage ring-type counter may instead be utilized. The counting input of counter 117 is coupled to the output of AND circuit 116 so as to respond to the error pulses appearing at the output of such AND circuit 116. The reset input terminal of counter 117 is coupled to the word sync control pulse output line 93 coming from the AND circuit 92 so that the counter 117 will be reset to a zero count condition each time a word sync control pulse is passed by AND circuit 92. Thus, if less than five error pulses are counted before a word sync control pulse is passed, then counter 117 is reset to a zero count condition to begin the counting of error pulses all over again. If, on the other hand, error pulses occur during five successive B27 timing intervals, then, upon the occurrence of the fifth error pulse, the counter 117 produces an output pulse which is supplied to the mode control flip-flop circuit 111 to set it to its "zero" state. This, in turn, reactivates the first and second counters 95 and 106 because the consequent presence of a "zero" level at the input of inverter circuit 113 causes such circuit to produce a "one" level output. This "one" level output reactivates AND circuits 101, 107 and 105 thereby to reactivate the first and second counters 95 and 106.

The word synchronizer 43 also includes circuit means coupled to the third counting circuit means associated with the 5:1 counter 117 and to the gating circuit means represented by AND circuit 92 for increasing the duration of the periodic activated intervals of this gating circuit means whenever an intermediate number of successive error pulses are counted by the 5:1 counter 117. This circuit means includes a binary flip-flop circuit 118 having its "one" input terminal coupled to an intermediate 3:1 output terminal of the counter 117. Where counter 117 is of the binary type and is always started with a count of "110," the second counter stage will produce a recognizable "0" to "1" transition upon the occurrence of the third error pulse. This transition is used to set the flip-flop circuit 117 to its "one" state. This "one" state prevails until a word sync control pulse appears at the "zero" input terminal to reset the flip-flop circuit 118 to a "zero" state. The "one" level output signal produced at the "one" output terminal of flip-flop circuit 118 is used to activate a first input terminal of an AND circuit 119. When thus activated, AND circuit 119 serves to pass the B26 and B1 timing pulses which are supplied to a second input terminal thereof by an OR circuit 120. These B26 and B1 timing pulses are then combined with the B27 timing pulse in OR circuit 94 to produce an activation or gate signal of increased duration. This increased duration covers the three successive bit intervals 26, 27 and 1. This increased duration gate or "window" is applied to the AND circuit 92 to increase its chances of passing a word sync control pulse.

The word synchronizer 43 further includes circuit means responsive to the incoming pulse code signal for disabling the interval shifting action in the absence of an incoming pulse code signal. This circuit means includes a binary flip-flop circuit 121 which, when flip-flop 111 is in the zero state, disables the first and second counting circuit means associated with the 3:1 counters 95 and 106 whenever there is a fadeout of the incoming pulse code signal. To this end, this disabling circuit means also includes a differentiating circuit 122 which is coupled to the output of amplifier 31 of FIG. 3 for differentiating the NRZ pulse code output signal appearing thereat. This produces sharp positive-going and negative-going spikes or pulses corresponding to the positive-going and negative-going transitions in the NRZ pulse code signal. The positive-going pulses are supplied by way of a clipping circuit 123 to an OR circuit 124. At the same time, the negative-going pulses are supplied by way of a clipping circuit 125 and an inverter circuit 126 to a second input terminal of the OR circuit 124. Consequently, OR circuit 124 produces the same polarity of output pulse for either polarity of NRZ signal transition. The output pulses from OR circuit 124 are supplied to the "one" input terminal of the fadeout control flip-flop circuit 121 to set this flip-flop circuit to a "one" state. This "one" state of the flip-flop circuit 121 indicates that the incoming pulse code signal is present, or in other words, that there is no signal fadeout. With the fadeout control flip-flop circuit 121 in a "one" state, the "zero" output terminal thereof provides a binary "zero" level output signal. This "zero" level is inverted by the inverter circuit 113 to provide a binary "one" level which is supplied to the AND circuits 101, 107 and 105 to keep the corresponding input terminals of these circuits in an activated condition.

The fadeout control flip-flop circuit 121 is periodically reset to a "zero" state by B2 word-rate timing pulses. When in the "zero" state, the "zero" output terminal provides a binary "one" level which is inverted by inverter circuit 113 to provide a binary "zero" level at the output thereof. This disables or removes one of the necessary activation signals from each of the AND circuits 101, 107 and 105, thus, disabling these AND circuits. If the incoming pulse code signal is present, then the fadeout control flip-flop circuit 121 is reset to a "one" state shortly following the B2 timing interval. This provides activation of AND circuits 101, 107 and 105 well ahead of the word synchronizing intervals during which the counters 95 and 106 are intended to operate.

In order to appraise the operator of the condition of the word synchronizer 43, green, yellow and red indicator lamps 127, 128 and 129 are provided. The green indicator lamp 127 is lit whenever the mode control flip-flop circuit 111 is in a "one" state. This condition is indicative of the highest degree of synchronization (Mode 3 operation). At the same time, the yellow and red lamps 128 and 129 remain unlit because the binary "one" level from flip-flop circuit 111 is also supplied by way of an inverter circuit 130 to disable AND circuits 131 and 132 associated with these lamps. Whenever the mode control flip-flop 111 is in a "zero" state ("not" Mode 3), on the other hand, then either the yellow lamp 128 or the red lamp 129 is lit depending on the state of the fadeout control flip-flop 121. If the fadeout control flip-flop circuit 121 is in a "zero" state, then the resulting binary "one" level at the "zero" output terminal is supplied to the AND circuit 121 to cause the yellow lamp 98 to be lit. This indicates that the reason for lack of the highest degree of synchronization integrity is the occurrence of signal fadeout. If, on the other hand, the fadeout control flip-flop 121 is in a "one" state, then the resulting "zero" level at the "zero" output terminal is inverted by inverter circuit 113 to provide a binary "one" level which is supplied to the AND circuit 132 to cause the red lamp 129 to light. This indicates that the maximum degree of synchronization integrity does not exist and that this lack of maximum synchronization integrity is not caused by signal fadeout. A prolonged lighting of the red lamp 129 indicates either an internal failure in the decoder system or an abnormally severe noise impairment of the incoming pulse code signal or else a lack of proper synchronizing patterns in the incoming pulse code signal.

The output signal levels appearing at the "one" output terminal of the mode control flip-flop circiut 111 are also applied to an output line 133 to provide a word sync gate which is supplied to the decommutator 34 (FIG. 3).

Considering now the operation of the word synchronizer 43 of FIG. 7, the word synchronizer 43 is constructed to have three distinct primary operating modes. This enables optimum operation of the word synchronizer for various possible noise and signal fadeout conditions. These primary operating modes are:

Mode 1.—Search mode

Detects first "110" pattern
Switches to Mode 2 when "110" pattern detected

Mode 2.—Tentative sync mode

Periodic sampling
Checks periodicity of "110" patterns
Checks bit error rate
Switches to Mode 1 if three or more bit errors during three or less word sync sampling intervals
Switches to Mode 3 if less than three bit errors during three word sync sampling intervals

Mode 3.—Full sync mode

Sampling intervals tightly locked
Switches back to Mode 2 only if five successive sampling intervals fail to yield an error-free "110" word sync pattern.

These primary operating modes are sequential in nature. The word synchronizer 43 can be in only one of these modes at any given instant and progresses from one to another of these modes as the signal conditions change. A progression from Mode 1 to Mode 2 and then to Mode 3 occurs where the word synchronizer 43 starts from an initially unsynchronized condition and progresses to successively higher degrees of synchronization. Conversely, the progression is in the opposite direction as the word synchronizer 43 loses synchronization. The readiness of the word synchronizer 43 to progress from one mode to another, however, is not the same in all cases. It is relatively easy to go from Mode 1 to Mode 2, while it is somewhat more difficult to go from Mode 2 to Mode 3.

Once the word synchronizer 43 gets into Mode 3, it has a strong tendency to remain in that mode and it is relatively difficult to go back to Mode 2. The purpose is to make it so that the greater the reliability or degree of confidence in the synchronization, then the more strongly the machine holds on to the corresponding operating mode.

Figures 8A, 8B, 8C, 9:
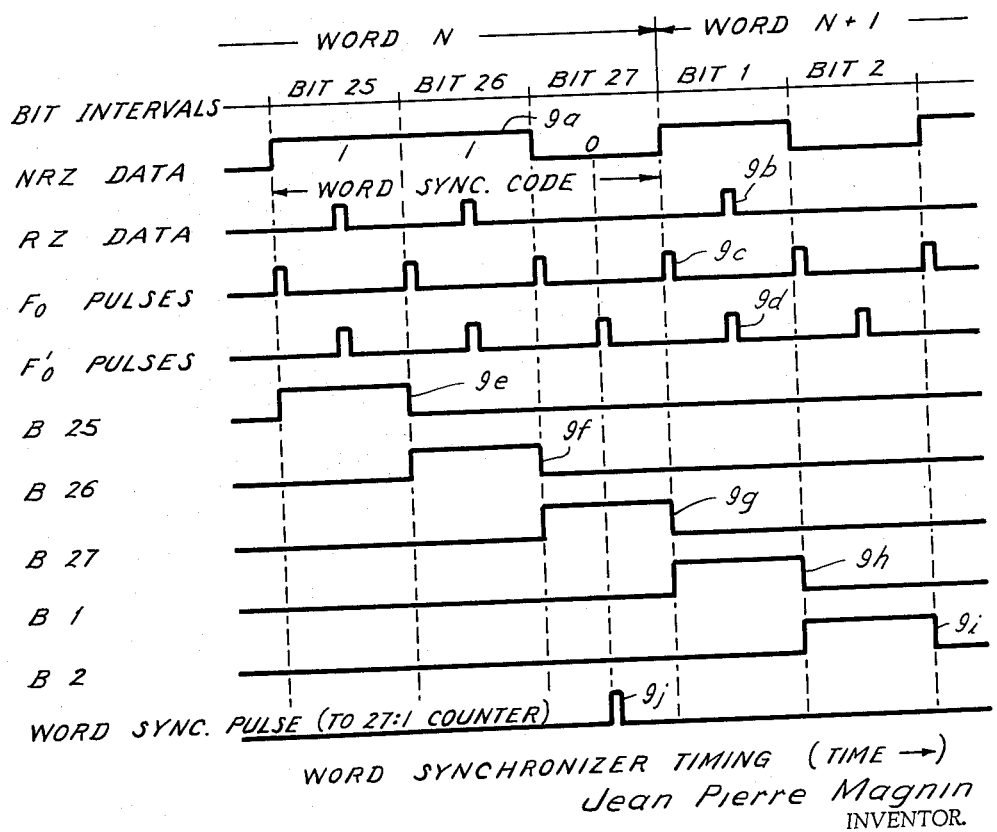
FIGS. 8A–8C are charts used to explain the operation of the FIG. 7 word synchronizer.
FIG. 9 is a timing diagram for the word synchronizer of FIG. 7.

Considering the operation of the word synchronizer 43 in greater detail, this operation will be explained with the aid of the charts of FIGS. 8A–8C and the timing diagram of FIG. 9. FIG. 9 shows various signal portions and timing pulses occurring in the vicinity of bit intervals 25–27 of a typical word for the case where the clock pulse generator 40 (FIG. 3) and the 27:1 counter 41 (FIG. 3) are properly synchronized with the incoming pulse code signal. In the absence of word synchronization, the various bit-rate and word rate timing pulses indicated by waveforms 9c–9i of FIG. 9 would, nevertheless, bear the same relative relationship to one another as is shown in FIG. 9. This group as a whole, however, would be shifted relative to the corresponding bit intervals of the incoming data signal (waveforms 9a and 9b). In particular, in the absence of word synchronization, the 27:1 counter 41 (FIG. 3) and the bit matrix 42 (FIG. 3) are operating at the correct rates to produce timing pulses of the proper width and in the proper sequence. The trouble is, however, that the B25, B26, B27, etc. timing pulses are not occurring during their respective ones of bit intervals 25, 26, 27, etc. of the pulse code signal. The purpose of the word synchronizer 43 is to bring the various bit-width timing pulses B25, B26, B27, etc. into alignment with the corresponding bit intervals in the incoming pulse code signal.

Assuming first, that the word synchronizer 43 is operating in Mode 1 and that the incoming pulse code signal is present (no fadeout), the mode control flip-flop circuit 110 is in the "one" state, mode control flip-flop circuit 111 is in the "zero" state and fadeout control flip-flop circuit 121 is in the "one" state. Under these conditions, mode control flip-flop circuit 110 is supplying a continuous activating signal to the AND circuit 92 so that this AND circuit is conditioned to pass any word sync control pulse coming from the AND circuit 91. At the same time, the 3:1 counters 95 and 106 are effectively disabled because this "one" state of mode control flip-flop circuit 110 causes a binary "zero" level to be applied to one input terminal of each of the AND circuits 101 and 107.

The incoming pulse code signal which is being continuously applied to the input of the shift register 33 (FIG. 3) is of the RZ form indicated by waveform 9b of FIG. 9. Each occurrence of an RZ data pulse switches the first register stage R27, to a "one" state. The following $F_0$ timing pulse or shift pulse (waveform 9c) which is applied to shift register 33 resets the R27 stage to a "zero" state and transfers the "one" indication to the second or R26 stage. If the R27 stage is in a "zero" state when an $F_0$ shift pulse occurs, then a "zero" indication is transferred to the R26 stage. Each $F_0$ shift pulse also shifts the contents of the R26 stage to the R25 stage, the contents of the R25 stage to the R24 stage, etc. This process is continuous so that the successive pulse code bits are shifted stage by stage down the length of the shift register 33. Each pulse code bit is shifted one stage to the right each time an $F_0$ timing pulse occurs.

An indication of the desired "110" word sync pattern is provided whenever shift register stages R25 and R26 are in the "one" state and stage R27 is in the "zero" state. Whenever this condition occurs, regardless of whether it is due to a true word sync pattern or merely to a chance occurrence of a "110" pattern in some other part of the pulse code signal, the resulting output lines from shift register stages R25–R27 which are coupled to the AND circuit 90 are caused to be simultaneously at the "one" level. Note that AND circuit 90 is coupled to the "zero" side of register stage R27 so that a "one" indication is provided when this register stage is in a "zero" state. This simultaneous occurrence of three "one" level inputs to the AND circuit 90 causes AND circuit 90 to develop a "one" level output signal. This "one" level output signal or pulse is applied to the AND circuit 91 to activate this circuit. Consequently, the $F_0'$ timing pulse (waveform 9d) occurring during this activation of AND circuit 91 will be passed by AND circuit 91 to provide the narrowed word sync control pulse which is supplied to AND circuit 92.

Since the word synchronizer 43 is operating in Mode 1, AND circuit 92 is continuously activated. Consequently, the narrowed word sync control pulse from AND circuit 91 is passed by AND circuit 92 to the output line 93 and, hence, by way of OR circuit 44 (FIG. 3) to the reset terminal of the 27:1 counter 41. This sync control pulse serves to reset the 27:1 counter 41 to a zero count condition, namely, the desired initial "10100" condition. Thus, this word sync control pulse sets the 27:1 counter 41 so that it starts at the beginning of its counting cycle and drives the bit matrix 52 to generate timing pulses B1, B2, etc. immediately thereafter.

The word sync control pulse appearing at the output of AND circuit 92 is also supplied to the "zero" input terminal of mode control flip-flop circuit 110. It switches flip-flop circuit 110 to a "zero" state. This establishes the Mode 2 operation of the word synchronizer 43. In particular, this "zero" state of mode control flip-flop circuit 110 discontinues the continuous activation of the AND circuit 92. A second consequence is that the 3:1 counters 95 and 106 are effectively activated because the input terminals of AND circuits 101 and 107 which are coupled to flip-flop circuit 110 are now in an activated condition. The 3:1 counters 95 and 106, together with the various binary logic circuits associated therewith, perform the periodicity checking and the bit error rate checking for the Mode 2 operation.

A first feature of the Mode 2 operation is that the incoming pulse code signal is periodically sampled to detect the presence of the desired "110" word sync patterns. This periodic sampling is provided by the B27 timing pulses which are supplied to AND circuit 92 by way of OR circuit 94. The sampling interval corresponds to the three bit intervals which are contained in shift register stages R25–R27 at the moment the B27 timing pulse activates AND circuit 92. Consequently, the sampling interval has an effective duration of three bit intervals even though the B27 timing pulse has a one bit duration. This three-bit sampling interval occurs once each word, i.e., at the word rate, because the B27 timing pulses are occurring at the word rate. If the B27 timing pulse is in step with bit interval 27 of the pulse code signal, which is the case illustrated in the FIG. 9 timing diagram, then the three-bit sampling interval corresponds to bit intervals 25–27 of the incoming signal. In this case, assuming that the word synchronizing "110" bit patterns are not impaired by noise, the resulting word sync control pulses (waveform 9j of FIG. 9) which are produced by AND circuits 90 and 91 during the bit 27 intervals are passed by AND circuit 92 and supplied to the reset terminal of 27:1 counter 41. This repeated application of word sync control pulses to the 27:1 counter 41 insures that the counter 41 will continue to stay in step with the appropriate bits in the incoming pulse code signal.

At the same time that the periodic sampling is being provided by the AND circuit 92, the incoming pulse code signal is also being periodically sampled by the input circuits associated with the 3:1 counter 95. These input circuits provide an indication of the number of erroneous word synchronizing bits occurring during the periodic word sync sampling intervals. To this end, the incoming pulse code signal is supplied in a sequential manner to the inverter circuit 96 and the AND circuit 99. This sequential form of the pulse code signal is obtained from the "one" side of the shift register stage R27. AND circuit 99 is activated during the B27 timing interval by the B27 timing pulse so as to provide an output pulse only if a "one" occurs during this timing interval. Such an output pulse would indicate a bit error because the word sync pattern should have a "zero" value during the B27 timing interval. The pulse code signal supplied to the inverter circuit 96, on the other hand, has its polarity inverted before it is applied to the AND circuit 97. Thus, the B25 and B26 timing pulses supplied to the AND circuit 97 will produce corresponding output pulses from such AND circuit only if the pulse code signal has "zero" values during these timing intervals. Such output pulses likewise indicate bit errors in the word sync pattern because the word sync pattern should have "one" values during the B25 and B26 timing intervals. The resulting error pulses from AND circuits 97 and 99 are supplied by way of OR circuit 100 to the AND circuit 101. Each of these bit error pulses will allow the AND circuit 101 to pass an $F_0'$ timing pulse. The resulting $F_0'$ timing pulses supplied to the input terminal of counter 95 thus correspond in number to the number of erroneous bits detected by AND circuits 97 and 99 during timing intervals B25, B26 and B27 or, in other words, during the periodic three-bit sampling intervals.

The occurrence of three of these bit error pulses causes the 3:1 counter 95 to produce an output pulse which sets flip-flop circuit 102 to the "one" state. This activates AND circuit 103. This enables the next $F_0$ timing pulse supplied to AND circuit 103 to pass therethrough and on to the AND circuit 105. This $F_0$ pulse constitutes a mode switching pulse and is supplied by AND circuit 105 to the "one" input terminal of the mode control flip-flop circuit 110 to set this flip-flop circuit to the "one" state. This returns the word synchronizer 43 to the Mode 1 operation so that it may search for another "110" bit pattern with which to fall in step.

The $F_0$ timing pulse which passes through the AND circuit 103 is also supplied by way of OR circuit 104 back to the counter 95 and the flip-flop circuit 102 to reset these circuits to their "zero" count conditions or states so that the error counting process may begin all over again. Subsequent error counting is held in abeyance, however, so long as the mode control flip-flop circuit 110 remains in the "one" state. This results from the deactivation of the AND circuits 101 and 107 input terminals which are coupled to the "zero" output of flip-flop circuit 110.

The Mode 2 circuits also include the second 3:1 counter 106. This counter 106 keeps track of the number of three-bit sampling intervals which have been examined by the counter 95. This operation is performed by counting the $F_0'$ timing pulses which are gated through the AND circuit 107 by the B1 timing pulses. In this manner, the B1 timing pulse which occurs after the third three-bit interval has been examined will cause counter 106 to produce an output pulse. This output pulse drives flip-flop circuit 108 to the one state. This activates the AND circuit 109. As a result, the next $F_0$ timing pulse applied to AND circuit 109 is reproduced at the output terminal thereof. This $F_0$ pulse is then applied to the "one" input terminal of the second mode control flip-flop circuit 111 to set such circuit to the "one" state. This "one" state of the mode control flip-flop circuit 111 establishes the Mode 3 operation of the word synchronizer 43. The $F_0$ pulse appearing at the output of AND circuit 109 is also supplied back by way of OR circuit 104 to the counter 106 and the flip-flop 108 to reset these circuits to a zero count condition.

Because the reset pulse produced by the second counter 106 also resets the first counter 95, counter 95 will produce an output pulse only if three bit errors are counted before the occurrence of the third B1 timing pulse or, in other words, are counted during the first three sampling intervals subsequent to the start of the counting operation. Otherwise, the counter 95 will be reset to zero when the third B1 timing pulse is counted by the counter 106. In a converse manner, the fact that the reset pulse produced by the first counter 95 also resets the second counter 106 means that the second counter 106 will produce an output pulse only if three B1 timing pulses are counted before a third bit error pulse is counted by the first counter 95. Thus, either one or the other, but not both, of the 3:1 counters 95 and 106 will produce an output pulse, depending on which one is the first to receive three input pulses. If the first counter 95 is the first to receive three input pulses, then the word synchronizer 43 shifts to the Mode 1 operation, the counters 95 and 106 are reset to zero and are subsequently disabled for the duration of the Mode 1 operation. If, on the other hand, the second counter 106 is the first to receive three input pulses, then the word synchronizer 43 shifts to the Mode 3 operation, the counters 95 and 106 are reset to zero and are subsequently disabled for the duration of the Mode 3 operation.

Counters 95 and 106 and the circuits associated therewith are seen from the foregoing to provide means for checking the rate of occurrence of erroneous bits in the word sync patterns. If the rate of occurrence of these bit errors is greater than the desired predetermined value set by the 3:1 counting ratios of counters 95 and 106, then the counters 95 produces an output pulse which resets the mode control flip-flop circuit 110 to a "one" state, thus returning the word synchronizer 43 to the Mode 1 condition. This reapplies the continuous activation to the AND circuit 92. This re-establishes the Mode 1 searching action with the new search beginning with the next bit interval following the last erroneous bit interval. The first "110" bit pattern to occur after the new search begins causes the AND circuit 90 to produce a new word sync control pulse which sets the mode control flip-flop circuit 110 to the "zero" state. This returns the word synchronizer 43 to the Mode 2 operation. This new word sync control pulse is also applied by way of the output line 93 to reset the 27:1 counter 41. Because, however, this new word sync control pulse occurs at a different point in the word cycles, the timing of the 27:1 counter 41 is shifted relative to the word cycles of the incoming pulse code signal. Consequently, the B27 timing pulse which provides the periodic sampling for the AND circuit 92 and the B25, B26 and B27 timing pulses which provide the periodic sampling for the 3:1 counter 95 are shifted to new locations in the word cycle. The accuracy of this new location for the periodic sampling interval is then checked by the 3:1 counters 95 and 106. If the error rate is still too high, the word synchronizer 43 goes back into Mode 1 and starts another search. This results in a further shifting of the periodic sampling interval. This process is continued until the word synchronizer 43 finds a periodic sampling interval location which coincides with a pulse code bit pattern which meets both the periodicity and the error rate requirements for a correct word synchronizing bit pattern with some allowance being made for bit errors caused by noise impairment of the signal.

When the Mode 2 checking operation determines that the periodic sampling intervals coincide with the true word sync patterns in the pulse code signal, then, as indicated, the 3:1 counter 106 is the first to receive three input pulses. This indicates that there has been less than three bit errors in three successive word sync patterns. When this occurs, the counter 106 produces an output pulse which drives the flip-flop circuit 108 to activate the AND circuit 109. Consequently, the next $F_0$ timing pulse which is supplied to the AND circuit 109 is passed thereby to the "one" input terminal of the mode control flip-flop circuit 111. This sets the mode control flip-flop circuit 111 to the "one" state, thus establishing the Mode 3 operation.

The first thing to note about the Mode 3 operation is that the Mode 2 counters 95 and 106 are effectively disabled during this Mode 3 operation. This disabling action is provided by coupling the "one" output terminal of the mode control flip-flop circuit 111 by way of OR circuit 112 and inverter circuit 113 to one of the input terminals of each of the AND circuits 101, 107 and 105 which are associated with the Mode 2 counters 95 and 106. Consequently, the appearance of the "one" level output signal at the "one" terminal of mode control flip-flop circuit 111 during the Mode 3 operation causes a "zero" level signal to appear at the output of inverter circuit 113. The presence of this binary "zero" level at an input terminal of each of the AND circuits 101, 107 and 105 is effective to disable these AND circuits and prevent them from passing any signals supplied to any other of their input terminals.

In the Mode 3 operation, the 5:1 counter 117, together with the various logic circuits associated therewith is utilized to check the production of word sync control pulses and to return the word synchronizer 43 back to the Mode 2 operation whenever no word sync control pulses are produced over a prolonged interval of time. Note that during the Mode 3 operation the periodic sampling intervals provided by the B27 timing pulses and the AND circuit 92 are maintained in a fixed position relative to the word cycles of the incoming pulse code signal. To provide the Mode 3 checking operation, the polarity-inverting action of inverter circuit 114 produces a "one" level output indication whenever the AND circuit 90 is not providing an indication of the presence of a "110" bit pattern. This "one" level output from inverter circuit 114 activates AND circuit 115 to enable it to pass $F_0'$ timing pulses. The $F_0'$ timing pulse which occurs during the occurrence of the B27 timing pulse is then passed by AND circuit 116 to the counting input of the 5:1 counter 117. Thus, a pulse at the output of AND circuit 116 represents an error pulse because such pulse occurs only when no "110" pattern and, hence, no word sync control pulse occurs during the B27 timing interval. Accordingly, this error pulse indicates the lack of a correct word synchronizing bit pattern during the periodic sampling intervals established by the B27 timing pulses.

These error pulses are counted by the 5:1 counter 117 to produce an output pulse whenever five such pulses are counted. However, when an error-free "110" pattern does occur during a sampling interval, the resulting word sync control pulse appearing at the output of AND circuit 92 is supplied to the reset terminal of the 5:1 counter 117 to reset this counter to a zero count condition. Consequently, five successive sampling intervals must fail to yield an error-free "110" pattern before the 5:1 counter 117 will produce an output pulse at its 5:1 output terminal. Any output pulse at the 5:1 output terminal of counter 117 is supplied to the mode control flip-flop circuit 111 to set it to a "zero" state. This reactivates the Mode 2 counters 95 and 106 and thus re-establishes the Mode 2 operation for the word synchronizer 43.

The Mode 3 circuits also provide means for increasing the duration of the sampling interval before the Mode 3 operation is abandoned. This increased duration sampling interval is provided by the flip-flop circuit 118 which has its "one" input terminal coupled to the intermediate 3:1 output terminal of the 5:1 counter 117. Upon the occurrence of error pulses from the AND circuit 116 during three successive sampling intervals, the flip-flop circuit 118 is switched to the "one" state. This causes the flip-flop circuit 118 to supply a binary "one" level to AND circuit 119 for activating such AND circuit to enable the passage of B1 and B26 timing pulses supplied thereto by way of the OR circuit 120. These B1 and B26 timing pulses are passed on by way of the OR circuit 94 to supplement the periodic B27 activation of the AND circuit 92 to extend such activation to cover the three-bit interval defined by the successive bit timing pulses B26, B27 and B1. This increases the chances of the AND circuit 92 to pass a word synchronizing control pulse. It takes care of the case where the local timing circuits and, in particular, the 27:1 counter 41 have slipped out of synchronization by one bit interval or less. Any word sync control pulse which is detected by this widened sampling interval, in addition to resetting the 27:1 counter 41, will also reset the 5:1 counter 117 and the flip-flop circuit 118 to their zero conditions. This provision of a widened sampling interval further increases the ability of the word synchronizer 43 to stay in the Mode 3 condition once such condition is obtained.

The word synchronizer 43 further provides means for disabling the Mode 2 counters 95 and 106 whenever the incoming pulse code signal fades out and, consequently, is not present at the input of the decoder system. This signal fade-out control is provided by the flip-flop circuit 121. Signal fade-out is indicated when this flip-flop circuit 121 is in a "zero" state during the periodic word sync sampling interval. The "zero" state of the flip-flop circuit 121 causes the "zero" output terminal thereof to provide a binary "one" level which, after passage through the inverter circuit 113, provides a binary "zero" level for disabling AND circuits 101, 107 and 105. This, in turn, prevents counters 95 and 106 from doing any counting.

The fade-out control flip-flop circuit 121 is periodically set to the "zero" state by a B2 timing pulse from the bit matrix 42, this timing pulse occurring during the second bit interval of each word when the synchronizer is properly synchronized. The presence of the incoming pulse code signal is determined by examining the NRZ pulse code signal appearing at the output of the amplifier 31 of FIG. 3. If this NRZ signal is present, then the differentiating circuit 122 responds to the level transitions therein for producing narrow positive and negative output pulses. The negative output pulses are inverted by inverter circuit 126 and combined with the positive pulses in OR circuit 124 to provide a train of one-polarity output pulses indicative of the presence of such level transitions in the incoming pulse code signal. The first of these signal transition pulses which occurs after the B2 reset of flip-flop circuit 121 serves to set the flip-flop circuit 121 to the "one" state. This provides a binary "zero" level at the "zero" output terminal which, through the inverting action of the inverter circuit 113, provides a binary "one" level for activating AND circuits 101, 107, and 105. If the incoming pulse code signal is present, then there is an exceedingly large probability that a signal transition will occur somewhere in the interval between Bit 2 and the beginning of the expected word synchronizing pattern at Bit 25. Thus, if the signal is present, flip-flop circuit 121 will practically always be in the no-fade-out "one" state before the occurrence of the expected word sync interval and, hence, before the counters 95 and 106 are needed to count the word sync bit errors.

This fadeout control has particular significance when the word synchronizer 43 begins to lose synchronization. Thus, when five successive sampling intervals occur without an error-free word sync pattern being detected, the resetting of mode control flip-flop circuit 111 to the "zero" state would ordinarily serve to activate the Mode 2 counters 95 and 106. If, however, these five successive errors were caused by signal fadeout, then the reactivation of the Mode 2 counters 95 and 106 is held in abeyance by the fadeout control flip-flop 121 until the incoming pulse code signal returns. As a consequence, the word synchronizer 43 will not immediately be thrown all the way back into Mode 1 when a prolonged signal fadeout occurs. It will, instead, remain armed and waiting to proceed with the Mode 2 operation upon the return of the incoming pulse code signal.

Indicator lamps 127, 128 and 129 serve to appraise the operator of the state of synchronization of the word synchronizer 43. If the green lamp 127 is lit, then the operator is informed that the synchronizer is completely synchronized and that the output information from the decoder system is completely reliable. If, on the other hand, either the yellow lamp 128 or the red lamp 129 is lit, then the operator is informed that the word synchronization is not completely reliable. He is also informed as to the reasons for this unreliability, i.e., whether this unreliability is caused by fadeout of the incoming pulse code signal or whether it is caused by lack of synchronization with the incoming signal.

It was initially assumed that the word synchronizer 43 started out in the Mode 1 condition. It is likely, however, that the synchronizer 43 will frequently start out in the Mode 2 condition. In the absence of a fortuitous and rather unlikely chance occurrence that the 27:1 counter 41 should start out in step with the incoming pulse code signal, then the operation of the Mode 2 counters 95 and 106 will quickly set the word synchronizer 43 to the Mode 1 condition.

The maximum rate of occurrence of erroneous bits which is tolerated in the Mode 2 operation is set in accordance with the desired degree of reliability. For the present example, where the maximum tolerated error rate is two erroneous bits for three word sync patterns, this means that, when the word synchronizer 43 switches to Mode 3, the probability is very nearly 100% that true word synchronization has been established. Of equal importance, however, is the fact that the novel Mode 2 operation enables the Mode 3 condition to be reached within the shortest possible period of time for any prevailing noise condition. In other words, the time required to gain Mode 3 synchronization is not fixed by fixed circuit constants but, instead, is automatically adjusted in accordance with the amount of noise present. The smaller the amount of noise, the more rapidly Mode 3 synchronization is established. This results from the ability of the Mode 2 circuits to immediately accept any pattern sequence which meets the necessary reliability requirements.

Considering typical operating condition, it is apparent that "110" bit patterns may also be produced by the data values occurring during the data syllable portions of each pulse code word group as well as by the desired word sync patterns. In fact, on a random probability basis, a "110" bit pattern will, on the average, occur once every ten bits. Thus, the Mode 1 operation will, on the average, produce a word sync control pulse within ten bit intervals after the Mode 1 operation is established. This control pulse may or may not correspond to a true word sync pattern. The word synchronizer 43 is then switched to the Mode 2 operation. Considering the 3:1 counting ratios of counters 95 and 106 and the probable number of times that it will be necessary to shift the sampling interval to find the correct word synchronizing bit pattern, then, for the case of a noise-free pulse code signal, the word synchronizer 43 will, on the average, switch from Mode 2 to Mode 3 within approximately four words after the beginning of the first Mode 1 search. For the case of noise impairment which produces a 10% random bit error, the word synchronizer 43 will, on the average, reach Mode 3 within approximately 13 words. Once Mode 3 operation is established, a relatively severe and prolonged signal impairment is required to return the word synchronizer 43 back to Mode 2 and subsequently, if necessary, to Mode 1. The word synchronizer 43 is, consequently, seen to represent a synchronizing system which provides optimum operation for various possible signal conditions that may exist and which can rapidly and reliably establish synchronization of local timing circuits even for the case of relatively noisy input signals.

FRAME SYNCHRONIZER

Referring now to FIG. 10 of the drawings, there is shown in greater detail the construction of the frame synchronizer 46 of FIG. 3. This frame synchronizer 46 is responsive to the pulse code signal for producing a minor frame sync control pulse for each occurrence of a minor frame synchronizing bit pattern and for supplying the resulting minor frame sync control pulses to both the 64:1 counter 45 and the 27:1 counter 41 (FIG. 3) for synchronizing the counting actions of these counters with the minor frame sync bit patterns. The frame synchronizer 46 also includes circuit means responsive to the pulse code signal for producing a major frame sync control pulse for each occurrence of a major frame synchronizing bit pattern. These major frame sync control pulses are supplied to the reset terminal of the 4:1 counter 48 as well as to the reset terminal of the 64:1 counter 45 and the 27:1 counter 41.

Considering first the minor frame synchronizing portion of the frame synchronizer 46 of FIG. 10, this portion includes two different mechanisms for producing minor frame sync control pulses. The first of these is a "direct" synchronization mechanism for producing minor frame sync control pulses which are representative of the occurrence of error-free minor frame synchronizing pulse patterns. The second mechanism, on the other hand, is a "statistical" synchronization mechanism for producing minor frame sync control pulses which are representative of the occurrence of imperfect minor frame synchronizing patterns having less than a predetermined amount of error therein. These two mechanisms or modes are operated in parallel with each other, each mode being operative at all times.

Considering first the direct synchronization mechanism, this mechanism includes coincidence circuit means responsive to a multi-pulse interval of the incoming pulse code signal. This coincidence circuit means includes an AND circuit 135 having twenty-four input terminals. These input terminals are coupled to the last twenty-four stages, R1–R24, of the shift register 33 (FIG. 3) by way of corresponding ones of the register output lines. The even-numbered lines R2, R4, R6, etc. are connected directly to the corresponding terminals of AND circuit 135. The odd-numbered lines R1, R3, R5, etc. are, in the present embodiment, coupled to the AND circuit 135 by way of individual inverter circuits 136. The use of the inverter circuits 136 serves to produce a binary "one" indication when the corresponding register stage is in a binary "zero" state. If desired, the inverter circuits 136 may be omitted by instead connecting the odd-numbered inputs of AND circuit 135 to the "zero" sides of the corresponding register stages. This would also provide a binary "one" indication when these register stages are in a "zero" state.

Because of the large number of input terminals, the AND circuit 135 may be composed of several individual AND circuits each having a smaller number of input terminals. In particular, six AND circuits each having four input terminals may be utilized to provide six output indications when the twenty-four input lines are simultaneously at the binary "one" level. Two additional AND circuits each having three input terminals are then used to reduce these six signal indications to a pair of signal indications. Another AND circuit having two input terminals is then used to reduce the two remaining signal indications to a single signal indication representative of the simultaneous occurrence of "one" levels at the twenty-four original input terminals.

The minor frame sync control pulse appearing at the output of AND circuit 135 when all twenty-four input terminals are simultaneously at the "one" level is supplied to an AND circuit 137. Supplied to a second input terminal of the AND circuit 137 are the $F_0'$ timing pulses obtained from the clock pulse generator 40 (FIG. 3). This provides a narrowed minor frame sync control pulse at the output of AND circuit 137. This narrowed pulse is of the same width as the $F_0'$ timing pulse and is produced whenever an $F_0'$ pulse occurs while the wider sync control pulse from AND circuit 135 is present at the first input of the AND circuit 137. This narrowed minor frame sync control pulse is supplied by way of an OR circuit 138 and an output line 139 to the OR circuit 47 of FIG. 3, and, hence, to the reset terminals of the 64:1 counter 45 and the 27:1 counter 41.

Considering now the minor frame statistical synchronization mechanism which operates in parallel with the direct synchronism mechanism just discussed, this statistical mechanism includes circuit means coupled to the pulse code signal supply circuit means and to the timing circuit means for producing an error pulse each time the incoming pulse train departs from a correct synchronizing pulse pattern. This includes circuit means coupled to the timing circuit means for supplying repetitive replicas of a correct minor frame synchronizing pulse pattern. This includes an AND circuit 140 having a first input terminal, designated ½ $F_0$, coupled to the "one" side of the first stage of the 27:1 counter 41 (FIG. 3). This ½ $F_0$ signal is a square wave having a frequency of one-half of the $F_0$ timing pulse frequency. The replica supply means also includes a binary flip-flop circuit 141 having its "one" output terminal coupled to a second input terminal of the AND circuit 140. The input terminals of flip-flop circuit 141 are coupled to the bit matrix 42 so that a B1 timing pulse will set this flip-flop circuit 141 to a "one" state, which state is maintained until the end of the following B24 timing pulse, which event returns the flip-flop circuit 141 to the "zero" state. This provides at the "one" output terminal a roofing gate for activating the AND circuit 140 for an interval extending from the beginning of Bit 1 to the end of Bit 24.

The error pulse circuit means also includes circuit means for comparing the incoming pulse code signal with the locally-generated sync pulse replica for producing an error pulse each time a bit interval of the incoming pulse code signal departs from the desired binary value. This comparing circuit means includes an AND circuit 142 which is coupled to the R27 stage of shift register 33 by way of input line 143. Input line 143 is coupled to the "one" side of the R27 stage to provide a pulse train corresponding to the incoming pulse code signal. Supplied to a second input terminal of the AND circuit 142 is a polarity-inverted version of the locally-generated sync pattern replica appearing at the output of AND circuit 140, the polarity inversion being provided by an inverter circuit 144. The error pulses which result at the output of AND circuit 142 occur whenever the incoming pulse code signal should have a "zero" value but, instead, has a "one" value. These error pulses are supplied to an OR circuit 145.

At the same time, the incoming pulse code signal on input line 143 is supplied by way of an inverter circuit 146 to an AND circuit 147. Also supplied to AND circuit 147 by the AND circuit 140 is a non-inverted version of the locally-generated replica of a correct synchronizing pattern. Error pulses occur at the output of AND circuit 147 whenever the incoming pulse code bit should have a "one" value, but, instead, has a "zero" value. These error pulses are also supplied to the OR circuit 145. OR circuit 145 then combines the two sets of error pulses and supplies the resulting pulse train to an AND circuit 148. $F_0'$ timing pulses are supplied to a second input terminal of AND circuit 148. Consequently, an error pulse of reduced width appears at the output of AND circuit 148 whenever an error pulse is supplied to the input of such circuit by OR circuit 145.

The statistical synchronization mechanism further includes circuit means for counting the error pulses and producing a frame sync control pulse for each replica interval having less than a predetermined number of error pulses therein. This circuit means includes a 5:1 counter 150. The counting circuit means also includes circuit means coupled to the timing circuit means for repetitively resetting the 5:1 counter 150. This circuit means includes a reset line which is coupled to the bit matrix 42 for supplying B1 timing pulses to the reset terminal of the counter 150. The counting circuit means further includes circuit means for producing a sync control pulse for each counting cycle wherein less than a predetermined number of error pulses is counted. This includes a binary flip-flop circuit 151 which is normally in a "zero" state. It also includes an inverter circuit 152 coupled to the "one" output terminal of flip-flop circuit 151. Consequently, there normally appears at the output of inverter circuit 152 a "one" level indication because of the "zero" level indication normally present at the "one" output of flip-flop circuit 151. This "one" level indication from inverter circuit 152 is used to activate a first input terminal of AND circuit 153. Second and third input terminals of AND circuit 153 are energized by B27 and $F_0'$ timing pulses. Consequently, with the inverter circuit 152 providing an output "one" level, an $F_0'$ timing pulse will appear at the output of AND circuit 153 only during the occurrence of each B27 timing pulse. The $F_0'$ timing pulses which appear at the output of AND circuit 153 are used as minor frame sync control pulses and, to this end, are supplied by way of OR circuit 138 to the synchronizer output line 139. These minor frame synchronizing pulses will not be produced by AND circuit 153, however, if the counter 150 has counted five or more bit errors since the beginning of the B1 timing pulse interval. This is because the fifth pulse counted by counter 150 produces an output pulse which switches flip-flop circuit 151 to the "one" state. The output of inverter circuit 152 would, in this case, drop to a "zero" level value. This disables the AND circuit 153.

Considering now the major frame synchronizing portion of the frame synchronizer 46, such portion includes an AND circuit 155 having three input terminals, one of which is coupled to the "one" side of register stage R27 and the other two of which are coupled to the "zero" sides of register stages R26 and R25, the complementary or "zero" side connection being indicated by a "prime". The output of AND circuit 155 is coupled by way of an AND circuit 156 and an OR circuit 157 to an output line 158. Supplied to a second input terminal of the AND circuit 156 are the minor frame sync control pulses appearing at the output of AND circuit 137. Such minor frame sync control pulses, thus, will also be gated through the AND circuit 156 if the AND circuit 155 is, at the same time, providing an indication that this is actually a major frame synchronizing interval. The pulse appearing at the output of AND circuit 156 thus constitutes a major frame sync control pulse. This pulse is supplied by way of OR circuit 157 and output line 158 to the reset terminal of the 4:1 counter 48 of FIG. 3.

The major frame synchronizing portion also includes a statistical operating mode. This is provided by an AND circuit 159 which couples the statistical mode output AND circuit 153 to the major frame output OR circuit 157. A second input terminal of AND circuit 159 is coupled to the output of AND circuit 155. Consequently, a major frame sync control pulse appears at the output of AND circuit 159 whenever the AND circuit 155 recognizes a "001" bit pattern at the same time that the AND circuit 153 produces a statistical sync control pulse. This output pulse is supplied by way of the OR circuit 157 to the output line 158.

Considering now the operation of the frame synchronizer 46, the minor frame synchronizing bit pattern and the major frame synchronizing bit pattern which the synchronizer 46 is intended to recognize are shown in FIGS. 1F and 1G, respectively. The minor frame synchronizing pattern occurs during Word 64 of each of Minor Frames 1, 2 and 3 of the pulse code signal, while the major frame synchronizing pattern occurs during Word 64 of Minor Frame 4 of the pulse code signal. The first 24 bits of each of the major and minor frame patterns is composed of a "010101 . . ." pattern. The patterns differ, however, during bit intervals 25, 26 and 27. Bit intervals 25–27 of the minor frame pattern contain a "110" pattern, while the corresponding bit intervals of a major frame pattern contain a "001" pattern. The minor frame synchronizing bit pattern of FIG. 1F is reproduced on an expanded scale as waveform 11a on the timing diagram of FIG. 11, except that the mid-portion thereof (bits 5–21) has been omitted.

Considering first the minor frame synchronizing operation, the RZ form of the minor frame synchronizing bit pattern (waveform 11b of FIG. 11) is applied to the input of shift register 33 (FIG. 3) during Word 64 of each of Minor Frames 1, 2 and 3. This 27 bit synchronizing pattern completely fills the 27-stage shift register 33 only during the occurrence of bit interval 27. At this moment, the 27 register stages are in the same binary states as are the corresponding bit intervals of the frame sync pattern of waveform 11a. Thus, with respect to register stages R1–R24, the odd-numbered stages are in their "zero" states, while the even-numbered stages are in their "one" states. As seen in FIG. 10, the "zero" indications provided by the odd-numbered states are converted to "one" indications by the inverter circuits 136. Thus, during Bit 27, all 24 input terminals of AND circuit 135 are at the binary "one" level. Consequently, for the duration of Bit 27, the AND circuit 135 provides a binary "one" level signal to the AND circuit 137. This enables the passage of the $F_0'$ timing pulse which occurs during Bit 27. This timing pulse, which constitutes the minor frame sync control pulse, is indicated by waveform 11f of FIG. 11. It is supplied by way of the OR circuit 138 and the output line 139 to the reset terminals of the 64:1 counter 45 and the 27:1 counter 41 to reset these counters to a zero count condition. In this manner, there is provided a direct synchronization mechanism. Each and every time the desired "010101 . . ." frame synchronizing pattern occupies register stages R1–R24 a minor frame sync control pulse appears on the output line 139. If, however, even a single one of the register stages R1–R24 is in the wrong binary state, then no minor frame sync control pulse will be produced. This places a relatively severe limitation on the direct synchronization mechanism whenever the incoming pulse code signal is subject to impairment by electrical noise and the like.

In order to insure that minor frame synchronization will be obtained with a noisy input signal in a reasonably short length of time, there is provided the statistical operating mode or synchronization mechanism which operates in parallel with the direct synchronization mechanism. This statistical mechanism provides for the examination of the individual bit intervals of each frame synchronizing pattern and for the production of a minor frame sync control pulse whenever less than five erroneous bits are detected during the first 24 bits of each frame synchronizing pattern. To this end, the "one" side of register stage R27 is connected by way of input line 143 to the AND circuit 142 and the inverter circuit 146. The resulting waveform supplied over the input line 143 during the minor frame synchonizing interval is indicated by waveform 11c of FIG. 11. It is essentially an RZ version of the incoming pulse code signal except that the individual pulse durations are greater than those appearing at the input of hte shift register 33. The individual bit intervals of waveform 11c are examined by comparing this waveform with a locally-generated replica of the desired "010101 . . ." pattern for bit intervals 1–24. This locally-generated replica is provided by the ½ $F_0$ square wave (waveform 11d of FIG. 11) and the roofing gate (waveform 11e of FIG. 11) which are supplied to the AND circuit 140. The roofing gate, which is generated by the flip-flop circuit 141, activates the AND circuit 140 to enable only the portion of the ½ $F_0$ square wave occurring during bit intervals 1–24 to be supplied to the comparison circuits. In this regard, the 27:1 counter 41 is constructed so that a discontinuity which occurs in the "010101 . . ." pattern of the ½ $F_0$ square wave will occur during the unused Bit 25–27 interval. This discontinuity is caused by the fact that the 27:1 counter 41 from which the ½ $F_0$ signal is obtained has an odd number of counts per counting cycle.

The resulting ½ $F_0$ pattern appearing at the output of AND circuit 140 (Bit 1–24 portion of waveform 11d) is supplied to AND circuit 147 to activate this circuit during the even-numbered bit intervals of the incoming frame sync pattern. The frame sync pattern which is supplied to the other input of the AND circuit 147, however, first inverted by the inverter circuit 146. Consequenly, no error-indicating pulses will be produced by the AND circuit 147 so long as each of the even-numbered bit intervals of the incoming signal contains a "one" value. The occurrence of an erroneous "zero" value during one of these even-numbered intervals will, however, cause an error-indicating pulse to occur at the output of AND circuit 147 during this interval.

The odd-numbered intervals of the incoming synchronizing signal, on the other hand, are examined by supplying the ½ $F_0$ square wave to the AND circuit 142 by way of the inverter circuit 144. The resulting polarity-inverted ½ $F_0$ signal activates the AND circuit 142 during the odd-numbered bit intervals of the incoming signal. This time the incoming signal on line 143 is supplied directly to the comparing circuit, namely, the AND circuit 142, so that no error-indicating pulses are produced thereby so long as the odd-numbered intervals contain the desired "zero" values. The occurrence of an undesired "one" value, however, will produce a corresponding error-indicating pulse at the output of AND circuit 142.

The error-indicating pulses from AND circuits 142 and 147 are combined by the OR circuit 145. These pulses are then supplied to AND circuit 148 to enable the passage of one $F_0'$ timing pulse for each error-indicating pulse. The $F_0'$ timing pulses which are passed by AND circuit 148 are then counted by the 5:1 counter 150.

At the beginning of each Bit 1–24 interval of each word, the 5:1 counter 150 and the flip-flop circuit 151 are set to a zero condition by the leading edge of the B1 timing pulse which is supplied to their reset terminals. When the fifth bit error in any given word interval is detected by the AND circuits 142 and 147, the 5:1 counter 150 produces an output pulse which is supplied to the flip-flop circuit 151. This drives the flip-flop 151 to a "one" state which, because of the polarity inverting action of inverter circuit 152, serves to disable the AND circuit 153. If this AND circuit 153 were not disabled, the $F_0'$ and B27 timing pulses supplied thereto would enable this AND circuit 153 to pass the $F_0'$ timing pulse occurring during bit interval 27. This timing pulse would be identical to the one indicated by waveform 11f of FIG. 11. Thus, the occurrence of less than five errors in a Bit 1–24 interval of a word causes the flip-flop circuit 151 to remain in the "zero" state and thus enables AND circuit 153 to produce an output pulse which constitutes the frame sync control pulse produced by the statistical synchronization mechanism. This synch control pulse is supplied by way of the OR circuit 138 and the output line 139 to the 64:1 counter 45 and the 27:1 counter 41 of FIG. 3.

If both of the AND circuits 137 and 153 produce output pulses, they both occur at precisely the same instant, namely, during the occurrence of the $F_0'$ timing pulse in the Bit 27 interval. Consequently, there is no ambiguity of instruction to the counters 45 and 41. It is also noted that minor frame sync control pulses are produced during Word 64 of each of the minor frame intervals even though the synchronizing bit pattern during one of these intervals is actually a major frame pattern. Thus, a minor frame reset is produced for each minor frame even though an additional major frame reset is produced for one of the frames.

The major frame sync control pulse is produced for any word interval which contains a "001" bit pattern in bit intervals 25–27 in addition to a "010101 . . ." pattern in bit intervals 1–24. To this end, the AND circuit 155 produces an output pulse whenever the three inputs thereof are at the "one" level. This occurs during bit interval 27 for the "001" pattern of a major frame sync pattern, it being noted that inputs R25' and R26' are taken from the "zero" side of the corresponding register stages. This Bit 27 pulse from the AND circuit 155 is supplied to each of the AND circuits 156 and 159. Thus, if a minor frame sync control pulse is at the same time produced by either or both of the AND circuits 137 and 153, then these sync control pulses are passed by AND circuits 156 and 159 to provide a major frame sync control pulse on the output line 158. This major frame sync control pulse is then supplied to the 4:1 counter 48 as well as the counters 45 and 41.

It is noted that the fact that the major and minor frame sync control pulses are also supplied to the 27:1 counter 41 of FIG. 3 enables these pulses to establish word synchronization as well as major and minor frame synchronization. This form of word synchronization is, on the average, not nearly as efficient as the word synchronization provided by word synchronizer 43. It does, however, increase the probability of a rapid establishment of word synchronization.

Each of the two modes of frame synchronization, namely, the direct and statistical modes, have certain advantages and disadvantages. The direct mode is fully operative as soon as bit synchronization is obtained and its answers are always exactly correct. A noise-produced 10% random bit error will, however, reduce the operating efficiency of the direct mode to 8%. In other words, in this case, the direct mode will, on the average, produce a minor frame sync control pulse for only eight out of every 100 minor frames. The statistical operating mode, on the other hand, produces answers which are 99.9% correct even where electrical noise is causing a 10% random bit error. Such a 10% random bit error will, on the average, produce three erroneous bits during the occurrence of the "010101 . . ." portion (Bits 1–24) of a word synchronizing bit pattern. Consequently, on the average, a sync control pulse will be produced for each minor frame. The statistical mode, however, will not operate satisfactorily until the decoder system has obtained both bit synchronization and word synchronization. Both modes together though, assure a minimum frame synchronization acquisition time either with or without a 10% random bit error.

DECOMMUTATOR

Figure 12:
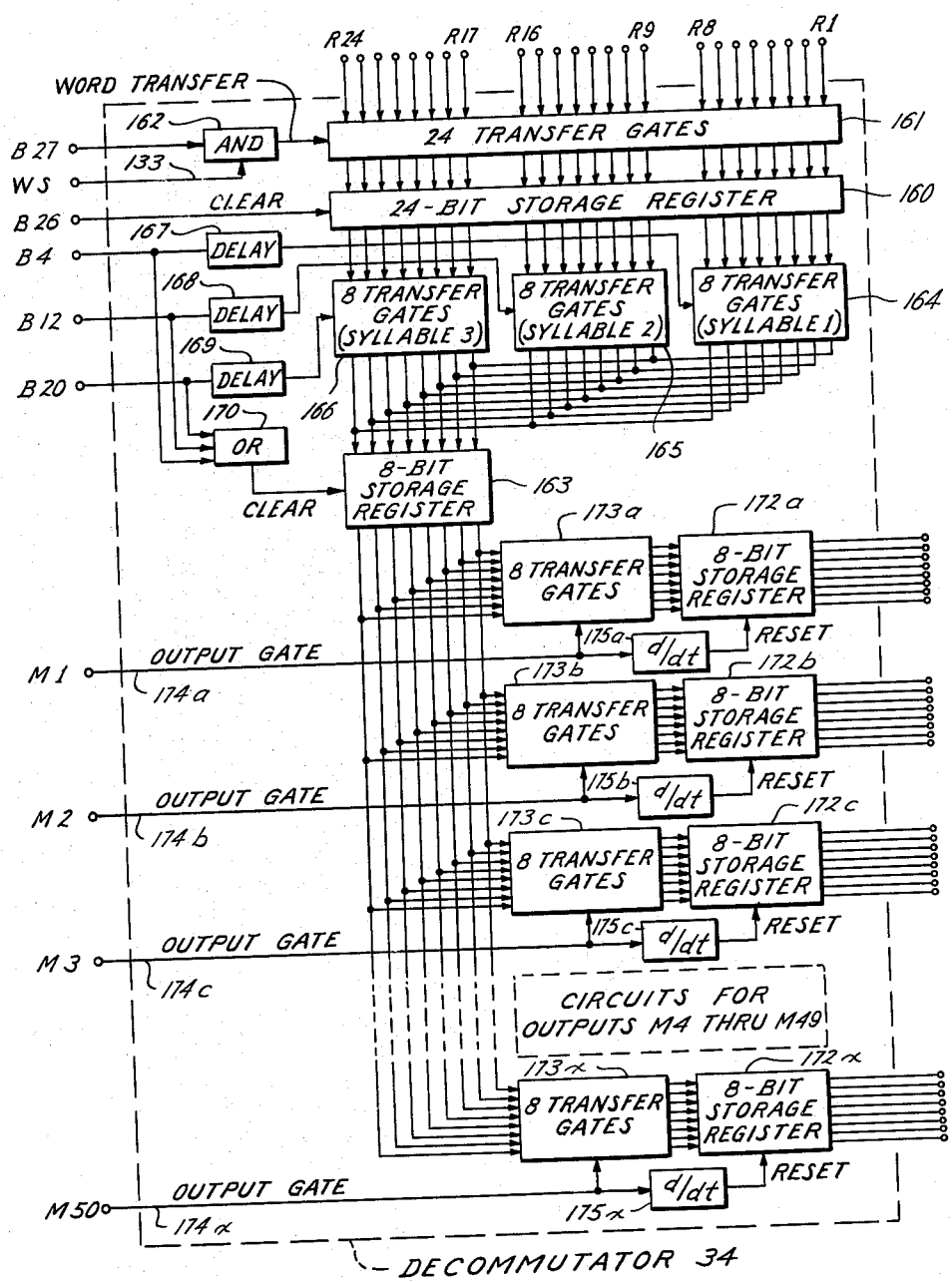
FIG. 12 is a detailed block diagram of the decommutator of the FIG. 3 decoder system.

Referring now to FIG. 12 of the drawings, there is shown in greater detail the construction of the decommutator 34 of FIG. 3. This decommutator 34 serves to switch the various syllables or data samples contained in the incoming pulse code signal to the appropriate ones of the output signal channels $M_1$–$M_{50}$. To achieve this purpose, the decommutator 34, as shown in FIG. 12, includes a code group or word group storage register. This storage register is a 24-bit storage register 160 having 24 individual binary stages located side by side but not interconnected with one another as far as any signal indications are concerned. Each of these individual binary states is cleared or set to a "zero" state by means of a B26 timing pulse which is obtained from the bit matrix 42 of FIG. 3.

The decommutator 34 further includes circuit means for transferring the contents of the shift register 33 to the 24-bit storage register 160. This transfer circuit means includes 24 transfer gates 161. The individual gate circuits are located side by side but are not interconnected with one another as far as any signal indications are concerned. Each of the individual gate circuits serve to couple one of the R1–R24 stages of shift register 33 to one of the binary circuits of the storage register 160. Each of the individual gate circuits may take the form of a two input AND circuit. Transfer of the contents of the shift register 33 to the storage register 160 is effected by utilizing a B27 timing pulse from the bit matrix 42 as a word transfer pulse. This B27 timing pulse is supplied by way of an AND circuit 162 to the second input terminal of each of the individual gate circuits making up the 24 transfer gates 161. The word transfer is also controlled by the presence or absence of a word sync (WS) gating signal on the line 133 coming from the word synchronizer 43 and coupled to the second input terminal of AND circuit 162.

The decommutator 34 of FIG. 12 also includes a subgroup or syllable storage register. This register is represented by an 8-bit storage register 163. Storage 163 includes eight individual binary stages located side by side but having no signal interconnections therebetween.

The decommutator 34 further includes circuit means for successively transferring the pulse code sub-groups, in this case, the syllable groups, from the 24-bit storage register 160 to the 8-bit sub-group storage register 163 while the next code group or word is being read into the shift register 33. This transfer circuit means includes eight transfer gates 164 for Syllable 1, eight transfer gates 165 for Syllable 2 and eight transfer gates 166 for Syllable 3. The individual gate circuits for each syllable are located side by side with no signal interconnections therebetween. Each individual gate circuit may be a two-input AND circuit. Each of the individual gate circuits comprising the Syllable 1 transfer gates 164 serves to connect one of the Bit 1–8 outputs of the storage register 160 to one of the input terminals of the 8-bit storage register 163. Each of the individual gate circuits comprising the Syllable 2 transfer gates 165 connects one of the Bit 9–16 output terminals of storage register 160 to one of the input terminals of a storage register 163. In a similar manner, each of the individual gate circuits comprising the Syllable 3 transfer gates 166 serves to connect one of the Bit 17–24 outputs of storage register 160 to one of the input terminals of the storage register 163. The connections are such that Bits 1, 9 and 17, which are the first bits of each syllable, are supplied to the same input terminal of the storage register 163. Similar considerations apply for the second, third, etc., bits of each syllable.

Activation of transfer gates 164, 165 and 166 is obtained by utilizing B4, B12 and B20 timing pulses obtained from the bit matrix 42 of FIG. 3. As seen in FIG. 12, the B4 timing pulse is supplied by way of a delay circuit 167 to the Syllable 1 transfer gates 164. In a similar manner, the B12 timing pulse is supplied by way of a delay circuit 168 to each of the individual gate circuits comprising the Syllable 2 transfer gates 165. The B20 timing pulse, on the other hand, is supplied by way of a delay pulse circuit 169 to each of the individual gate circuits comprising the Syllable 3 transfer gates 166. Each of the delay circuits 167, 168 and 169 provides a time delay of about one bit interval (6 microseconds). In order to clear or reset the 8-bit storage register 163 to a zero condition before a syllable group is transferred thereto, each of the binary stages comprising the register 163 is set to a "zero" state by means of the B4, B12 and B20 timing pulses which are supplied thereto by way of an OR circuit 170.

The decommutator 34 also includes a plurality of subgroup, in this case, syllable group, output registers. These output registers are represented by 8-bit storage registers 172a, 172b, 172c, etc. Each of the storage registers 172a, 172b, 172c, etc., includes eight binary stages located side by side but having no signal interconnections therebetween. The eight parallel output lines from each of the output storage registers 172a, 172b, 172c, etc., are connected to the eight parallel input terminals of the corresponding one of the digital-to-analog converters 36a, 36b, 36c, etc., shown in FIG. 3.

The decommutator 34 of FIG. 12 further includes a plurality of transfer circuit means coupling the output storage registers 172a, 172b, 172c, etc., to the 8-bit storage register 163. These transfer circuit means are represented by transfer gates 173a, 173b, 173c, etc. Each of these transfer gates includes eight individual gate circuits having no signal interconnections therebetween. Each may be a two input AND circuit. Each serves to connect one of the parallel inputs of the corresponding output register to one of the parallel outputs of the storage register 163.

The decommutator 34 partially includes circuit means for selectively activating the individual transfer gates 173a, 173b, 173c, etc. for enabling the output registers 172a, 172b, 172c, etc. to provide separate indications of various syllables and combinations of syllables. As far as the decommutator 34 is concerned, this circuit means includes output gate signal lines 174a, 174b, 174c, etc. which serve to supply output gate signals from the programmer 35 to the various transfer gates 173a, 173b, 173c, etc. As will be seen, each output gate signal is a pulse having a one-bit duration. If, for example, an output gate signal is supplied over the gate signal line 174a, then this signal serves to activate the eight individual gate circuits comprising transfer gates 173a. This allows the transfer of the binary values which are contained in the storage register 163 to the output storage register 172a.

Reset of the output storage registers 172a, 172b, 172c, etc. is provided by means of differentiating circuits 175a, 175b, 175c, etc. These differentiating circuits are responsive to the output gate pulses to produce a relatively sharp spike or pulse of short duration corresponding to the leading edge thereof. These short duration pulses serve to reset to zero any output register stage which does not receive a bit-length "one" indicating pulse from its transfer gate circuit during the transfer interval. If a "one" indicating pulse is received, then the greater duration thereof serves to over-ride the short duration reset pulse and the register stage is set to or left in the "one" state.

Figure 13:
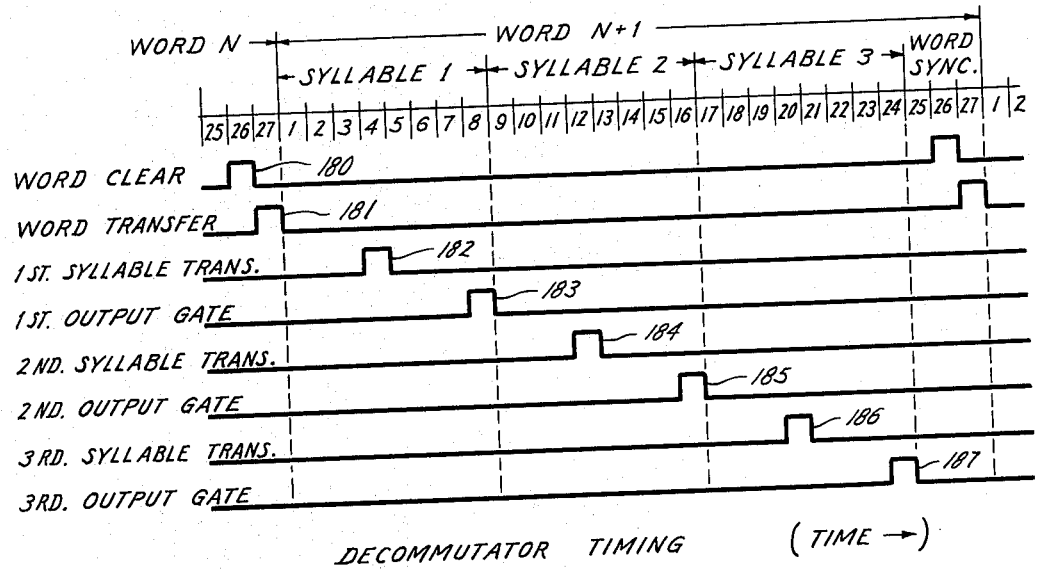
FIG. 13 is a timing diagram for the decommutator of FIG. 12.

Considering now the operation of the decommutator 34, this operation will be explained with the aid of the timing diagram of FIG. 13. It is assumed that bit, word, minor frame and major frame synchronization of the local timing circuits has been obtained. Just prior to the Word "N+1" interval illustrated in FIG. 13, the B26 timing pulse (waveform 180 of FIG. 13) of the preceding word interval (Word N) is supplied to the 24-bit storage register 160 to set all stages thereof to a "zero" state. During the occurrence of Bit 27 of Word N, the 27 bits comprising Word N just fill the shift register 33. During Bit 27, the 24 information bits of Word N are transferred in a parallel manner from the shift register stages R1–R24 to the corresponding stages of the 24-bit storage register 160. This transfer is effected by supplying the B27 timing pulse (waveform 181) for Word N to the 24 transfer gates 161. This B27 timing pulse is supplied by way of AND circuit 162. For the present, it will be assumed that a word sync gate signal is activating the second input terminal of AND circuit 162. The presence of such a word sync gate signal indicates that the word synchronizer 43 has the highest possible degree of synchronization, that is, is operating in its Mode 3 condition.

Subsequent to Bit 27 of Word N, the 24 information bits of Word N are stored in the 24-bit storage register 160. These Word N bits are then decommutated while the Word N+1 bits are being read into the shift register 33. This decommutation is obtained by transferring the bits stored in register 160 to the storage register 163 in groups of eight, corresponding to the three syllable groups. Thus, the B4 timing pulse (waveform 182), after first clearing the storage register 163 by way of OR circuit 170, is supplied by way of the delay circuit 167 to the Syllable 1 transfer gates 164. This serves to effect a parallel transfer of Bits 1–8 from the storage register 160 to the 8-bit storage register 163. Shortly after this Syllable 1 group is transferred to the 8-bit storage register 163, one of the output gate lines 174a, 174b, 174c, etc. associated with transfer gates 173a, 173b, 173c, etc. is activated by an output gate signal to retransfer this Syllable 1 group from register 163 to one of the output storage registers 172a, 172b, 172c, etc. This output gate signal occurs during Bit 8 and is indicated by waveform 183 of FIG. 13. For the sake of an example, it is assumed that this output gate signal is applied over the output gate line 174a to the transfer gates 173a. This causes the parallel transfer of the 8-bit Syllable 1 group to the output storage register 172a.

The decommutation of Syllable 2 of Word N is effected by the occurrence of the B12 timing pulse (waveform 184). After first clearing the 8-bit storage register 163, this B12 timing pulse is supplied by the delay circuit 168 to the Syllable 2 transfer gates 165 to effect the parallel transfer of the 8-bit Syllable 2 group from the 24-bit storage register 160 to the 8-bit storage register 163. This Syllable 2 group is then retransferred from the 8-bit storage register 163 to one of the output storage registers 172a, 172b, 172c, etc. by a second output gate pulse (waveform 185) which occurs during Bit 16. For the sake of an example, it is assumed that this second output gate pulse is applied to the output gate line 174b. In this case, the Syllable 2 group is retransferred to the output storage register 172b.

The decommutation of Syllable 3 of Word N is effected by the occurrence of the B20 timing pulse (waveform 186) during Bit 20. This B20 timing pulse, after first clearing the 8-bit storage register 163 by way of OR circuit 170, is supplied to the Syllable 3 transfer gates 166 by way of delay circuit 169. Consequently, this B20 timing pulse effects the parallel transfer of the 8-bit Syllable 3 group from the 24-bit storage register 160 to the 8-bit storage register 163. The appearance of a third output gate pulse (waveform 187) during Bit 24 on one of the output gate lines 174a, 174b, 174c, etc. serves to activate the corresponding one of transfer gates 173a, 173b, 173c, etc. to effect the parallel transfer of the 8-bit Syllable 3 group from the 8-bit storage register 163 to the corresponding one of the output storage registers 172a, 172b, 172c, etc. For the sake of an example, it is assumed that this third output gate pulse is applied to the output gate line 174c.

It is seen from the foregoing that at the end of any given word, which is the moment this word just fills the shift register 33, the 24 information bits of this word are transferred in parallel to the 24-bit storage register 160. During the period while the next word is being read into shift register 33, the 24 information bits in the storage register 160 are transferred, syllable by syllable, to the storage register 163. Shortly after each syllable is transferred to the storage register 163, it is retransferred to one of the output storage registers 172a, 172b, 172c, etc. After the three syllables of one word have been decommutated in this manner, the 24 information bits of the next word are transferred to the 24-bit storage register 160 and the process is repeated. The only difference is that the three syllables of this next word will, in all likelihood, be retransferred to three different output registers.

The particular output storage register to which a syllable is retransferred depends upon which information channel this syllable belongs to and upon which, if any, of the output signal channels is assigned to provide an indication of this information channel. A typical relationship between the information channels and the various pulse code syllables is given in the chart of FIG. 2. In accordance with this chart, the syllable which is retransferred to the output storage register 172a could represent channel 1, while the syllable retransferred to output storage register 172b could represent channel 2 and the syllable retransferred to output storage register 172c could represent channel 3. The time of occurrence of the output gate pulses on the output gate lines 174a, 174b, 174c required to produce this result are also indicated in the chart of FIG. 2. It is noted that the output gate pulse location or time of occurrence is identical to the signal location of the syllable which it is intended to transfer except that the output gate pulse location occurs one word later than the syllable signal location. This takes into account the time lag in reading a word group into the shift register 33.

The purpose of the word sync gate signal (WS) supplied to the AND circuit 162 of decommutator 34 by way of line 133 is to disable the transfer of the signal values from shift register 33 to the 24-bit storage register 160 whenever the word synchronizer 43 is not operating in Mode 3. When the word synchronizer 43 is operating in Mode 3, the word sync gate keeps AND circuit 162 activated and the decommutator 34 operates in its intended manner. When the word synchronizer 43 drops out of Mode 3, then the word sync gate assumes a value which disables the AND circuit 162. This prevents further transfer of word groups to the 24-bit storage register 160. This causes the signal values stored in each of the various storage registers to become zero the next time a reset or clear pulse is supplied thereto. This zero value is then maintained so long as the AND circuit 162 remains disabled. For the output storage registers 172a, 172b, 172c, etc., this means that each of these output registers will go to zero the next time an output gate signal appears on the output gate line associated therewith. Thus, when Mode 3 word synchronization is lost, all fifty of the output storage registers 172a, 172b, 172c, etc. will assume a zero value within a major frame interval. This, of course, results in zero output indications on the output meters $M_1$, $M_2$, $M_3$, etc. This prevents the utilization of any erroneous signal indications which might otherwise have been provided.

In some cases, it will be preferable to operate the decoder system with the word sync gate signal line 133 either disconnected or completely removed. In this case, the lack of word synchronization which occurs when the word synchronizer 43 drops out of Mode 3 will cause the output signal indications stored in output storage registers 172a, 172b, 172c, etc. and subsequently indicated by output meters $M_1$, $M_2$, $M_3$, etc. to undergo random fluctuations so long as this unsynchronized condition prevails. These random and, more or less, erratic indications would also provide a recognizable indication that the word synchronizer 43 was not operating with the highest degree of synchronization.

One advantage of the decommutator 34 is that a minimum of switching transients appear at the decommutator output terminals, namely, at the output terminals of register 172a, 172b, 172c, etc. Only those register stages which need changing are changed when a new data value is applied to any of these output registers 172a, 172b, 172c, etc. Also, any changes are made in a minimum time. Another advantage is that the data value at the output of any given output register does not decay between the application of data samples to the input thereof. These output registers provide ideal holding characteristics. The resulting analog signals supplied to the output meters $M_1$, $M_2$, $M_3$, etc. are, consequently, of an improved character.

PROGRAMMER

Figure 14:
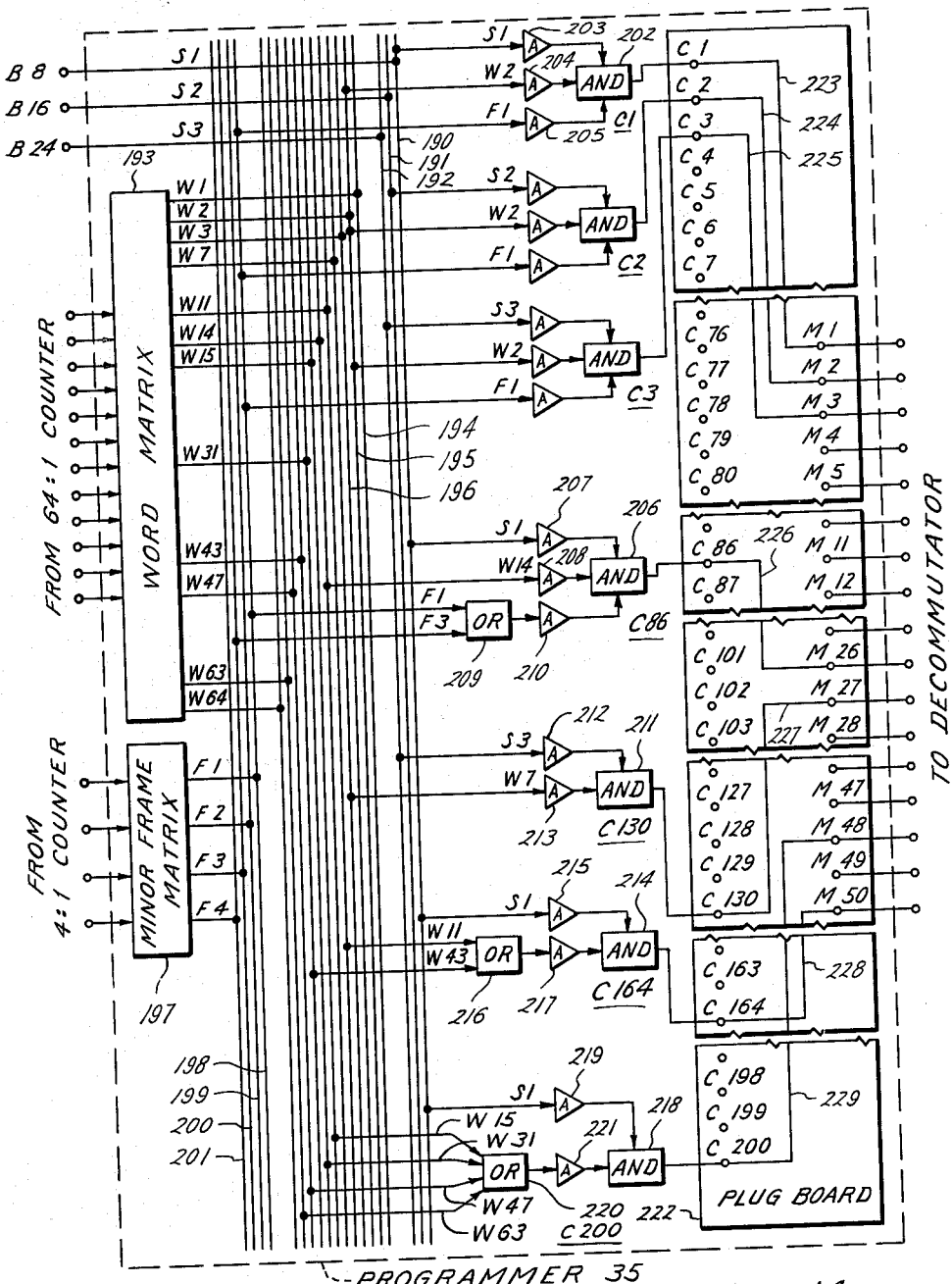
FIG. 14 is a detailed block diagram of the programmer of the FIG. 3 decoder system.

Referring now to FIG. 14 of the drawings, there is shown in greater detail the construction of the programmer 35 of the FIG. 3 decoder system. This programmer 35 serves to provide the various output gate pulses which are applied to the various output gate lines of the decommutator 34. For sake of simplicity, these output gate lines are designated by reference characters $M_1$, $M_2$, $M_3$, etc. in accordance with the designation of the output signal channel and the output meter which is associated with each of these output gate lines. The programmer 35 includes circuit means for providing word rate, minor frame rate and major frame rate timing pulses for identifying the various syllable, word and minor frame intervals. Syllable-identifying timing pulses are obtained by utilizing the B8, B16 and B24 timing pulses which are supplied to the programmer 35 from the bit matrix 42. These timing pulses are supplied to respective ones of syllable lines 190, 191 and 192. Thus, the B8 timing pulse which is supplied to syllable line 190 serves to indicate when a Syllable 1 (S1) output gate should occur. Similarly, the B16 and B24 timing pulses on lines 191 and 192 indicate when Syllable 2 (S2) and Syllable 3 (S3) output gates should occur. Each of these syllable gates or pulses S1, S2 and S3 has a duration corresponding to one bit interval.

The various word intervals are identified by coupling the twelve output lines from the 64:1 counter 45 (FIG. 3) to a word matrix 193 (FIG. 14). Word matrix 193 is a diode matrix network which responds to the 64 possible settings of the 64:1 counter 45 to produce a separate word-length output pulse or gate signal for each of these 64 possible settings. The resulting word-length output pulse occurring during Word 1 (W1) is supplied to a first word output line 194. The word-length output pulse occurring during Word 2 (W2) is supplied to a second word output line 195. The output pulse occurring during Word 3 (W3) is supplied to a third word output line 196. In a similar manner, each of the remainder of the word pulses is supplied to an additional word output line. For sake of simplicity, all 64 word output lines have not been shown. Only typical word output lines are shown.

The various minor frame intervals are identified by coupling the four output lines from the 4:1 counter 48 (FIG. 3) to a minor frame matrix 197 (FIG. 14). The matrix 197 is a diode matrix network which, in response to the four possible settings of the 4:1 counter 48, produces four separate output pulses or gate signals corresponding to these settings and having, in each case, a duration equal to the duration of a minor frame interval. Thus, the output pulse (F1) occurring during Minor Frame 1 is supplied to a minor frame output line 198. In a similar manner, the output pulses F2, F3 and F4 for Minor Frames 2, 3 and 4 are supplied to additional minor frame output lines 199, 200 and 201, respectively.

The programmer 35 also includes a plurality of coincidence circuit means C1, C2, C3, etc. which are responsive to various ones of the syllable, word and minor frame timing pulses for producing the desired output gate pulses for the various information channels. The coincidence circuit means C1 for Channel 1 includes a three-input AND circuit 202 having a first input terminal coupled to the Syllable 1 output line 190 by way of an amplifier 203, a second input terminal coupled to the Word 2 output line 195 by way of an amplifier 204 and a third input terminal coupled to the Minor Frame 1 output line 198 by way of an amplifier 205. Thus, during the simultaneous occurrence of Syllable 1, Word 2 and Minor Frame 1 timing pulses, the AND circuit 202 will produce an output pulse. The duration of this output pulse is determined by the duration of the shortest of the output pulses, namely, the syllable pulse S1. Thus, the output pulse, which constitutes the desired output gate pulse for Channel 1, has a duration of one bit interval.

The coincidence circuit means for each of the incoming information channels which has the same sampling rate as Channel 1 will have the same construction as the coincidence circuit means C1 for Channel 1 except that their input terminals will be connected to different ones of the syllable, word and minor frame output lines. As indicated by the chart of FIG. 2, the sampling rate for Channel 1 is 25 samples per second. Channels 2 and 3 are also seen to have this same sampling rate. Consequently, the coincidence circuits C2 and C3 for Channels 2 and 3, as illustrated in FIG. 14 have the same form of construction as the coincidence circuit C1 for Channel 1.

An information channel having a sampling rate of fifty samples per second is shown for the case of Channel 86. As shown in FIG. 14, the coincidence circuit means C86 for Channel 86 includes a three input AND circuit 206. A first input terminal is coupled to the S1 syllable line by way of an amplifier 207, while a second input terminal is coupled to the W14 word line by way of an amplifier 208. The third input terminal is, however, coupled to two different ones of the minor frame lines, namely, the F1 and F3 lines, by way of OR circuit 209 and an amplifier 210.

An example of coincidence circuit means for a channel which is to be sampled at a rate of 100 samples per second is illustrated by the coincidence circuit means C130 for information Channel 130. This coincidence circuit means C130 includes a two input AND circuit 211 having a first input terminal coupled to the S3 syllable line by way of an amplifier 212 and a second input terminal coupled to the W7 word line by way of an amplifier 213.

A typical coincidence circuit means for an information channel which is sampled at a rate of 200 samples per second is indicated by coincidence circuit means C164 for Channel 164. Coincidence circuit means C164 includes a two input AND circuit 214 having a first input terminal coupled to the S1 syllable line by way of an amplifier 215. The second input terminal of AND circuit 214 is coupled to two different ones of the word lines, namely, the W11 and W43 word lines, by way of an OR circuit 216 and an amplifier 217.

A typical coincidence circuit means for an information channel which is sampled at a rate of 400 samples per second is illustrated by the coincidence circuit means C200 for Channel 200. This coincidence circuit means C200 includes a two input AND circuit 218 having a first input terminal coupled to the S1 syllable line by way of amplifier 219. A seond input terminal of AND circuit 218 is connected to four different ones of the word lines, namely, lines W15, W31, W47 and W63, by way of a four input OR circuit 220 and an amplifier 221.

For sake of simplicity, coincidence circuit means for each of the 200 information channels contained in the incoming pulse code signal are not shown. Instead, typical coincidence circuit means for typical information channels are shown for each of the different sampling rates. It is understood that the channels which are not shown will have coincidence circuit means of similar construction to the one that is shown for the same sampling rate.

The programmer 35 also includes means for supplying the various output gate signals or pulses developed by the coincidence circuit means C1, C2, C3, etc. to the appropriate output transfer gates 173a, 173b, 173c, etc. and storage registers 172a, 172b, 172c, etc. of the decommutator 34 (FIG. 12). This means includes an electrical plugboard 222 having two sets of connector sockets. A first set of such connector sockets is indicated schematically by the vertical column of connector sockets designated as C1, C2, C3 . . . C200. Each of these connector sockets is connected to the output terminal of the correspondingly designated coincidence circuit means. The second set of connector sockets is indicated by the vertical column of connector sockets designated as M1, M2, M3 . . . M50. Each of these output connector sockets M1, M2, M3, etc. is connected to a correspondingly designated one of the output gate lines 174a, 174b, 174c, etc. of the decommutator 34. The connector socket for each information channel which it is desired to observe is connected to the connector socket for one of the output channels M1, M2, M3, etc. by means of an interconnecting jumper wire having electrical connector plugs on each end thereof. These connector plugs are inserted into the connector sockets which it is desired to interconnect. Typical jumper wires are indicated by jumper wires 223–229 of FIG. 14. Thus, the output gate pulse for Channel 1 is connected to output signal channel M1 by way of jumper wire 223, the output gate pulse for Channel 2 is connected to output signal channel M2 by jumper wire 224, etc. As is seen, there are 200 possible output gate signals and only 50 output signal channels. Consequently, at any given moment, not all of the output gate signals will be used. Also there is complete freedom as to which output signal channel any given output gate signal can be supplied.

Figure 15:
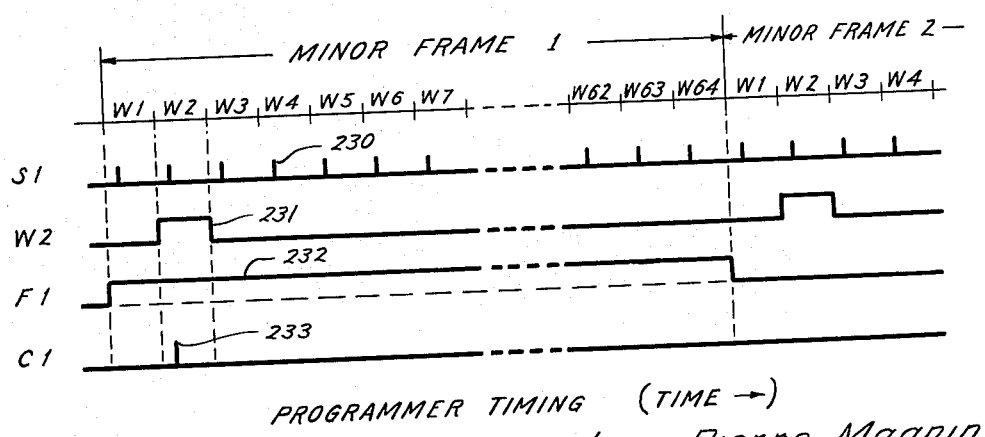
FIG. 15 is a timing diagram for the programmer of FIG. 14.

Considering now the operation of the programmer 35, such operation will be explained with the aid of the chart of FIG. 2 and the timing diagram of FIG. 15. The chart of FIG. 2, under the heading of "Output Gate," shows the relative time intervals during which the various output gate pulses should occur for typical ones of each of the 200 possible information channels. As seen in FIG. 2, the time interval or location for any given information channel is defined by a syllable designation, one or more word designations and one or more minor frame designations. The syllable locations are indicated electrically by the presence of bit-width timing pulses on syllable lines 190, 191 and 192 of the FIG. 14 programmer. The syllable pulses for Syllable 1, for example, are indicated by waveform 230 of FIG. 15. As there indicated, there is one Syllable 1 pulse for each word interval. The different word intervals are indicated electrically by the word-length timing pulses produced for each of the word intervals and supplied to individual ones of the word output lines 194, 195, 196, etc. by the word matrix 193. The word-length pulse for Word 2 is indicated by waveform 231 of FIG. 15. The different minor frame intervals are indicated electrically by the minor frame length pulses produced by the minor frame matrix 197 and supplied to the different ones of the minor frame output lines 198–201. The minor frame pulse for Minor Frame 1 is indicated by waveform 232 of FIG. 15.

The input pulses for the various coincidence circuit means C1, C2, C3, etc. are obtained from the various syllable, word and minor frame output lines in accordance with the program set forth in the chart of FIG. 2 under the "Output Gate" heading. Thus, an output gate for Channel 1 is obtained by connecting the Channel 1 AND circuit 202 to the Syllable 1 line 190, the Word 2 line 195 and the Minor Frame 1 line 198. The AND circuit 202 then produces an output gate pulse whenever the Syllable 1, Word 2, and Minor Frame 1 pulses are simultaneously present at the three inputs thereof. This is the case illustrated in FIG. 15. As indicated by waveform 233 of FIG. 15, the resulting output gate pulse from AND circuit 202 is a bit-width pulse which occurs during the occurrence of Syllable 1, Word 2 and Minor Frame 1. This output gate pulse is supplied by way of the jumper wire 223 of plug-board 222 to the output gate signal line 174a of the M1 output signal channel of decommutator 41. In a similar manner, coincidence circuit means C2 and C3 produce a bit-width output pulses during Syllables 2 and 3, respectively, of Word 2 of Minor Frame 1. These output gate pulses are supplied by way of corresponding jumper wires 224 and 225 to the corresponding M2 and M3 output signal channels of the decommutator 41.

As indicated by the chart of FIG. 2, an information channel having a sampling rate of twice the major frame rate, that is, fifty samples per second, requires the production of two output gate pulses per major frame. For the typical case of Channel 86, these pulses are obtained by connecting the third input of coincidence circuit means C86 to both the Minor Frame 1 and the Minor Frame 3 lines 198 and 200 by way of the OR circuit 209. Consequently, a bit-width output pulse is produced by AND circuit 206 during Syllable 1 of Word 14 of Minor Frame 1 and then again during Syllable 1 of Word 14 of Minor Frame 3.

As indicated by the chart of FIG. 2, a sampling rate of 100 samples per second is obtained by developing output gate pulses during each of the minor frame intervals. The manner in which this operation is obtained is indicated by the coincidence circuit means C130 of FIG. 14. As there indicated, the coincidence circuit means C130 does not have any minor frame pulses supplied thereto. Thus, the AND circuit 211 will produce a bit-width output pulse during Syllable 3 of every Word 7 interval. Since there is one Word 7 interval for each minor frame interval, this provides an output gate pulse for Channel 130 during each minor frame interval.

The manner in which the output gate pulses for a 200 sample per second information channel are obtained is indicated by the coincidence circuit means C164 for Channel 164. In this case, two output gate pulses are produced by the AND circuit 214 during each minor frame interval because two different word pulses are supplied to the second input terminal of this AND circuit during each minor frame interval. This means that a total of eight output gate pulses will appear at the output of AND circuit 214 during a major frame interval or complete operating cycle of the decoder system.

The manner in which output gate pulses for a 400 sample per second information channel may be obtained is indicated by the coincidence circuit means C200 of FIG. 14. As there indicated, such output gate pulses are obtained by connecting the second input of AND circuit 218 to four different ones of the word lines, namely, the W15, W31, W47 and W63 word lines. Consequently, AND circuit 218 will produce a bit-width output gate pulse for each of four different words in each minor frame interval. This makes a total of 16 output gate pulses for each complete cycle of operation of the decoder system.

It is seen from the foregoing that the programmer 35 enables the decoder system to provide separate output indications of any one or more, up to a maximum of 50, of the 200 different information channels contained in the incoming pulse code signal. Also, after a given combination of information channels has been selected for observation, one or more of these channels may be removed and replaced by another information channel without disturbing the information channels which it is desired to retain. Such changes are made by changing the locations of the jumper wires on the plugboard 222.

CONCLUSION

From the foregoing description of the invention, it is seen that there is provided a novel decoder system for decoding a complex pulse code signal. It is seen that this decoder system can handle a pulse code signal containing a relatively large number of information channels so as to provide indications of only a selected number of these channels with complete flexibility in the choice of channels to be observed. It is also seen that the decoder system of the present invention provides novel and improved forms of synchronizing systems for obtaining synchronization between the decoder and the various elements of a complex pulse code signal. The features of some of these synchronizing systems are also generally applicable to other types of telemetering and communication systems which are faced with the problem of synchronizing local timing circuits with an incoming signal of a relatively complex nature.

While there have been described what are at present considered to be preferred embodiments of this invention, it will be obvious to those skilled in the art that various changes and modifications may be made therein without departing from the invention and it is, therefore, intended to cover all such changes and modifications as fall within the true spirit and scope of the invention.

What is claimed is:

1. A decoder system for decoding a complex pulse code signal composed of binary bit units where a predetermined number of bit units constitutes a word unit and a predetermined number of word units constitutes a frame unit, the timing of word units being represented by a recurring word synchronizing bit pattern and the timing of frame units being represented by a recurring frame synchronizing bit pattern, the system comprising: circuit means for supplying the pulse code signal; a plurality of output signal channels; decoding circuit means responsive to the pulse code signal for selectively translating different groups of bit units to different ones of the output signal channels; pulse generating circuit means for generating bit-rate timing pulses; circuit means responsive to the pulse code signal for synchronizing the timing of the pulse generating circuit means with the timing of the bit units in the pulse code signal; first counting circuit means coupled to the pulse generating circuit means for supplying word-rate timing pulses to the decoding circuit means; circuit means responsive to the pulse code signal for producing a control pulse for each occurrence of a word synchronizing bit pattern and for supplying these control pulses to the first counting circuit means for synchronizing the counting action thereof with the word synchronizing bit patterns; second counting circuit means coupled to the first counting circuit means for supplying frame-rate timing pulses to the decoding circuit means; and circuit means responsive to the pulse code signal for producing a control pulse for each occurrence of a frame synchronizing bit pattern and for supplying these control pulses to both the first and the second counting circuit means for synchronizing the counting actions thereof with the frame synchronizing bit patterns.

2. A decoder system for decoding a complex pulse code signal composed of binary units where a predetermined number of successive bit units constitutes a word unit, a predetermined number of successive word units constitute a minor frame unit and a predetermined number of minor frame units constitute a major frame unit, word units being separated by a word synchronizing bit pattern, minor frame units being separated by a minor frame synchronizing bit pattern and major frame units being separated by a major frame synchronizing bit pattern, the system comprising: circuit means for supplying the pulse code signal; a plurality of output signal channels; decoding circuit means responsive to the pulse code signal for selectively translating different groups of bit units to different ones of the output signal channels; pulse generating circuit means for generating bit rate timing pulses; circuit means responsive to the pulse code signal for synchronizing the timing of the pulse generating circuit means with the timing of the bit units in the pulse code signal; first counting circuit means coupled to the pulse generating circuit means for supplying word rate timing pulses to the decoding circuit means; circuit means responsive to the pulse code signal for producing a control pulse for each occurrence of a word synchronizing bit pattern and for supplying these control pulses to the first counting circuit means for synchronizing the counting action thereof with the word synchronizing bit patterns; second counting circuit means coupled to the first counting circuit means for supplying minor frame rate timing pulses to the decoding circuit means; circuit means responsive to the pulse code signal for producing a control pulse for each occurrence of a minor frame synchronizing bit pattern and for supplying these control pulses to both the first and the second counting circuit means for synchronizing the counting actions thereof with the minor frame synchronizing bit patterns; third counting circuit means coupled to the second counting circuit means for supplying major frame rate timing pulses to the decoding circuit means; and circuit means responsive to the pulse code signal for producing a control pulse for each occurrence of a major frame synchronizing bit pattern and for supplying these control pulses to each of the first, second and third counting circuit means for synchronizing the counting actions thereof with the major frame synchronizing bit patterns.

3. A decoder system for decoding a complex pulse code signal composed of binary bit units where a predetermined number of successive bit units constitute a word unit and a predetermined number of successive word units constitute a frame unit, word units being separated by a word synchronizing bit pattern and frame units being separated by a frame synchronizing bit pattern, the system comprising: circuit means for supplying the pulse code signal; a plurality of output signal channels; decoding circuit means responsive to the pulse code signal for selectively translating different groups of bit units to different ones of the output signal channels; oscillator circuit means for generating a signal having a frequency corresponding approximately to the binary bit rate; automatic phase control circuit means coupled to both the supply circuit means and the oscillator circuit means for bringing the frequency and phase of the oscillator signal into synchronization with the frequency and phase of the pulse code bit units; circuit means responsive to the pulse code signal for directly synchronizing the oscillator circuit means with the individual signal changes in the pulse code signal; first counting circuit means coupled to the oscillator circuit means for supplying word rate timing pulses to the decoding circuit means; circuit means responsive to the pulse code signal for producing a control pulse for each occurrence of a word synchronizing bit pattern and for supplying these control pulses to the first counting circuit means for synchronizing the counting action thereof with the word synchronizing bit patterns; second counting circuit means coupled to the first counting circuit means for supplying frame rate timing pulses to the decoding circuit means; and circuit means responsive to the pulse code signal for producing a control pulse for each occurrence of a frame synchronizing bit pattern and for supplying these control pulses to both the first and the second counting circuit means for synchronizing the counting actions thereof with the frame synchronizing bit patterns.

4. A decoder system for decoding a complex pulse code signal composed of binary bit units where a predetermined number of successive bit units constitute a word unit and a predetermined number of successive word units constitute a frame unit, word units being separated by a word synchronizing bit pattern and frame units being separated by a frame synchronizing bit pattern, the system comprising: circuit means for supplying the pulse code signal; a plurality of output signal channels; decoding circuit means responsive to the pulse code signal for selectively translating different groups of bit units to different ones of the output signal channels; pulse generating circuit means for generating bit rate timing pulses; circuit means responsive to the pulse code signal for synchronizing the timing of the pulse generating circuit means with the timing of the bit units in the pulse code signal; first counting circuit means coupled to the pulse generating circuit means for supplying word rate timing pulses to the decoding circuit means; circuit means for periodically sampling the pulse code signal for detecting the presence of word synchronizing bit patterns and for synchronizing the counting action of the first counting circuit means with the detected patterns; circuit means for shifting the time of occurrence of the sampling intervals when the rate of occurrence of erroneous word synchronizing bits during the sampling intervals exceeds a predetermined value; second counting circuit means coupled to the first counting circuit means for supplying frame rate timing pulses to the decoding circuit means; and circuit means responsive to the pulse code signal for producing a control pulse for each occurrence of a frame synchronizing bit pattern and for supplying these control pulses to both the first and the second counting circuit means for synchronizing the counting actions thereof with the frame synchronizing bit patterns.

5. A decoder system for decoding a complex pulse code signal composed of binary bit units where a predetermined number of successive bit units constitute a word unit and a predetermined number of successive word units constitute a frame unit, word units being separated by a word synchronizing bit pattern and frame units being separated by a frame synchronizing bit pattern, the system comprising: circuit means for supplying the pulse code signal; a plurality of output signal channels; decoding circuit means responsive to the pulse code signal for selectively translating different groups of bit units to different ones of the output signal channels; pulse generating circuit means for generating bit rate timing pulses; circuit means responsive to the pulse code signal for synchronizing the timing of the pulse generating circuit means with the timing of the bit units in the pulse code signal; first counting circuit means coupled to the pulse generating means for supplying word rate timing pulses to the decoding circuit means; circuit means responsive to the pulse code signal for producing a control pulse for each occurrence of a word synchronizing bit pattern and for supplying these control pulses to the first circuit means for synchronizing the counting action thereof with the word synchronizing bit patterns; second counting circuit means coupled to the first counting circuit means for supplying frame rate timing pulses to the decoding circuit means; circuit means responsive to the pulse code signal for supplying to the first and second counting circuit means control pulses which are representative of the occurrence of bit patterns corresponding to the frame synchronizing bit pattern for synchronizing the counting actions thereof; said circuit means responsive to the pulse code signal for supplying to the first and second counting circuit means control pulses which are representative of the occurrence of imperfect frame synchronizing bit patterns having less than a predetermined amount of error therein for synchronizing the counting actions thereof even though the pulse code signal is partially impaired by noise.

6. A decoder system for decoding a complex pulse code signal composed of binary bit units where a predetermined number of successive bit units constitutes a word unit and a predetermined number of successive word units constitutes a frame unit, word units being separated by a word synchronizing bit pattern and frame units being separated by a frame synchronizing bit pattern, the system comprising: circuit means for supplying the pulse code signal; a plurality of output signal channels; decoding circuit means responsive to the pulse code signal for selectively translating different groups of bit units to different ones of the output signal channels; oscillator circuit means for generating a signal having a frequency corresponding approximately to the binary bit rate; automatic phase control circuit means coupled to both the supply circuit means and the oscillator circuit means for bringing the frequency and phase of the oscillator signal in to synchronization with the frequency and phase of the pulse code bit units; circuit means responsive to the pulse code signal for directly synchronizing the oscillator circuit means with the individual signal changes in the pulse code signal; first counting circuit means coupled to the oscillator circuit means for supplying word rate timing pulses to the decoding circuit means; circuit means for periodically sampling the pulse code signal for detecting the presence of word synchronizing bit patterns and for synchronizing the counting action of the first counting circuit means with the detected patterns; circuit means for shifting the time of occurrence of the sampling intervals when the rate of occurrence of erroneous word synchronizing bits during the sampling intervals exceeds a predetermined value; second counting circuit means coupled to the first counting circuit means for supplying frame rate timing pulses to the decoding circuit means; circuit means responsive to the pulse code signal for supplying to the first and second counting circuit means control pulses which are representative of the occurrence of bit patterns corresponding to the frame synchronizing bit pattern for synchronizing the counting actions thereof; and circuit means responsive to the pulse code signal for supplying to the first and second counting circuit means control pulses which are representative of the occurrence of imperfect frame synchronizing bit patterns having less than a predetermined amount of error therein for synchronizing the counting actions thereof even though the pulse code signal is partially impaired by noise.

7. In a decoder system for decoding a pulse code signal composed of binary bit units, the combination comprising: circuit means for supplying the pulse code signal; oscillator circuit means for generating a signal having a frequency corresponding approximately to the binary bit rate; automatic phase control circuit means coupled to both the supply circuit means and the oscillator circuit means for bringing the frequency and phase of the oscillator signal into synchronization with the frequency and phase of the pulse code bit units; and circuit means responsive to the pulse code signal for directly synchronizing the oscillator circuit means with the individual signal changes in the pulse code signal.

8. A signal synchronizing system comprising: circuit means for supplying a received signal; local oscillator circuit means for generating a signal having a frequency corresponding approximately to the frequency of the received signal; automatic phase control circuit means coupled to both the supply circuit means and the oscillator circuit means for bringing the frequency and the phase of the oscillator signal into synchronization with the frequency and phase of the received signal; and circuit means responsive to a predetermined event in each cycle of the received signal for directly synchronizing the oscillator signal cycles with the individual cycles of the received signal.

9. In a decoder system for decoding a train of pulses having a synchronizing pulse pattern which occurs at periodic intervals, the combination comprising: timing circuit means for controlling the operation of the decoding system; circuit means for supplying the incoming train of pulses to be decoded; circuit means for periodically sampling the incoming pulse train for detecting the presence of synchronizing pulse patterns and for synchronizing the timing circuit means therewith; and circuit means for shifting the time of occurrence of the sampling intervals when the synchronizing pulse errors during the sampling intervals exceed a predetermined value.

10. In a decoder system for decoding a train of pulses having a synchronizing pulse pattern which occurs at periodic intervals, the combination comprising: timing circuit means for controlling the operation of the decoding system; circuit means for supplying the incoming train of pulses to be decoded; circuit means for periodically sampling the incoming pulse train for detecting the presence of synchronizing pulse patterns and for synchronizing the timing circuit means therewith; and circuit means for shifting the time of occurrence of the sampling intervals when the rate of occurrence of synchronizing pulse errors during the sampling intervals exceeds a predetermined value.

11. In a decoder system for decoding a pulse code signal composed of binary bit units and having a synchronizing bit pattern which occurs at periodic intervals, the combination comprising: timing circuit means for controlling the operation of the decoding system; circuit means for supplying the pulse code signal; circuit means for periodically sampling the pulse code signal for detecting the presence of synchronizing bit patterns and for synchronizing the timing circuit means therewith; and circuit means for shifting the time of occurrence of the sampling intervals when the rate of occurrence of erroneous synchronizing bits during the sampling intervals exceeds a predetermined value.

12. In a decoder system for decoding a train of pulses having a synchronizing pulse pattern which occurs at periodic intervals, the combination comprising: timing circuit means for controlling the operation of the decoding system; circuit means for supplying the incoming train of pulses to be decoded; circuit means for periodically sampling the incoming pulse train for detecting the presence of synchronizing pulse patterns and for synchronizing the timing circuit means therewith; circuit means for counting the synchronizing pulse errors occurring during the sampling intervals and for resetting itself to a zero count condition upon the occurrence of a predetermined number of such errors; and circuit means for shifting the time of occurrence of the sampling intervals whenever the counting circuit means resets itself.

13. In a decoder system for decoding a train of pulses having a synchronizing pulse pattern which occurs at periodic intervals, the combination comprising: timing circuit means for controlling the operation of the decoding system; circuit means for supplying the incoming train of pulses to be decoded; circuit means for periodically sampling the incoming pulse train for detecting the presence of synchronizing pulse pattern and for synchronizing the timing circuit means therewith; circuit means for counting the synchronizing pulse errors occurring during the sampling intervals and for resetting itself to a zero count condition upon the occurrence of a predetermined number of such errors; circuit means for shifting the time of occurrence of the sampling intervals whenever the counting circuit means rests itself; and circuit means for resetting the counting circuit means to a zero count condition in the absence of a self-resetting thereof for a predetermined number of sampling intervals.

14. In a decoder system for decoding a train of pulses having a synchronizing pulse pattern which occurs at periodic intervals, the combination comprising: timing circuit means for controlling the operation of the decoding system; circuit means for supplying the incoming train of pulses to be decoded; circuit means for periodically sampling the incoming pulse train for detecting the presence of synchronizing pulse patterns and for synchronizing the timing circuit means therewith; circuit means for shifting the time of occurrence of the sampling intervals when the rate of occurrence of synchronizing pulse errors during the sampling intervals exceeds a predetermined value; and circuit means for disabling the interval shifting action when the error rate is less than the predetermined value and for maintaining this disabled condition until a predetermined number of sampling intervals occur without the detection of a correct synchronizing pulse pattern.

15. In a decoder system for decoding a train of pulses having a synchronizing pulse pattern which occurs at periodic intervals, the combination comprising: timing circuit means for controlling the operation of the decoding system; circuit means for supplying the incoming train of pulses to be decoded; circuit means for periodically sampling the incoming pulse train for detecting the presence of synchronizing pulse patterns and for synchronizing the timing circuit means therewith; circuit means for shifting the time of occurrence of the sampling intervals when the rate of occurrence of synchronizing pulse errors during the sampling intervals exceeds a predetermined valve; and circuit means coupled to the supply circuit means for disabling the interval shifting action in the absence of an incoming pulse train.

16. In a decoder system for decoding a pulse code signal composed of binary bit units and having a synchronizing bit pattern which occurs at periodic intervals, the combination comprising: timing circuit means for controlling the operation of the decoding system; circuit means for supplying the pulse code signal; circuit means for periodically sampling the pulse code signal for detecting the presence of synchronizing bit patterns and for synchronizing the timing circuit means therewith; error counting circuit means for counting the number of erroneous synchronizing bits occurring during the sampling intervals and for resetting itself to a zero count condition upon the occurrence of a predetermined number of such erroneous bits; circuit means for shifting the time of occurrence of the sampling intervals whenever the error counting circuit means resets itself; intervals counting circuit means for resetting the error counting circuit means to a zero count condition in the absence of a self-resetting thereof for a predetermined number of sampling intervals; and circuit means for disabling the interval shifting action when the interval counting circuit means resets the error counting circuit means and for maintaining this disabled condition until a predetermined number of sampling intervals occur without the detection of a correct synchronizing bit pattern.

17. In a decoder system for decoding a train of pulses having a synchronizing pulse pattern which occurs at periodic intervals, the combination comprising: timing circuit means for controlling the operation of the decoding system; circuit means for supplying the incoming train of pulses to be decoded; circuit means responsive to the incoming pulse train for producing a control pulse for each pulse train interval containing a pulse pattern corresponding to the synchronizing pulse pattern; gating circuit means for supplying, when in an activated condition, the control pulses to the timing circuit means for synchronizing the timing thereof with the timing of the incoming pulse train; circuit means coupled to the timing circuit means for activating the gating circuit means during periodic intervals having the same periodicity as the synchronizing pulse patterns for enabling passage of control pulses corresponding to periodic sampling intervals in the pulse train; counting circuit means coupled to the timing circuit means and responsive to the incoming pulse train for counting the synchronizing pulse errors occurring during the periodic sampling intervals; and circuit means coupled to the counting circuit means for activating the gating circuit means upon the occurrence of a predetermined number of errors and for maintaining this activation until the occurrence of a subsequent pulse pattern corresponding to the synchronizing pulse pattern.

18. In a decoder system for decoding a pulse code signal composed of binary bit units and having a plural-bit synchronizing bit pattern which occurs at periodic intervals, the combination comprising: timing circuit means for controlling the operation of the decoding system; circuit means for supplying the pulse code signal; circuit means responsive to the pulse code signal for producing a control pulse for each signal interval containing a bit pattern corresponding to an error-free synchronizing bit pattern; gating circuit means for supplying, when in an activated condition, the control pulses to the timing circuit means for synchronizing the timing thereof; circuit means coupled to the timing circuit means for activating the gating circuit means during periodic intervals having the same periodicity as the synchronizing bit patterns for enabling the passage of control pulses corresponding to periodic sampling intervals in the pulse code signal; counting circuit means coupled to the timing circuit means and responsive to the pulse code signal for counting the number of erroneous synchronizing bits occurring during the periodic sampling intervals; and circuit means coupled to the counting circuit means for activating the gating circuit means upon the occurrence of a predetermined number of synchronizing bit errors and for maintaining this activation until the occurrence of a subsequent bit pattern corresponding to an error-free synchronizing bit pattern.

19. In a decoder system for decoding a pulse code signal composed of binary bit units and having a plural-bit synchronizing bit pattern which occurs at periodic intervals, the combination comprising: timing circuit means for controlling the operation of the decoding system; circuit means for supplying the pulse code signal; circuit means responsive to the pulse code signal for producing a control pulse for each signal interval containing a bit pattern corresponding to an error-free synchronizing bit pattern; gating circuit means for supplying, when in an activated condition, the control pulses to the timing circuit means for synchronizing the timing thereof; circuit means coupled to the timing circuit means for activating the gating circuit means during periodic intervals having the same periodicity as the synchronizing bit patterns for enabling the passage of control pulses corresponding to periodic sampling intervals in the pulse code signal; counting circuit means coupled to the timing circuit means and responsive to the pulse code signal for counting the number of erroneous synchronizing bits occurring during the periodic sampling intervals and for resetting itself to a zero count condition upon the occurrence of a predetermined number of such erroneous bits; and circuit means coupled to the counting circuit means for activating the gating circuit means whenever the counting circuit means resets itself and for maintaining this activation until the occurrence of a subsequent bit pattern corresponding to an error-free synchronizing bit pattern.

20. In a decoder system for decoding a pulse code signal composed of binary bit units and having a plural-bit synchronizing bit pattern which occurs at periodic intervals, the combination comprising: timing circuit means for controlling the operation of the decoding system; circuit means for supplying the pulse code signal; circuit means responsive to the pulse code signal for producing a control pulse for each signal interval containing a bit pattern corresponding to an error-free synchronizing bit pattern; gating circuit means for supplying, when in an activated condition, the control pulses to the timing circuit means for synchronizing the timing thereof; circuit means coupled to the timing circuit means for activating the gating circuit means during periodic intervals having the same periodicity as the synchronizing bit patterns for enabling the passage of control pulses corresponding to periodic sampling intervals in the pulse code signal; counting circuit means coupled to the timing circuit means and responsive to the pulse code signal for counting the number of erroneous synchronizing bits occurring during the periodic sampling intervals and for resetting itself to a zero count condition upon the occurrence of a predetermined number of such erroneous bits; circuit means for resetting the counting circuit means to a zero count condition in the absence of a self-resetting thereof for a predetermined number of sampling intervals; and circuit means coupled to the counting circuit means for activating the gating circuit means whenever the counting circuit means resets itself and for maintaining this activation until the occurrence of a subsequent bit pattern corresponding to an error-free synchronizing bit pattern.

21. In a decoder system for decoding a pulse code signal composed of binary bit units and having a plural-bit synchronizing bit pattern which occurs at periodic intervals, the combination comprising: timing circuit means for controlling the operation of the decoding system; circuit means for supplying the pulse code signal; circuit means responsive to the pulse code signal for producing a control pulse for each signal interval containing a bit pattern corresponding to an error-free synchronizing bit pattern; gating circuit means for supplying, when in an activated condition, the control pulses to the timing circuit means for synchronizing the timing thereof; circuit means coupled to the timing circuit means for activating the gating circuit means during periodic intervals having the same periodicity as the synchronizing bit patterns for enabling the passage of control pulses corresponding to periodic sampling intervals in the pulse code signal; counting circuit means coupled to the timing circuit means and responsive to the pulse code signal for counting the number of erroneous synchronizing bits occurring during the periodic sampling intervals; and bistable circuit means coupled to the counting circuit means for activating the gating circuit means upon the occurrence of a predetermined number of synchronizing bit errors and responsive to the next control pulse for discontinuing this activation.

22. In a decoder system for decoding a pulse code signal composed of binary bit units and having a plural-bit synchronizing bit pattern which occurs at periodic intervals, the combination comprising: timing circuit means for controlling the operation of the decoding system; circuit means for supplying the pulse code signal; coincidence circuit means responsive to the pulse code signal for producing a control pulse for each signal interval containing a bit pattern corresponding to an error-free synchronizing bit pattern; gating circuit means for supplying, when in an activated condition, the control pulses to the timing circuit means for synchronizing the timing thereof; circuit means coupled to the timing circuit means for activating the gating circuit means during periodic intervals having the same periodicity as the synchronizing bit patterns for enabling the passage of control pulses corresponding to periodic sampling intervals in the pulse code signal; counting circuit means coupled to the timing circuit means and responsive to the pulse code signal for counting the number of erroneous synchronizing bits occurring during the perodic sampling intervals and for resetting itself to a zero count condition upon the occurrence of a predetermined number of such erroneous bits; circuit means for resetting the counting circuit means to a zero count condition in the absence of a self-resetting thereof for a predetermined number of sampling intervals; and bistable circuit means coupled to the counting circuit means for activating the gating circuit means whenever the counting circuit means resets itself to zero and coupled to the output of the gating circuit means for discontinuing this activation upon the next occurrence of a control pulse.

23. In a decoder system for decoding a train of pulses having a synchronizing pulse pattern which occurs at periodic intervals, the combination comprising: timing circuit means for controlling the operation of the decoding system; circuit means for supplying the incoming train of pulses to be decoded; control pulse circuit means responsive to the incoming pulse train for producing a control pulse for each pulse train interval containing a pulse pattern corresponding to the synchronizing pulse pattern; gating circuit means for supplying, when in an activated condition, the control pulses to the timing circuit means for synchronizing the timing thereof; circuit means coupled to the timing circuit means for activating the gating circuit means during periodic intervals having the same periodicity as the synchronizing pulse patterns for enabling passage of control pulses corresponding to periodic sampling intervals in the pulse train; first counting circuit means coupled to the timing circuit means and responsive to the incoming pulse train for counting the synchronizing pulse errors occurring during the periodic sampling intervals and for producing a mode switching pulse upon the occurrence of a predetermined number of such errors; second counting circuit means coupled to the timing circuit means for producing a reset pulse when a predetermined number of synchronizing pulse patterns have been examined by the first counting circuit means; circuit means responsive to the mode switching pulse for resetting both the first and the second counting circuit means to a zero count condition; circuit means responsive to the reset pulse for resetting both the first and the second counting circuit means to a zero count condition; and circuit means responsive to the mode switching pulse for activating the gating circuit means and for maintaining this activation until the occurrence of a subsequent control pulse.

24. In a decoder system for decoding a train of pulses having a synchronizing pulse pattern which occurs at periodic intervals, the combination comprising: timing circuit means for controlling the operation of the decoding system; circuit means for supplying the incoming train of pulses to be decoded; control pulse circuit means responsive to the incoming pulse train for producing a control pulse for each pulse train interval containing a pulse pattern corresponding to the synchronizing pulse pattern; gating circuit means for supplying, when in an activated condition, the control pulses to the timing circuit means for synchronizing the timing thereof; circuit means coupled to the timing circuit means for activating the gating circuit means during periodic intervals having the same periodicity as the synchronizing pulse patterns for enabling passage of control pulses corresponding to periodic sampling intervals in the pulse train; first counting circuit means coupled to the timing circuit means and responsive to the incoming pulse train for counting the synchronizing pulse errors occurring during the periodic sampling intervals and for producing a first mode switching pulse upon the occurrence of a predetermined number of such errors; second counting circuit means coupled to the timing circuit means for producing a second mode switching pulse when a predetermined number of synchronizing pulse patterns have been examined by the first counting circuit means; circuit means responsive to the first mode switching pulse for resetting both the first and the second counting circuit means to a zero count condition; circuit means responsive to the second mode switching pulse for resetting both the first and the second counting circuit means to a zero count condition; circuit means responsive to the first mode switching pulse for activating the gating circuit means and for maintaining this activation until the occurrence of a subsequent control pulse; circuit means responsive to the second mode switching pulse for disabling the first and the second counting circuit means; error pulse circuit means coupled to the control pulse circuit means and to the timing circuit means for producing an error pulse if no control pulse occurs during the periodic activation of the gating circuit means; and third counting circuit means responsive to the error pulses for reactivating the first and the second counting circuit means upon the occurrence of a predetermined number of such error pulses.

25. In a decoder system for decoding a pulse code signal composed of binary bit units and having a plural-bit synchronizing bit pattern which occurs at periodic intervals, the combination comprising: timing circuit means for controlling the operation of the decoding system; circuit means for supplying the pulse code signal; control pulse circuit means responsive to the pulse code signal for producing a control pulse for each signal interval containing a bit pattern corresponding to an error-free synchronizing bit pattern; gating circuit means for supplying, when in an activated condition, the control pulses to the timing circuit means for synchronizing the timing thereof; circuit means coupled to the timing circuit means for activating the gating circuit means during periodic intervals having the same periodicity as the synchronizing bit patterns for enabling passage of control pulses corresponding to periodic sampling intervals in the pulse code signal; first counting circuit means coupled to the timing circuit means and responsive to the pulse code signal for counting the number of erroneous synchronizing bits occurring during the periodic sampling intervals and for producing a first mode switching pulse upon the occurrence of a predetermined number of such erroneous bits; second counting circuit means coupled to the timing circuit means for producing a second mode switching pulse when a predetermined number of synchronizing bit patterns have been examined by the first counting circuit means; circuit means responsive to the first mode switching pulse for resetting both the first and the second counting circuit means to a zero count condition; circuit means responsive to the second mode switching pulse for resetting both the first and the second counting circuit means to a zero count condition; circuit means responsive to the first mode switch pulse for activating the gating circuit means and for maintaining this activation until the occurrence of a subsequent control pulse; circuit means responsive to the second mode switching pulse for disabling the first and the second counting circuit means; error pulse circuit means coupled to the control pulse circuit means and to the timing circuit means for producing an error pulse if no control pulse occurs during the periodic activation of the gating circuit means; and third counting circuit means responsive to the error pulses for reactivating the first and the second counting circuit means upon the occurrence of a predetermined number of such error pulses.

26. In a decoder system for decoding a train of pulses having a synchronizing pulse pattern which occurs at periodic intervals, the combination comprising: timing circuit means for controlling the operation of the decoding system; circuit means for supplying the incoming train of pulses to be decoded; control pulse circuit means responsive to the incoming pulse train for producing a control pulse for each pulse train interval containing a pulse pattern corresponding to the synchronizing pulse pattern; gating circuit means for supplying, when in an activated condition, the control pulses to the timing circuit means for synchronizing the timing thereof; circuit means coupled to the timing circuit means for activating the gating circuit means during periodic intervals having the same periodicity as the synchronizing pulse patterns for enabling passage of control pulses corresponding to periodic sampling intervals in the pulse train; first counting circuit means coupled to the timing circuit means and responsive to the incoming pulse train for counting the synchronizing pulse errors occurring during the periodic sampling intervals and for producing a first mode switching pulse upon the occurrence of a predetermined number of such errors; second counting circuit means coupled to the timing circuit means for producing a second mode switching pulse when a predetermined number of synchronizing pulse patterns have been examined by the first counting circuit means; circuit means responsive to the first mode switching pulse for resetting both the first and the second counting circuit means to a zero count condition; circuit means responsive to the second mode switching pulse for resetting both the first and the second counting circuit means to a zero count condition; first bistable circuit means responsive to the first mode switching pulse for activating the gating circuit means and responsive to a subsequent control pulse for discontinuing this activation; second bistable circuit means responsive to the second mode switching pulse for disabling the first and the second counting circuit means; error pulse circuit means coupled to the control pulse circuit means and to the timing circuit means for producing an error pulse if no control pulse occurs during the periodic activation of the gating circuit means; and third counting circuit means responsive to the error pulses for resetting the second bistable circuit means for reactivating the first and the second counting circuit means upon the occurrence of a predetermined number of such error pulses.

27. In a decoder system for decoding a train of pulses having a synchronizing pulse pattern which occurs at periodic intervals, the combination comprising: timing circuit means for controlling the operation of the decoding system; circuit means for supplying the incoming train of pulses to be decoded; control pulse circuit means responsive to the incoming pulse train for producing a control pulse for each pulse train interval containing a pulse pattern corresponding to the synchronizing pulse pattern; gating circuit means for supplying, when in an activated condition, the control pulses to the timing circuit means for synchronizing the timing thereof; circuit means coupled to the timing circuit means for activating the gating circuit means during periodic intervals having the same periodicity as the synchronizing pulse patterns for enabling passage of control pulses corresponding to periodic sampling intervals in the pulse train; first counting circuit means coupled to the timing circuit means and responsive to the incoming pulse train for counting the synchronizing pulse errors occurring during the periodic sampling intervals and for producing a first mode switching pulse upon the occurrence of a predetermined number of such errors; second counting circuit means coupled to the timing circuit means for producing a second mode switching pulse when a predetermined number of synchronizing pulse patterns have been examined by the first counting circuit means; circuit means responsive to the first mode switching pulse for resetting both the first and the second counting circuit means to a zero count condition; circuit means responsive to the second mode switching pulse for resetting both the first and the second counting circuit means to a zero count condition; circuit means responsive to the first mode switching pulse for activating the gating circuit means and for maintaining this activation until the occurrence of a subsequent control pulse; error pulse circuit means coupled to the control pulse circuit means and to the timing circuit means for producing an error pulse if no control pulse occurs during the periodic activation of the gating circuit means; third counting circuit means coupled to the error pulse circuit means for counting the number of error pulses and coupled to the gating circuit means for resetting itself to a zero count condition upon the occurrence of a control pulse during the periodic activation of the gating circuit means; and circuit means responsive to the second mode switching pulse for disabling the first and the second counting circuit means and coupled to the third counting circuit means for reactivating the first and the second counting circuit means whenever a predetermined number of successive error pulses are counted by the third counting circuit means.

28. In a decoder system for decoding a train of pulses having a synchronizing pulse pattern which occurs at periodic intervals, the combination comprising: timing circuit means for controlling the operation of the decoding system; circuit means for supplying the incoming train of pulses to be decoded; control pulse circuit means responsive to the incoming pulse train for producing a control pulse for each pulse train interval containing a pulse pattern corresponding to the synchronizing pulse pattern; gating circuit means for supplying, when in an activated condition, the control pulses to the timing circuit means for synchronizing the timing thereof; circuit means coupled to the timing circuit means for activating the gating circuit means during periodic intervals having the same periodicity as the synchronizing pulse patterns for enabling passage of control pulses corresponding to periodic sampling intervals in the pulse train; first counting circuit means coupled to the timing circuit means and responsive to the incoming pulse train for counting the synchronizing pulse errors occurring during the periodic sampling intervals and for producing a first mode switching pulse upon the occurrence of a predetermined number of such errors; second counting circuit means coupled to the timing circuit means for producing a second mode switching pulse when a predetermined number of synchronizing pulse patterns have been examined by the first counting circuit means; circuit means responsive to the first mode switching pulse for resetting both the first and the second counting circuit means to a zero count condition; circuit means responsive to the second mode switching pulse for resetting both the first and the second counting circuit means to a zero count condition; circuit means responsive to the first mode switching pulse for activating the gating circuit means and for maintaining this activation until the occurrence of a subsequent control pulse; error pulse circuit means coupled to the control pulse circuit means and to the timing circuit means for producing an error pulse if no control pulse occurs during the periodic activation of the gating circuit means; third counting circuit means coupled to the error pulse circuit means for counting the number of error pulses and coupled to the gating circuit means for resetting itself to a zero count condition upon the occurrence of a control pulse during the periodic activation of the gating circuit means; circuit means responsive to the second mode switching pulse for disabling the first and the second counting circuit means and coupled to the third counting circuit means for reactivating the first and the second counting circuit means whenever a predetermined number of successive error pulses are counted by the third counting circuit means; and circuit means coupled to the third counting circuit means and to the gating circuit means for increasing the duration of the periodic activated intervals of the gating circuit means whenever an intermediate number of successive error pulses are counted by the third counting circuit means.

29. In a decoder system for decoding a train of pulses having a synchronizing pulse pattern which occurs at periodic intervals, the combination comprising: timing circuit means for controlling the operation of the decoding system; circuit means for supplying the incoming train of pulses to be decoded; control pulse circuit means responsive to the incoming pulse train for producing a control pulse for each pulse train interval containing a pulse pattern corresponding to the synchronizing pulse pattern; gating circuit means for supplying, when in an activated condition, the control pulses to the timing circuit means for synchronizing the timing thereof; circuit means coupled to the timing circuit means for activating the gating circuit means during periodic intervals having the same periodicity as the synchronizing pulse patterns for enabling passage of control pulses corresponding to periodic sampling intervals in the pulse train; first counting circuit means coupled to the timing circuit means and responsive to the incoming pulse train for counting the synchronizing pulse errors occurring during the periodic sampling intervals and for producing a first mode switching pulse upon the occurrence of a predetermined number of such errors; second counting circuit means coupled to the timing circuit means for producing a second mode switching pulse when a predetermined number of synchronizing pulse patterns have been examined by the first counting circuit means; circuit means responsive to the first mode switching pulse for resetting both the first and the second counting circuit means to a zero count condition; circuit means responsive to the second mode switching pulse for resetting both the first and the second counting circuit means to a zero count condition; circuit means responsive to the first mode switching pulse for activating the gating circuit means and for maintaining this activation until the occurrence of a subsequent control pulse; error pulse circuit means coupled to the control pulse circuit means and to the timing circuit means for producing an error pulse if no control pulse occurs during the periodic activation of the gating circuit means; third counting circuit means coupled to the error pulse circuit means for counting the number of error pulses and coupled to the gating circuit means for resetting itself to a zero count condition upon the occurrence of a control pulse during the periodic activation of the gating circuit means; circuit means responsive to the second mode switching pulse for disabling the first and the second counting circuit means and coupled to the third counting circuit means for reactivating the first and the second counting circuit means whenever a predetermined number of successive error pulses are counted by the third counting circuit means; and circuit means coupled to the supply circuit means for disabling the first and the second counting circuit means in the absence of an incoming pulse train.

30. In a decoder system for decoding a train of pulses having a synchronizing pulse pattern which occurs at periodic intervals, the combination comprising: timing circuit means for controlling the operation of the decoding system; circuit means for supplying the incoming train of pulses to be decoded; control pulse circuit means responsive to the incoming pulse train for producing a control pulse during each occurrence of a pulse pattern corresponding to the synchronizing pulse pattern; gating circuit means for supplying, when in an activated condition, the control pulses to the timing circuit means for synchronizing the timing thereof with the timing of the incoming pulse train; circuit means coupled to the timing circuit means for activating the gating circuit means during periodic intervals having the same periodicity as the synchronizing pulse patterns; error pulse circuit means coupled to the control pulse circuit means and to the timing circuit means for producing an error pulse if no control pulse occurs during the periodic activation of the gating circuit means; counting circuit means for counting the number of error pulses; and circuit means coupled to the counting circuit means for activating the gating circuit means upon the occurrence of a predetermined number of error pulses and for maintaining this activation until the occurrence of a subsequent pulse pattern corresponding to the synchronizing pulse pattern.

31. In a decoder system for decoding a train of pulses having a synchronizing pulse pattern which occurs at periodic intervals, the combination comprising: timing circuit means for controlling the operation of the decoding system; circuit means for supplying the incoming train of pulses to be decoded; control pulse circuit means responsive to the incoming pulse train for producing a control pulse during each occurrence of a pulse pattern corresponding to the synchronizing pulse pattern; gating circuit means for supplying, when in an activated condition; the control pulses to the timing circuit means for synchronizing the timing thereof with the timing of the incoming pulse train; circuit means coupled to the timing circuit means for activating the gating circuit means during periodic intervals having the same periodicity as the synchronizing pulse patterns; error pulse circuit means coupled to the control pulse circuit means and to the timing circuit means for producing an error pulse if no control pulse occurs during the periodic activation of the gating circuit means; counting circuit means coupled to the error pulse circuit means for counting the number of error pulses and coupled to the gating circuit means for resetting itself to a zero count condition upon the occurrence of a control pulse during the periodic activation of the gating circuit means; and circuit means coupled to the counting circuit means for activating the gating circuit means upon the occurrence of a predetermined number of successive error pulses and for maintaining this activation until the occurrence of a subsequent pulse pattern corresponding to the synchronizing pulse pattern.

32. In a decoder system for decoding a train of pulses having a synchronizing pulse pattern which occurs at periodic intervals, the combinataion comprising: timing circuit means for controlling the operation of the decoding system; circuit means for supplying the incoming train of pulses to be decoded; control pulse circuit means responsive to the incoming pulse train for producing a control pulse during each occurrence of a pulse pattern corresponding to the synchronizing pulse pattern; gating circuit means for supplying, when in an activated condition, the control pulses to the timing circuit means for synchronizing the timing thereof with the timing of the incoming pulse train; circuit means coupled to the timing circuit means for activating the gating circuit means during periodic intervals having the same periodicity as the synchronizing pulse patterns; error pulse circuit means coupled to the control pulse circuit means and to the timing circuit means for producing an error pulse if no control pulse occurs during the periodic activation of the gating circuit means; counting circuit means for counting the number of error pulses; and bistable circuit means coupled to the counting circuit means and to the control pulse circuit means for activating the gating circuit means upon the occurrence of a predetermined number of error pulses and for maintaining this activation until the occurrence of a subsequent control pulse.

33. In a decoder system for decoding a train of pulses having a recurrent synchronizing pulse pattern, the combination comprising: timing circuit means for controlling the operation of the decoding system; circuit means for supplying the incoming train of pulses to be decoded; circuit means responsive to the incoming pulse train for supplying to the timing circuit means control signals which are representative of the occurrence of pulse patterns corresponding to the synchronizing pulse pattern for synchronizing the timing thereof with the timing of the incoming pulse train; and circuit means responsive to the incoming pulse train for supplying to the timing circuit means control signals which are representative of the occurrence of imperfect synchronizing pulse patterns having less than a predetermined amount of error therein for producing synchronization thereof when the pulse train is partially impaired by noise.

34. In a decoder system for decoding a train of pulses having a multi-pulse synchronizing pulse pattern which occurs at periodic intervals, the combination comprising: timing circuit means for controlling the operation of the decoding system; circuit means for supplying the incoming train of pulses to be decoded; coincidence circuit means responsive to a multi-pulse interval of the incoming pulse train for producing a control pulse for each pulse train interval containing a pulse pattern corresponding to the synchronizing pulse pattern and coupled to the timing circuit means for supplying the resulting control pulses thereto for synchronizing the timing thereof; and circuit means for repetitively comparing the incoming pulse train with a locally-generated replica of a correct synchronizing pulse pattern for producing a control pulse whenever the incoming pulse train departs from the locally-generated synchronizing pattern less than a predetermined number of times and for supplying the resulting control pulses to the timing circuit means for synchronizing the timing thereof even though the pulse train is partially impaired by noise.

35. In a decoder system for decoding a train of pulses having a multi-pulse synchronizing pulse pattern which occurs at periodic intervals, the combination comprising: timing circuit means for controlling the operation of the decoding system; circuit means for supplying the incoming train of pulses to be decoded; coincidence circuit means responsive to a multi-pulse interval of the incoming pulse train for producing a control pulse for each pulse train interval containing a pulse pattern corresponding to the synchronizing pulse pattern and coupled to the timing circuit means for supplying the resulting control pulses thereto for synchronizing the timing thereof; and circuit means for repetitively counting the synchronizing pulse errors occurring over intervals having a duration equal to the synchronizing pattern duration for producing a control pulse for each interval having less than a predetermined number of errors and coupled to the timing circuit means for supplying the resulting control pulses thereto for synchronizing the timing thereof even though the pulse train is partially impaired by noise.

36. In a decoder system for decoding a train of pulses having a multi-pulse synchronizing pulse pattern which occurs at periodic intervals, the combination comprising: timing circuit means for controlling the operation of the decoding system; circuit means for supplying the incoming train of pulses to be decoded; coincidence circuit means responsive to a multi-pulse interval of the incoming pulse train for producing a control pulse for each pulse train interval containing a pulse pattern corresponding to the synchronizing pulse pattern and coupled to the timing circuit means for supplying the resulting control pulses thereto for synchronizing the timing thereof; circuit means for repeitively comparing the incoming pulse train with a locally-generated replica of a correct synchronizing pulse pattern for producing an error pulse each time the incoming pulse train departs from the locally-generated synchronizing pattern; and circuit means for counting the error pulses and producing a control pulse for each comparing interval having less than a predetermined number of error pulses and for supplying the resulting control pulses to the timing circuit means for synchronizing the timing thereof even though the pulse train is partially impaired by noise.

37. In a decoder system for decoding a train of pulses having a multi-pulse synchronizing pulse pattern which occurs at periodic intervals, the combination comprising: timing circuit means for controlling the operation of the decoding system; circuit means for supplying the incoming train of pulses to be decoded; coincidence circuit means responsive to a multi-pulse interval of the incoming pulse train for producing a control pulse for each pulse train interval containing a pulse pattern corresponding to the synchronizing pulse pattern and coupled to the timing circuit means for supplying the resulting control pulses thereto for synchronizing the timing thereof; circuit means coupled to the timing circuit means for supplying repetitive replicas of a correct synchronizing pulse pattern; circuit means for comparing the incoming pulse train with the locally-generated replicas of a correct synchronizing pulse pattern for producing an error pulse each time the incoming pulse train departs from the locally-generated synchronizing pattern; and circuit means for counting the error pulses and producing a control pulse for each replica interval having less than a predetermined number of error pulses and for supplying the resulting control pulses to the timing circuit means for synchronizing the timing thereof even though the pulse train is partially impaired by noise.

38. In a decoder system for decoding a train of pulses having a multi-pulse synchronizing pulse pattern which occurs at periodic intervals, the combination comprising: timing circuit means for controlling the operation of the decoding system; circuit means for supplying the incoming train of pulses to be decoded; coincidence circuit means responsive to a multi-pulse interval of the incoming pulse train for producing a control pulse for each pulse train interval containing a pulse pattern corresponding to the synchronizing pulse pattern and coupled to the timing circuit means for supplying the resulting control pulses thereto for synchronizing the timing thereof; circuit means coupled to the supply circuit means and to the timing circuit means for producing an error pulse each time the incoming pulse train departs from a correct synchronizing pulse pattern; circuit means for counting the error pulses; circuit means coupled to the timing circuit means for repetitively resetting the counting circuit means; and circuit means for producing a control pulse for each counting cycle wherein less than a predetermined number of error pulses is counted and for supplying the resulting control pulses to the timing circuit means for synchronizing the timing thereof even though the pulse train is partially impaired by noise.

39. In a decoder system for decoding a train of pulses having a multi-pulse synchronizing pulse pattern which occurs at periodic intervals, the combination comprising: timing circuit means for controlling the operation of the decoding system; circuit means for supplying the incoming train of pulses to be decoded; coincidence circuit means responsive to a multi-pulse interval of the incoming pulse train for producing a control pulse for each pulse train interval containing a pulse pattern corresponding to the synchronizing pulse pattern and coupled to the timing circuit means for supplying the resulting control pulses thereto for synchronizing the timing thereof; circuit means coupled to the timing circuit means for supplying repetitive replicas of a correct synchronizing pulse pattern; circuit means for comparing the incoming pulse train with the locally-generated replicas of a correct synchronizing pulse pattern for producing an error pulse each time the incoming pulse train departs from the locally-generated synchronizing pattern; circuit means for counting the error pulses; circuit means coupled to the timing circuit means for resetting the counting circuit means at the beginning of each synchronizing pattern replica; and circuit means for producing a control pulse for each counting cycle wherein less than a predetermined number of error pulses is counted and for supplying the resulting control pulses to the timing circuit means for synchronizing the timing thereof even though the pulse train is partially impaired by noise.

40. A decoder system for decoding a train of multiplexed pulse code groups, adjacent groups being separated by a synchronizing signal and each group including a plurality of pulse code-sub-groups, the system comprising: a shift register capable of holding an entire pulse code group; circuit means for reading the pulse train into the shift register in a serial manner; a code group storage register; circuit means for transferring the contents of the shift register to the code group storage register when a single code group just fills the shift register; a sub-group storage register; circuit means for successively transferring the pulse code sub-groups from the group storage register to the sub-group storage register while the next code group is being read into the shift register; a plurality of sub-group output registers; and circuit means for selectively transferring the contents of the sub-group storage register to the output registers to provide separate indications of various sub-group codes.

41. A decoder system for decoding a train of multiplexed binary pulse code groups, adjacent groups being separated by a synchronizing signal, and each group including a plurality of pulse code-sub-groups, the system comprising: a binary shift register capable of holding an entire pulse code group; circuit means for reading the pulse train into the shift register in a serial manner; a code group binary storage register; circuit means for effecting parallel transfer of the contents of the shift register to the code group storage register when a single code group just fills the shift register; a sub-group binary storage register; circuit means for successively effecting parallel transfer of the pulse code sub-groups from the group storage register to the sub-group storage register while the next code group is being read into the shift register; a plurality of sub-group output binary registers; and circuit means for selectively effecting parallel transfer of the contents of the sub-group storage register to the output registers to provide separate indications of various sub-group codes.

42. A decoder system for decoding a train of multiplexed pulse code groups, adjacent groups being separated by a synchronizing signal and each group including a plurality of pulse code-sub-groups, the system comprising: a shift register capable of holding an entire pulse code group; circuit means for reading the pulse train into the shift register in a serial manner; a code group storage register; circuit means for transferring the contents of the shift register to the code group storage register when a single code group just fills the shift register; a sub-group storage register; circuit means for successively transferring the pulse code sub-groups from the group storage register to the sub-group storage register while the next code group is being read into the shift register; a plurality of sub-group output registers; a plurality of transfer circuit means coupling the output registers to the sub-group storage register; and circuit means for selectively activating the individual transfer circuit means for enabling the output registers to provide separate indications of various sub-group codes.

43. A decoder system for decording a complex pulse code signal composed of binary bit units where a predetermined number of successive bit units constitutes a syllable group, a predetermined number of successive syllable groups constitutes a word group and a predetermined number of successive word groups constitutes a frame group, word groups being separated by a word synchronizing bit pattern and frame groups being separated by a frame synchronizing bit pattern, the system comprising: circuit means for supplying the pulse code signal; timing circuit means for generating syllable and end-of-word timing pulses; circuit means for synchronizing the timing circuit means with the word and frame synchronizing bit patterns of the pulse code signal; a shift register capable of holding an entire word group; circuit means for reading the pulse code signal into the shift register in a serial manner; a word group storage register; circuit means responsive to the end-of-word timing pulses for transferring the contents of the shift register to the word group storage register; a syllable storage register; circuit means responsive to the syllable timing pulses for successively transferring the syllable groups from the word group storage register to the syllable storage register while the next word group is being read into the shift register; a plurality of syllable output registers; and circuit means for selectively transferring the contents of the syllable storage register to the syllable output registers to provide separate indications of various syllables and combinations of syllables.

44. A decoder system for decoding a complex pulse code signal composed of binary bit units where a predetermined number of successive bit units constitutes a syllable group, a predetermined number of successive syllable groups constitutes a word group and a predetermined number of successive word groups constitutes a frame group, word groups being separated by a word synchronizing bit pattern and frame groups being separated by a frame synchronizing bit pattern, the system comprising: circuit means for supplying the pulse code signal; timing circuit means for generating syllable, end-of-word and word timing pulses; circuit means for synchronizing the timing circuit means with the word and frame synchronizing bit patterns of the pulse code signal; a shift register capable of holding an entire word group; circuit means for reading the pulse code signal into the shift register in a serial manner; a word group storage register; circuit means responsive to the end-of-word timing pulses for transferring the contents of the shift register to the word group storage register; a syllable storage register; circuit means responsive to the syllable timing pulses for succesively transferring the syllable groups from the word group storage register to the syllable storage register while the next word group is being read into the shift register; a plurality of syllable output registers; a plurality of transfer circuit means coupling the output registers to the syllable storage register; and circuit means responsive to the syllable and word timing pulses for selectively activating the individual transfer circuit means for enabling the output registers to provide separate indications of various syllables and combinations of syllables.

45. In a decoder system for decoding a train of data pulses, the combination comprising: means for supplying a train of data pulses; means for recording the data pulses on a recording medium; means responsive to the incoming data pulses for recording a timing signal on the recording medium; means for decoding the recorded data pulses; and means responsive to the recorded timing signal for controlling the timing of the decoding means thereby to compensate for any speed variations in the recording means.

46. A method of recording and subsequently decoding an incoming train of data pulses comprising: recording the incoming data pulses on a recording medium; generating timing signals in synchronism with a predetermined characteristic of the incoming pulse train; recording the timing signals on the recording medium; reproducing the recorded data pulses and timing signals; and decoding the reproduced data pulses using the reproduced timing signals to control the timing of this decoding operation.

47. In a decoder system for decoding an incoming pulse code signal composed of a succession of basic bit intervals some of which contain signal pulses with each of such pulses occupying a relatively large portion of its bit interval, the combination comprising: timing circuit means for generating timing pulses in synchronism with the basic bit intervals of the incoming pulse code signal; circuit means responsive to the timing pulses for sampling the pulse code signal during a narrow portion of each bit interval for producing a train of relatively narrow pulses representing the incoming pulse code signal; and circuit means responsive to both the narrow-pulse pulse code signal and the timing pulses for decoding this narrow-pulse pulse code signal, the timing pulses controlling the timing of the decoder operation.

References Cited by the Examiner

UNITED STATES PATENTS

| | | | |
|---|---|---|---|
| 2,926,338 | 2/1960 | Bensky et al. | 340—174.1 |
| 2,969,522 | 1/1961 | Crosby | 340—172.5 |
| 2,972,127 | 2/1961 | Lukoff et al. | 340—172.5 |
| 2,979,565 | 4/1961 | Zarcone | 178—50 |
| 3,063,042 | 11/1962 | Bird et al. | 340—174.1 |

ROBERT C. BAILEY, *Primary Examiner.*

IRVING L. SRAGOW, *Examiner.*

F. C. WEISS, G. D. SHAW, *Assistant Examiners.*